(12) United States Patent
Driemeyer et al.

(10) Patent No.: US 8,333,659 B2
(45) Date of Patent: Dec. 18, 2012

(54) APPARATUSES, METHODS AND SYSTEMS FOR A LIVE ONLINE GAME TESTER

(75) Inventors: Justin Driemeyer, San Francisco, CA (US); Matthew Ocko, San Francisco, CA (US)

(73) Assignee: Zynga Inc., San Francisco, CA (US)

( * ) Notice: Subject to any disclaimer, the term of this patent is extended or adjusted under 35 U.S.C. 154(b) by 110 days.

(21) Appl. No.: 12/895,759

(22) Filed: Sep. 30, 2010

(65) Prior Publication Data
US 2011/0212784 A1     Sep. 1, 2011

Related U.S. Application Data

(60) Provisional application No. 61/247,562, filed on Oct. 1, 2009, provisional application No. 61/247,560, filed on Sep. 30, 2009, provisional application No. 61/277,948, filed on Sep. 30, 2009, provisional application No. 61/247,525, filed on Sep. 30, 2009.

(51) Int. Cl.
*A63F 9/24* (2006.01)
*A63F 13/00* (2006.01)
*G06F 17/00* (2006.01)
*G06F 19/00* (2006.01)

(52) U.S. Cl. ........................................... 463/29; 463/42
(58) Field of Classification Search .................... 463/29, 463/42
See application file for complete search history.

(56) References Cited

U.S. PATENT DOCUMENTS

2011/0237333 A1\*    9/2011    Otomo et al. ................... 463/42

\* cited by examiner

*Primary Examiner* — William M. Brewster
(74) *Attorney, Agent, or Firm* — Martine Penilla Group, LLP.

(57) ABSTRACT

The APPARATUSES, METHODS AND SYSTEMS FOR AN ONLINE BEHAVIOR MONITOR ("OBM") transform user social-gaming behavioral pattern data via various OBM components into online social-gaming experience customizations. In one embodiment, the OBM may provide, in response to a gaming app request from a user, a gaming app including a test game feature for the user. The OBM may obtain user social graph data identifying co-users of the user. The OBM may also obtain: online gaming pattern data for the users and the co-users, including gaming action identifiers and their associated gaming action timestamps; user online social activity data, for the users and the co-users, including social networking action identifiers and their associated social networking action timestamps; and game feature adoption evaluation instructions. The OBM may generate social-gaming activity timelines for the users and the co-users using the gaming action identifiers and the associated gaming action timestamps, as well as the social networking action identifiers and the associated social networking action timestamps. The OBM may also calculate and provide game feature adoption scores by applying the game feature adoption evaluation instructions to the generated social-gaming activity timelines.

21 Claims, 37 Drawing Sheets

EXAMPLE GAME FEATURE SET TESTER (GFST) COMPONENT 2000

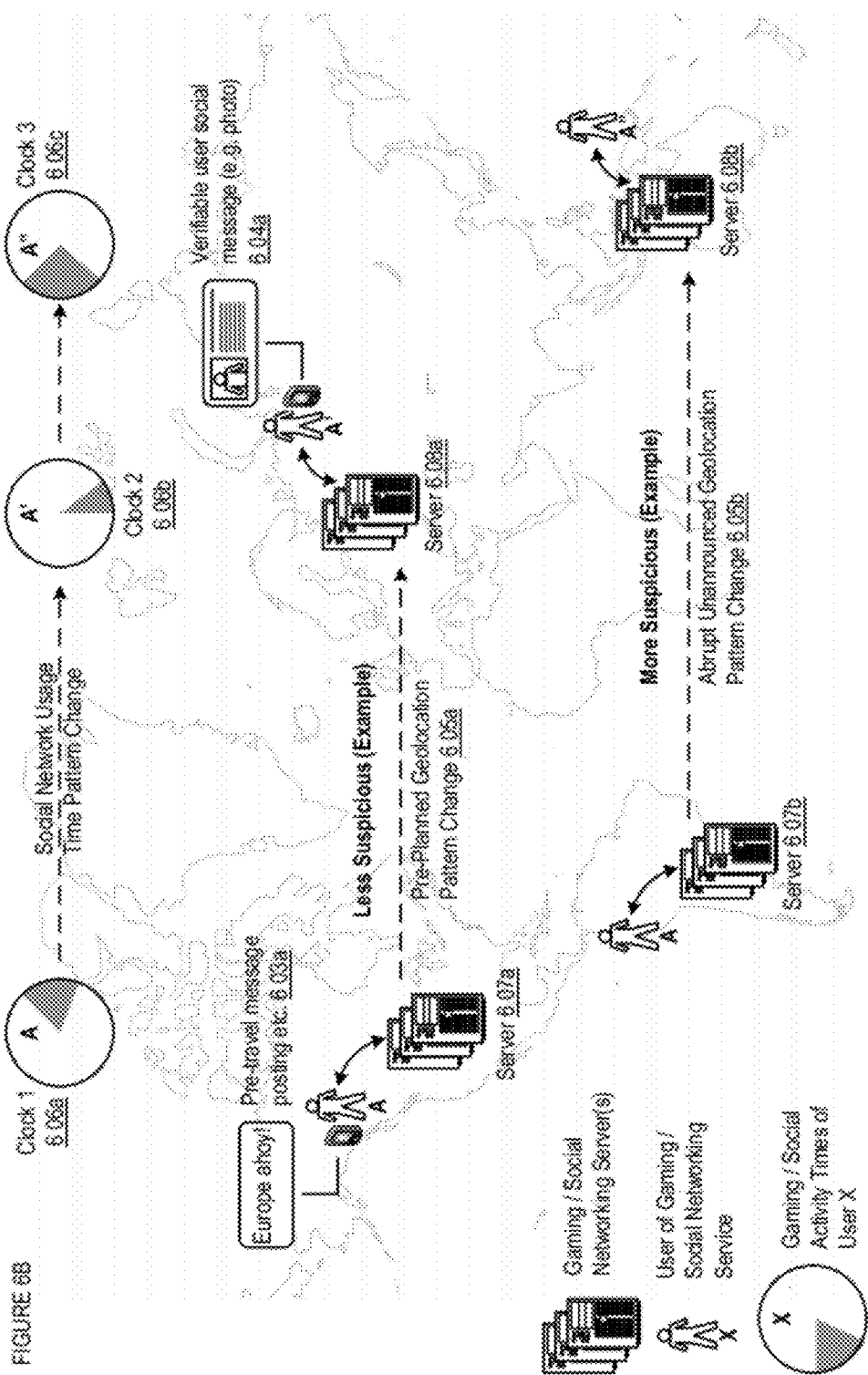

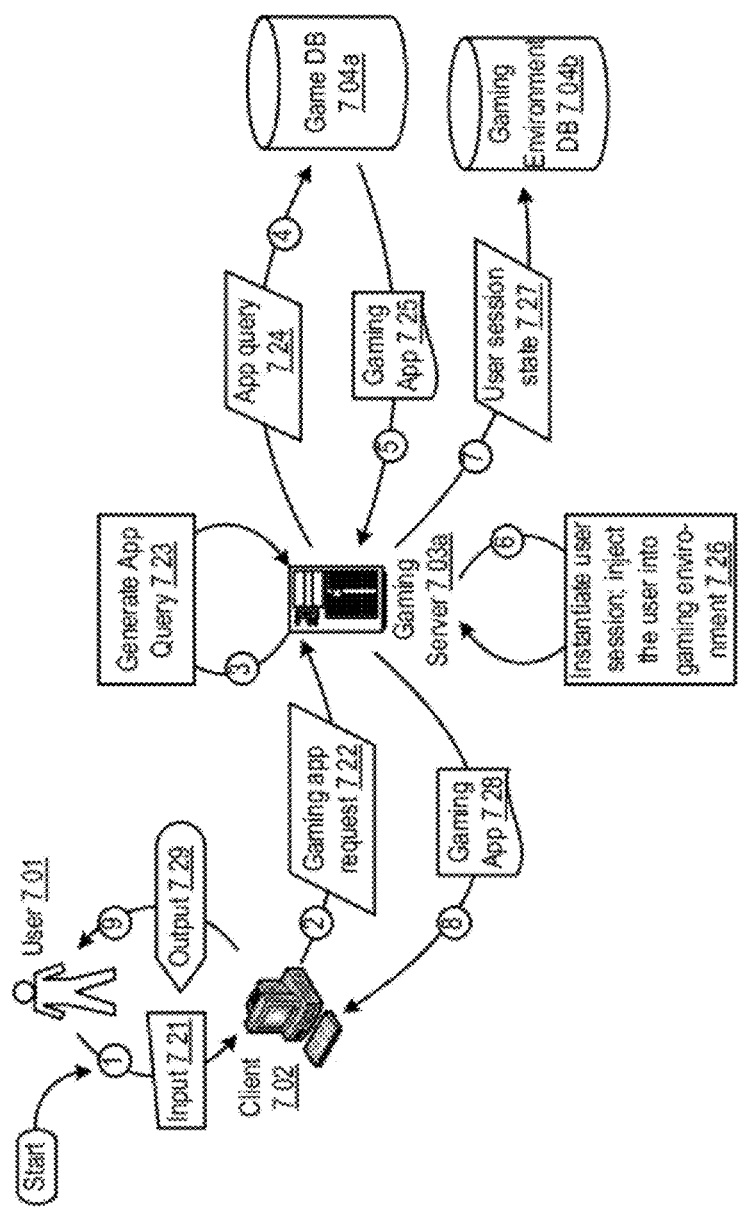

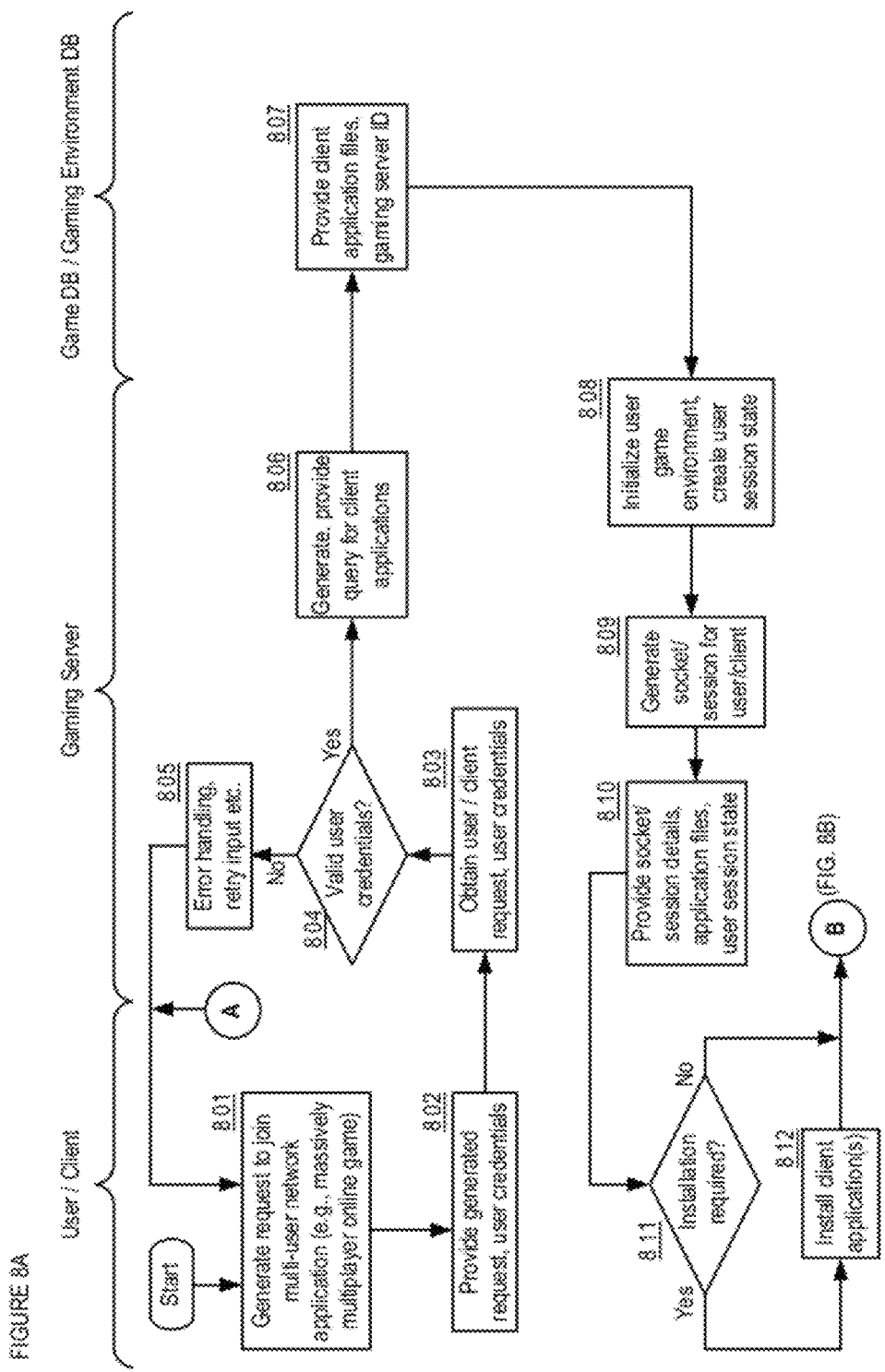

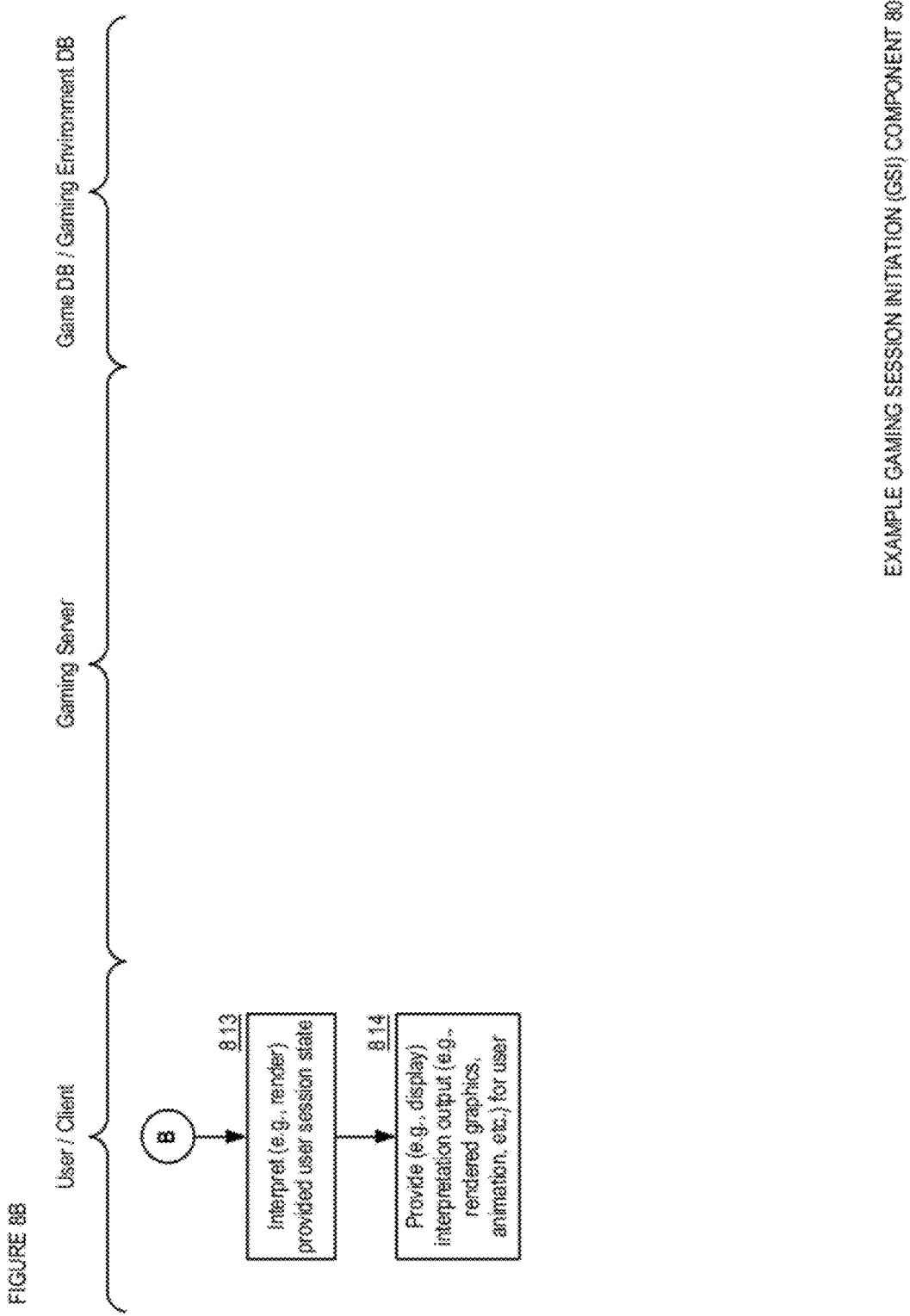

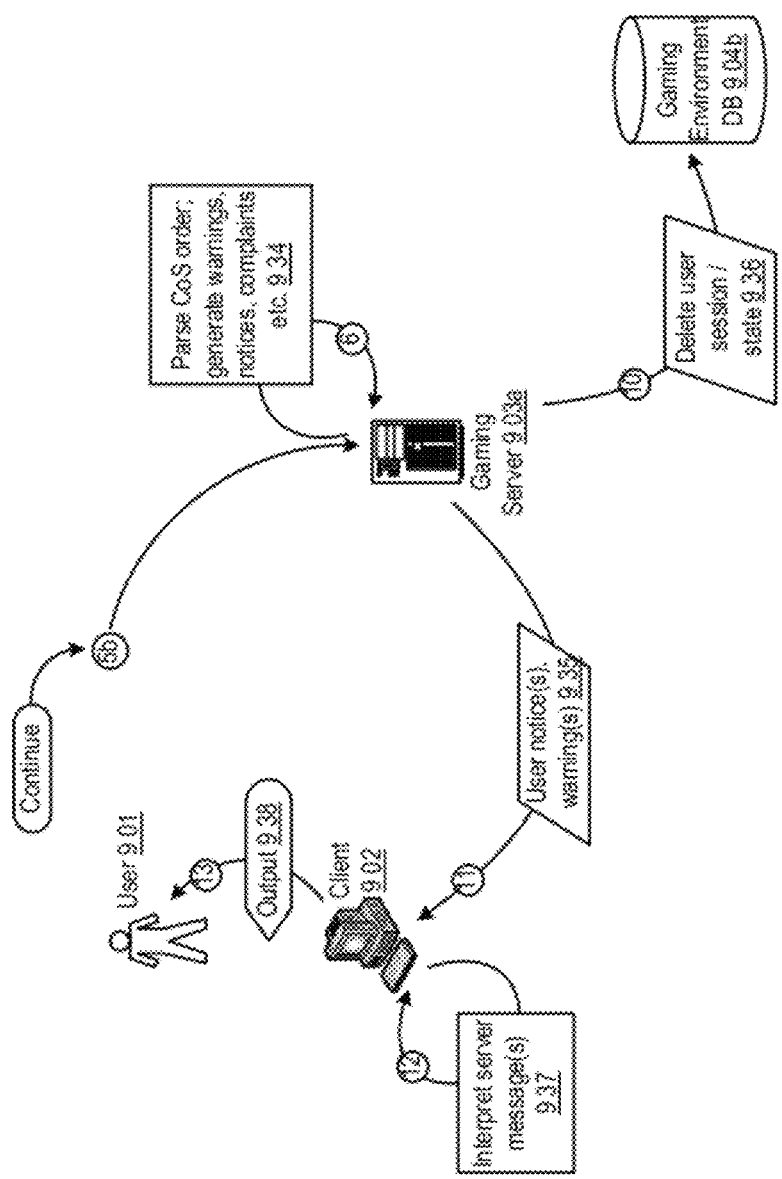

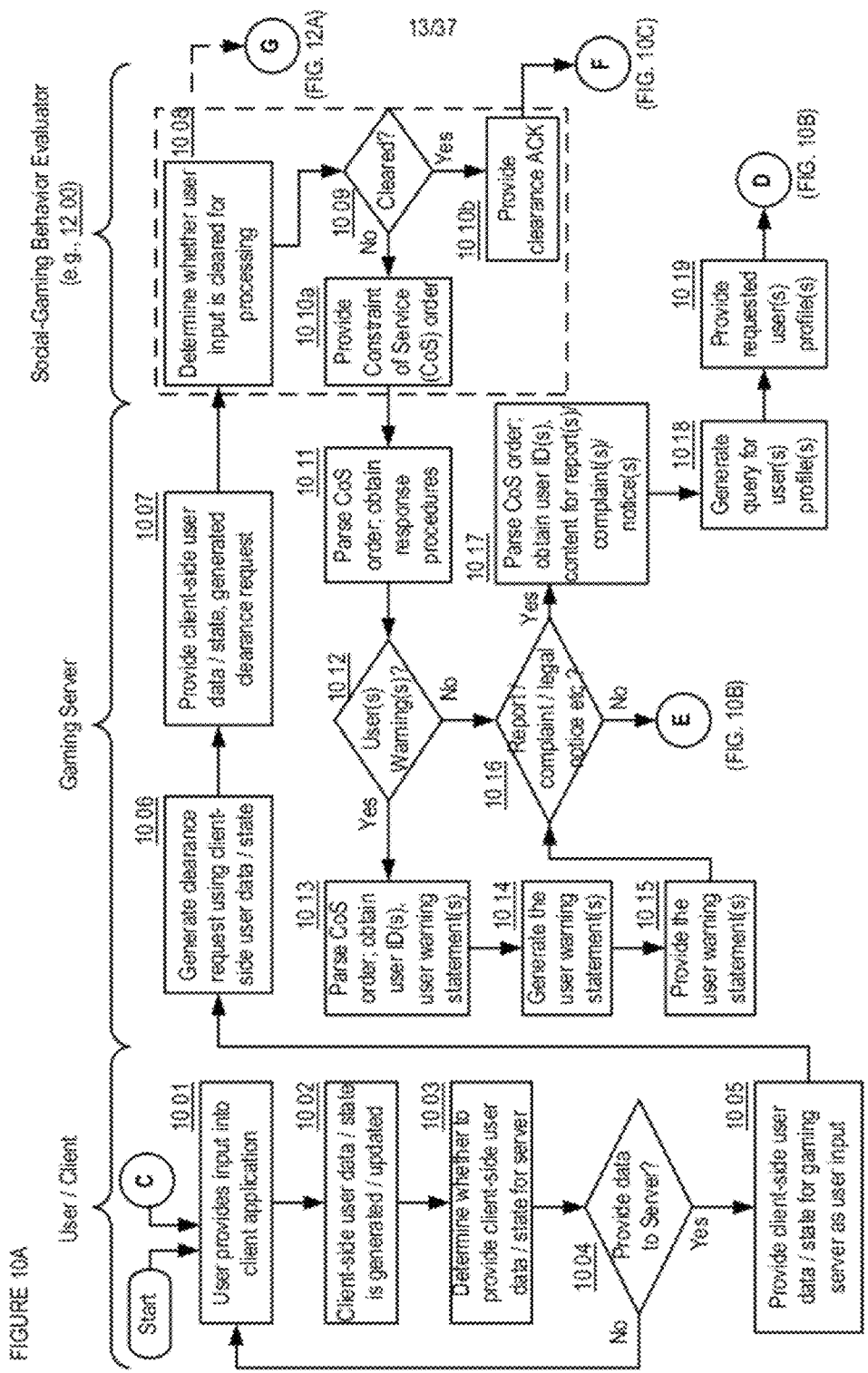

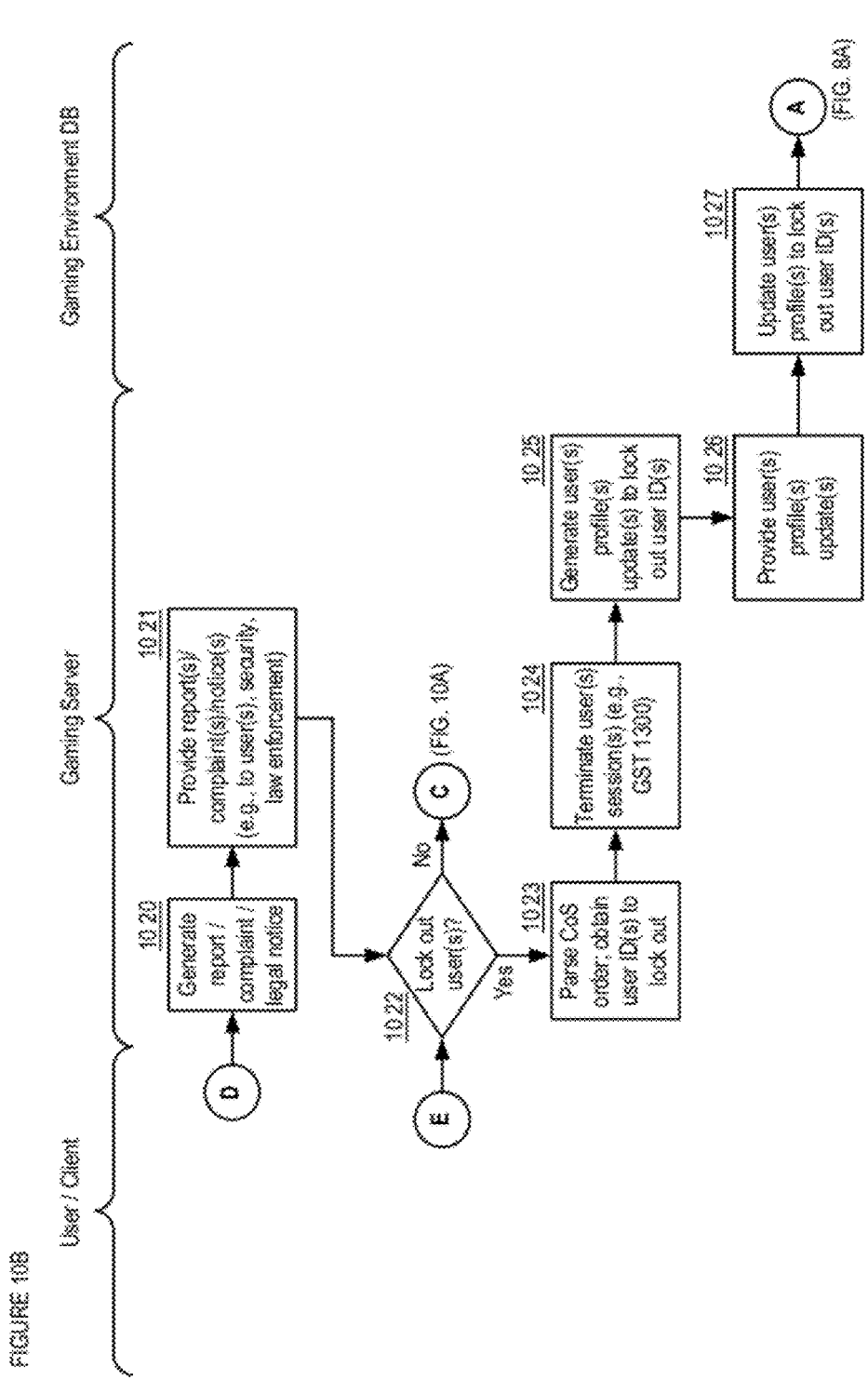

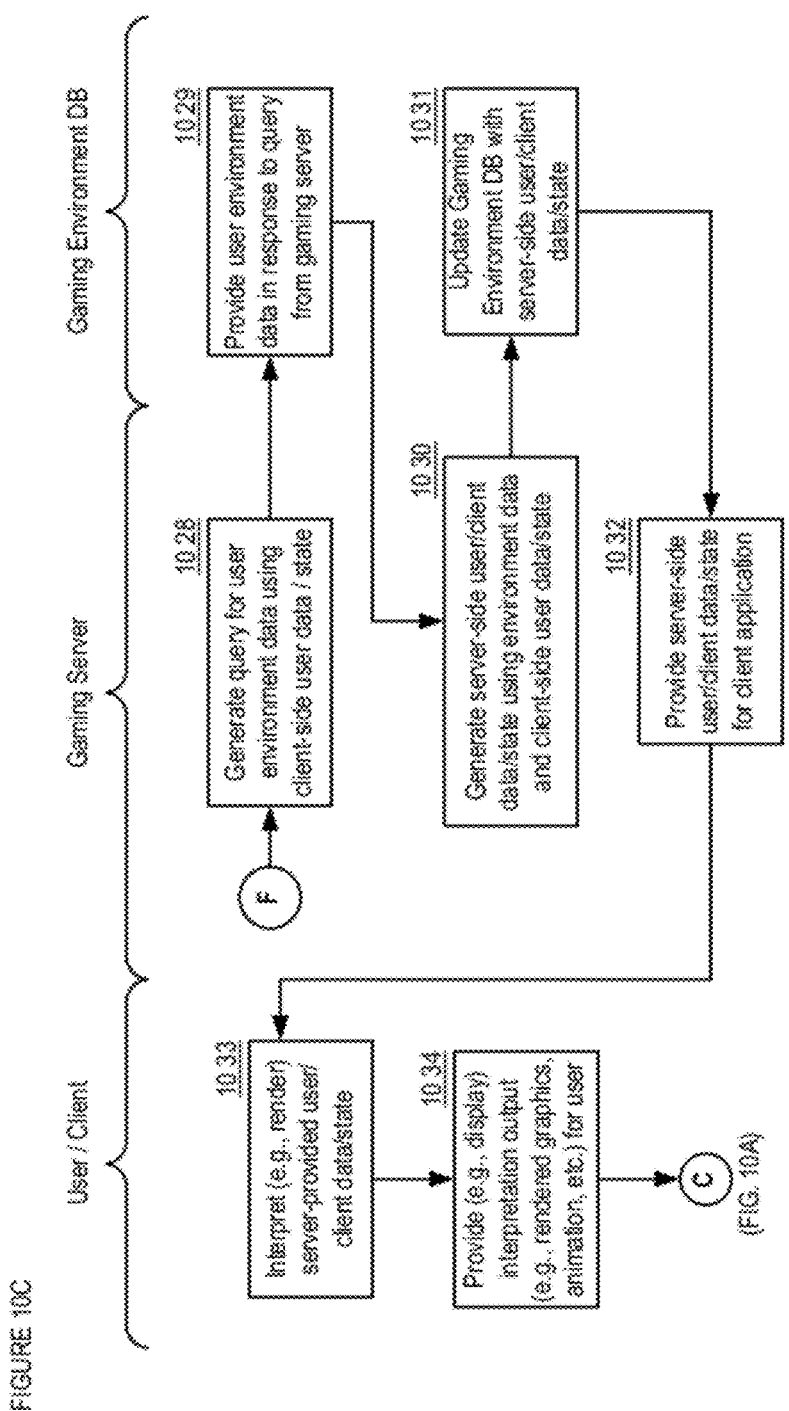

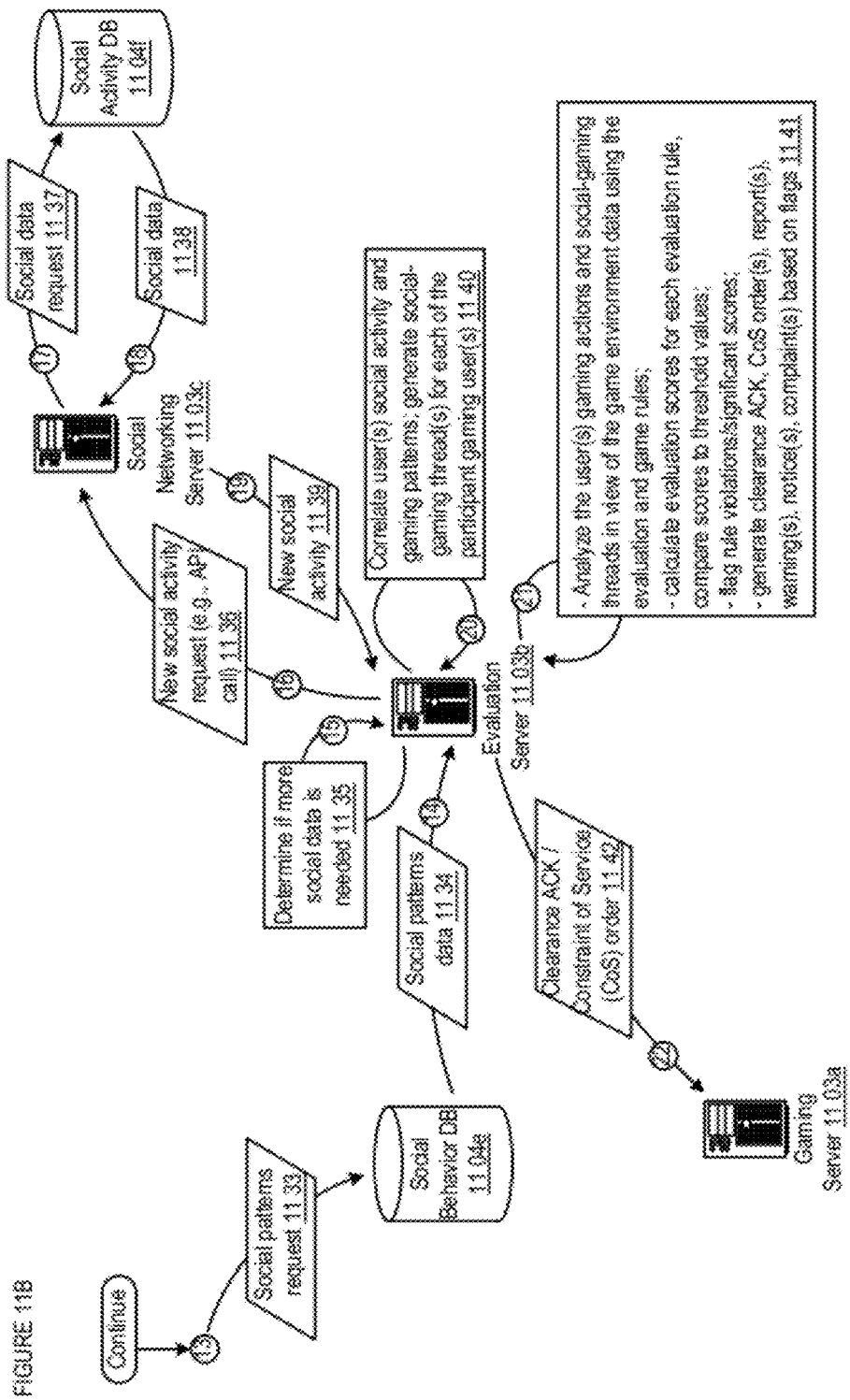

EXAMPLE SOCIAL-GAMING BEHAVIOR EVALUATION (SGBE) COMPONENT 1200

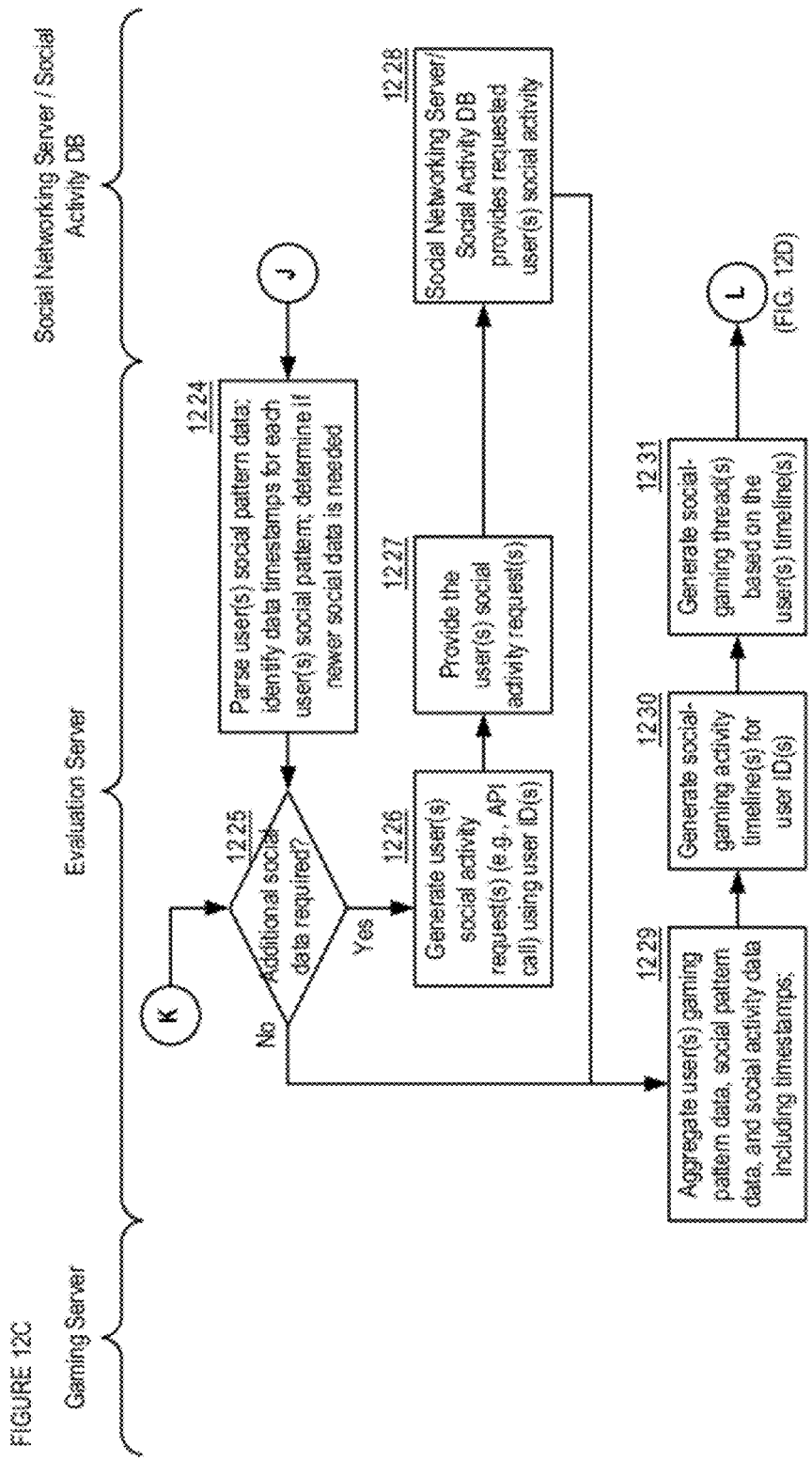

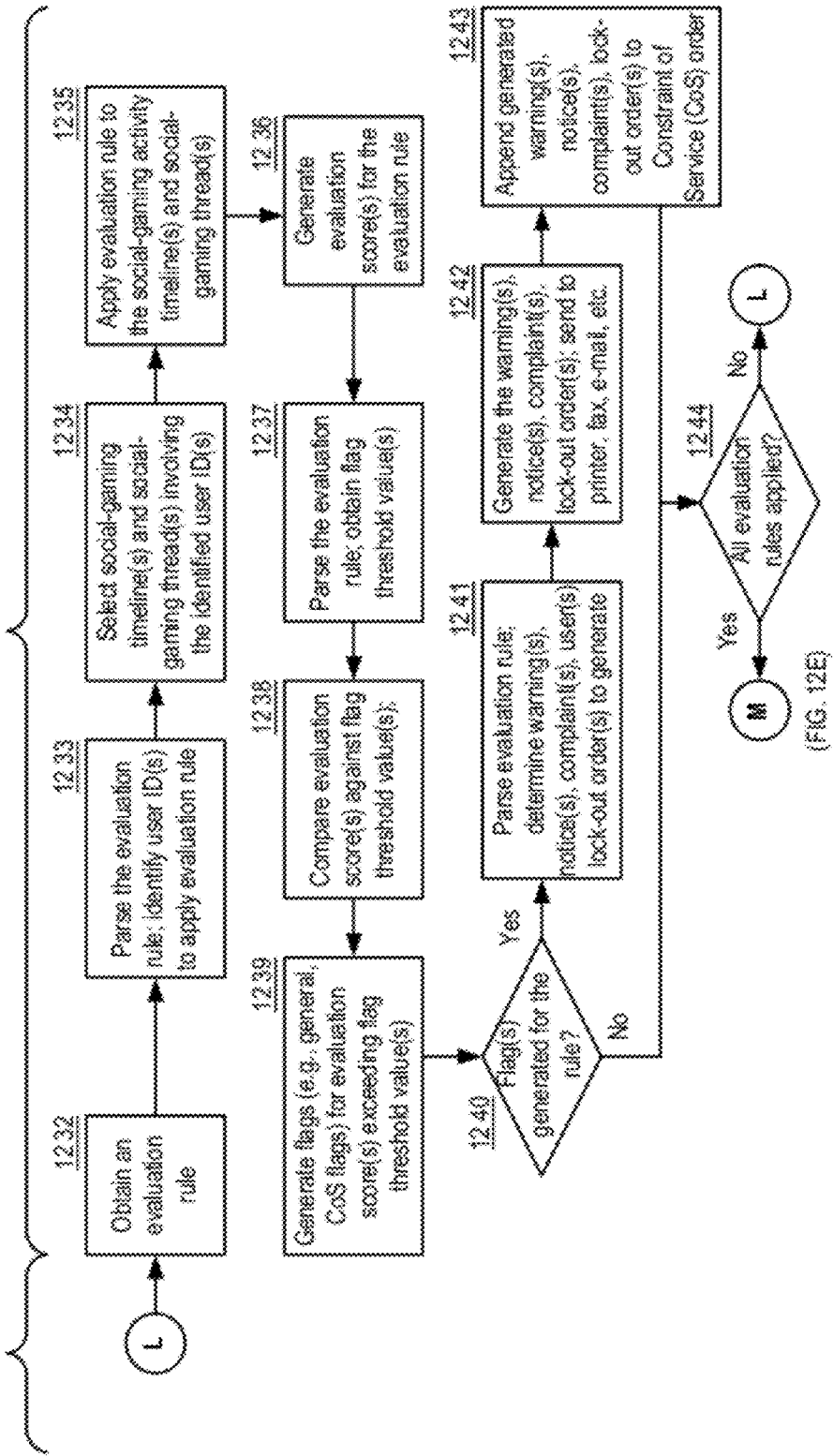

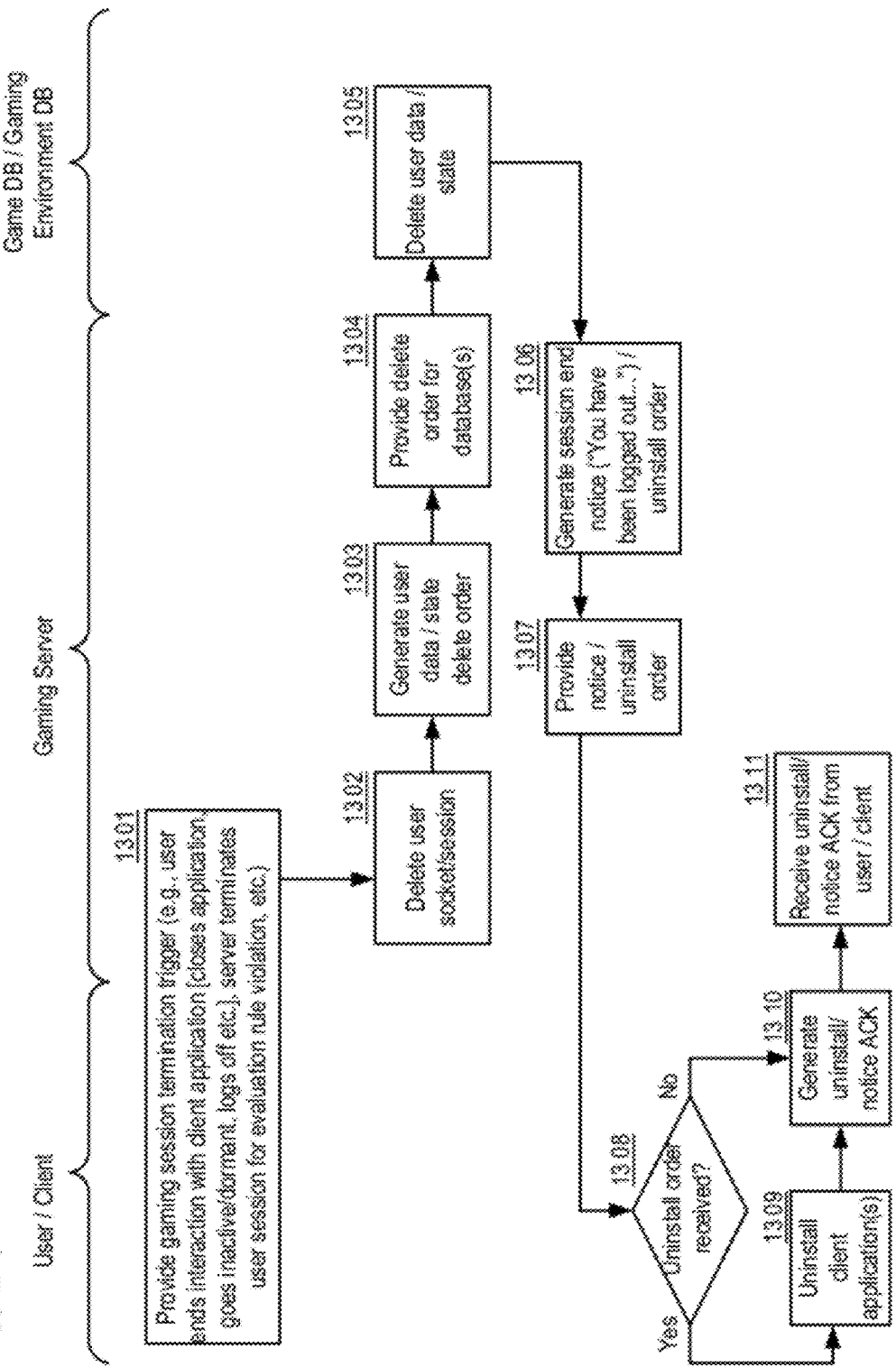

FIGURE 14

| | | | DATA REQUIREMENTS | | | | | OUTPUTS IF RULE FLAGGED | | | |
|---|---|---|---|---|---|---|---|---|---|---|---|
| LABEL | RULE DESCRIPTION | SINGLE/ MULTI-USER | GAME RULES | GAME ENVIRO-NMENT | GAMING PATT-ERN | SOCIAL PATT-ERN | TIME-LINE/ THREAD | USER NOTICE | WARN-ING | COMPL-AINT | USER LOCK-OUT |
| 14.01 | Input boundary circumvention | Single | X | | | | | X | | | |
| 14.02 | Game conditions circumvention | Single / Multi | X | X | | | | X | X | | |
| 14.03 | Illegal user collusion | Multi | X | X | X | X | X | | | X | X |
| 14.04 | User ID misappropriation | Single / Multi | | | X | X | X | | | X | X |

TABLE 1: EXAMPLE VIRTUAL SECURITY CAMERA EVALUATION RULES

FIGURE 16

| LABEL | RULE DESCRIPTION | SINGLE/ MULTI-USER | DATA REQUIREMENTS ||||| OUTPUTS IF RULE FLAGGED ||||
|---|---|---|---|---|---|---|---|---|---|---|---|
| | | | GAME RULES | GAME ENVIRO-NMENT | GAMING PATT-ERN | SOCIAL PATT-ERN | TIME-LINE/ THREAD | CLEAR-ANCE ACK | NOTICE | COMPL-AINT | USER LOCK-OUT |
| 16.01 | VIP identification | Single | | | X | X | | X | X | | |
| 16.02 | Sybil attack detection | Multi | | | X | X | X | | X | X | X |
| 16.03 | Automated request detection | Single / Multi | | | | X | X | | X | | X |
| 16.04 | Fraudulent request detection | Single | | | X | X | X | X | | X | X |
| 16.05 | Reputation evaluation | Single | | | X | X | X | | | | |

TABLE 2: EXAMPLE CUSTOMER SERVICE REQUEST EVALUATION RULES

EXAMPLE PRIORITIZED CUSTOMER SERVICE REQUEST PROCESSING

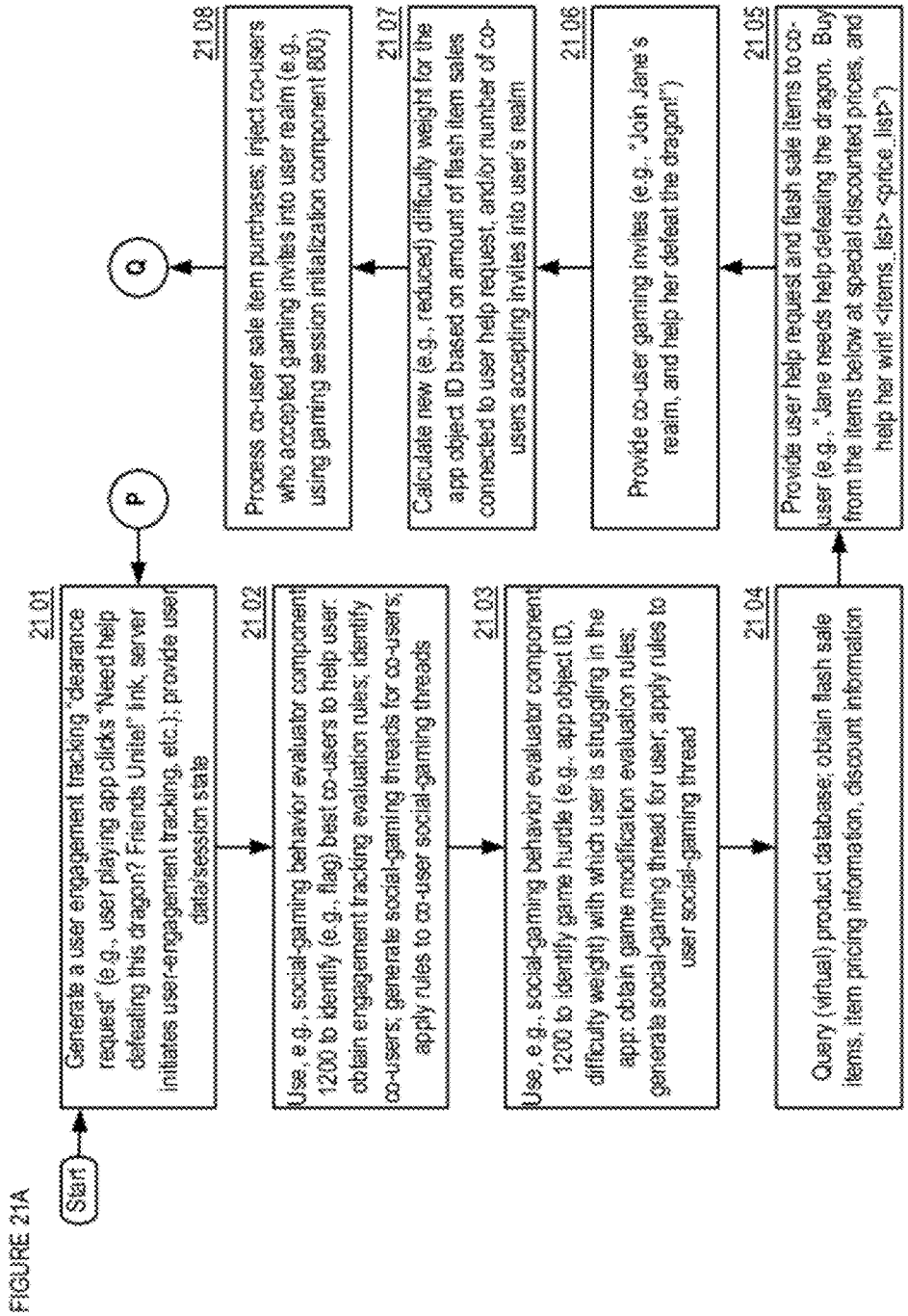

EXAMPLE USER ENGAGEMENT-TRACKING GAME MODIFICATION (U-ETGM) COMPONENT 2100

APPARATUSES, METHODS AND SYSTEMS FOR A LIVE ONLINE GAME TESTER

Applicant hereby claims priority under 35 USC §119 for U.S. provisional patent application Ser. No. 61/247,562 filed Oct. 1, 2009, entitled "Automated Evaluation of Customer Service Requests Related to Online Games and Social Networks"; U.S. provisional patent application Ser. No. 61/247, 560 filed Sep. 30, 2009, entitled "Virtual Security Camera for Electronically Mediated Games"; U.S. provisional patent application Ser. No. 61/277,948 filed Sep. 30, 2009, entitled "Live Testing of Online Games"; and U.S. provisional patent application Ser. No. 61/247,525 filed Sep. 30, 2009, entitled "Engagement Tracking and Game Modification."

This patent document disclosure contains material that is subject to copyright, mask work, and/or other intellectual property protection. The respective owners of such intellectual property have no objection to the facsimile reproduction of the patent document disclosure by anyone as it appears in published Patent Office file/records, but otherwise reserve all rights.

RELATED APPLICATIONS

The instant application is related by subject matter to the following applications: U.S. non-provisional patent application Ser. No. 12/895,749 filed Sep. 30, 2010, entitled "Apparatuses, Methods and Systems for a Virtual Security Camera"; U.S. non-provisional patent application Ser. No. 12/895,731 filed Sep. 30, 2010, entitled "Apparatuses, Methods and Systems for a Customer Service Request Evaluator";and U.S. non-provisional patent application Ser. No. 12/895,774 filed Sep. 30, 2010, entitled "Apparatuses, Methods and Systems for an Engagement-Tracking Game Modifier".

The entire contents of the aforementioned applications are herein expressly incorporated by reference.

FIELD

The present invention is directed generally to apparatuses, methods, and systems for user online behavior monitoring, and more particularly, to APPARATUSES, METHODS AND SYSTEMS FOR A LIVE ONLINE GAME TESTER.

BACKGROUND

Users may interact online with each other using Internet social-gaming applications. Services like social networks allow users to connect and communicate with one another. Such services also allow users to play games with others online. Users impart a great amount of sensitive information in such social networks.

SUMMARY

The APPARATUSES, METHODS AND SYSTEMS FOR AN ONLINE BEHAVIOR MONITOR ("OBM") transform user social-gaming behavioral pattern data via various OBM components into online social-gaming experience customizations.

In one embodiment, to process a virtual security clearance request, the OBM may obtain user online gaming pattern data including gaming actions and their associated timestamps, user online social activities and their associated timestamps; and virtual security clearance evaluation rules. The OBM may generate a social-gaming activity timeline using the gaming actions, social activities and timestamps. By applying the virtual security clearance evaluation rules to the social-gaming activity timeline, the OBM may calculate evaluation scores. The OBM may compare the evaluation scores to the evaluation score thresholds to generate virtual security clearance flags, and may determine whether any virtual security clearance flags were generated based on the comparison. The OBM may, upon determining that no virtual security clearance flags were generated, obtain user online gaming action input and user gaming environment data, and generate updated user gaming environment data using the user online gaming action input.

In one embodiment, upon receiving a customer service request from a user, the OBM may obtain, for processing the customer service request, user social graph data identifying co-users, social networking action identifiers and associated social networking action timestamps; user online gaming action identifiers and associated gaming action timestamps; and customer service request evaluation rules and associated request evaluation score thresholds. The OBM may generate social-gaming activity timelines for the user and the co-users using the gaming action identifiers, social networking action identifiers and timestamps. The OBM may generate a social-gaming activity thread for the user using the social-gaming activity timelines. The OBM may calculate customer service request evaluation rule scores by applying the customer service request evaluation rules to the social-gaming activity thread, and compare each customer service request evaluation rule score to its associated request evaluation score threshold to generate request evaluation flags. The OBM may determine whether to process the customer service request based on whether any request evaluation flags were generated.

In one embodiment, the OBM may provide, in response to a gaming app request from a user, a gaming app including a test game feature for the user. The OBM may obtain user social graph data identifying co-users of the user. The OBM may also obtain: online gaming pattern data for the users and the co-users, including gaming action identifiers and their associated gaming action timestamps; user online social activity data, for the users and the co-users, including social networking action identifiers and their associated social networking action timestamps; and game feature adoption evaluation instructions. The OBM may generate social-gaming activity timelines for the users and the co-users using the gaming action identifiers and the associated gaming action timestamps, as well as the social networking action identifiers and the associated social networking action timestamps. The OBM may also calculate and provide game feature adoption scores by applying the game feature adoption evaluation instructions to the generated social-gaming activity timelines.

In one embodiment, the OBM may generate individual social-gaming activity timelines for a group of users within a geographical region using user online gaming pattern and social activity data. The OBM may calculate individual time-varying activity level graphs for the users, as well as an aggregate activity level graph. The OBM may identify an activity trough in the aggregate activity level graph, and an event in the geographical region corresponding to the activity level trough. Based on keywords corresponding to the event, the OBM may obtain product results from a product database. The OBM may identify a subset of the users whose individual time-varying activity level graphs include an activity level trough during the activity level trough in the aggregate activity level graph, and may provide an advertisement for a product from the product results for the identified subset of the users.

BRIEF DESCRIPTION OF THE DRAWINGS

The accompanying appendices and/or drawings illustrate various non-limiting, example, inventive aspects in accordance with the present disclosure:

FIGS. 6A-B are of block diagrams illustrating examples of suspicious user online social behavior in some embodiments of the OBM;

FIG. 7 is of a data flow diagram illustrating example aspects of initiating a user gaming session with the OBM in some embodiments of the OBM;

FIGS. 8A-B are of logic flow diagrams illustrating example aspects of initiating a user gaming session with the OBM in some embodiments of the OBM, e.g., a gaming session initiation ("GSI") component;

FIGS. 9A-B are of data flow diagrams illustrating example aspects of implementing user gaming interactions with the OBM within a user gaming session in some embodiments of the OBM;

FIGS. 10A-C are of logic flow diagrams illustrating example aspects of implementing user gaming interactions with the OBM within a user gaming session in some embodiments of the OBM, e.g., a user gaming interaction ("UGI") component;

FIGS. 11A-B are of data flow diagrams illustrating example aspects of evaluating a user's online social and/or gaming behavior in some embodiments of the OBM;

FIGS. 12A-E are of logic flow diagrams illustrating example aspects of evaluating a user's online social and/or gaming behavior in some embodiments of the OBM, e.g., a social gaming behavior evaluation ("SGBE") component;

FIG. 13 is of a logic flow diagram illustrating example aspects of terminating a user gaming session with the OBM in some embodiments of the OBM, e.g., a gaming session termination ("GST") component;

FIG. 14 is of a table illustrating example evaluation rules for implementing a virtual security camera using the OBM in some embodiments of the OBM;

FIG. 16 is of a table illustrating example evaluation rules for implementing a customer service request evaluator using the OBM in some embodiments of the OBM;

FIGS. 21A-B are of logic flow diagrams illustrating example aspects of implementing strategic game modification based on tracking engagement of a single user within the OBM in some embodiments of the OBM, e.g., a user engagement-tracking game modification ("U-ETGM") component;

The leading number of each reference number within the drawings indicates the figure in which that reference number is introduced and/or detailed. As such, a detailed discussion of reference number 101 would be found and/or introduced in FIG. 1. Reference number 201 is introduced in FIG. 2, etc.

DETAILED DESCRIPTION

Users exhibit identifiable behavioral characteristics using Internet social-gaming applications. The user behavioral characteristics in Internet social-gaming applications may be affected by the characteristics of the virtual social-gaming environment and the personal characteristics of the users.

Online Behavior Monitor (OBM)

Figure 1:
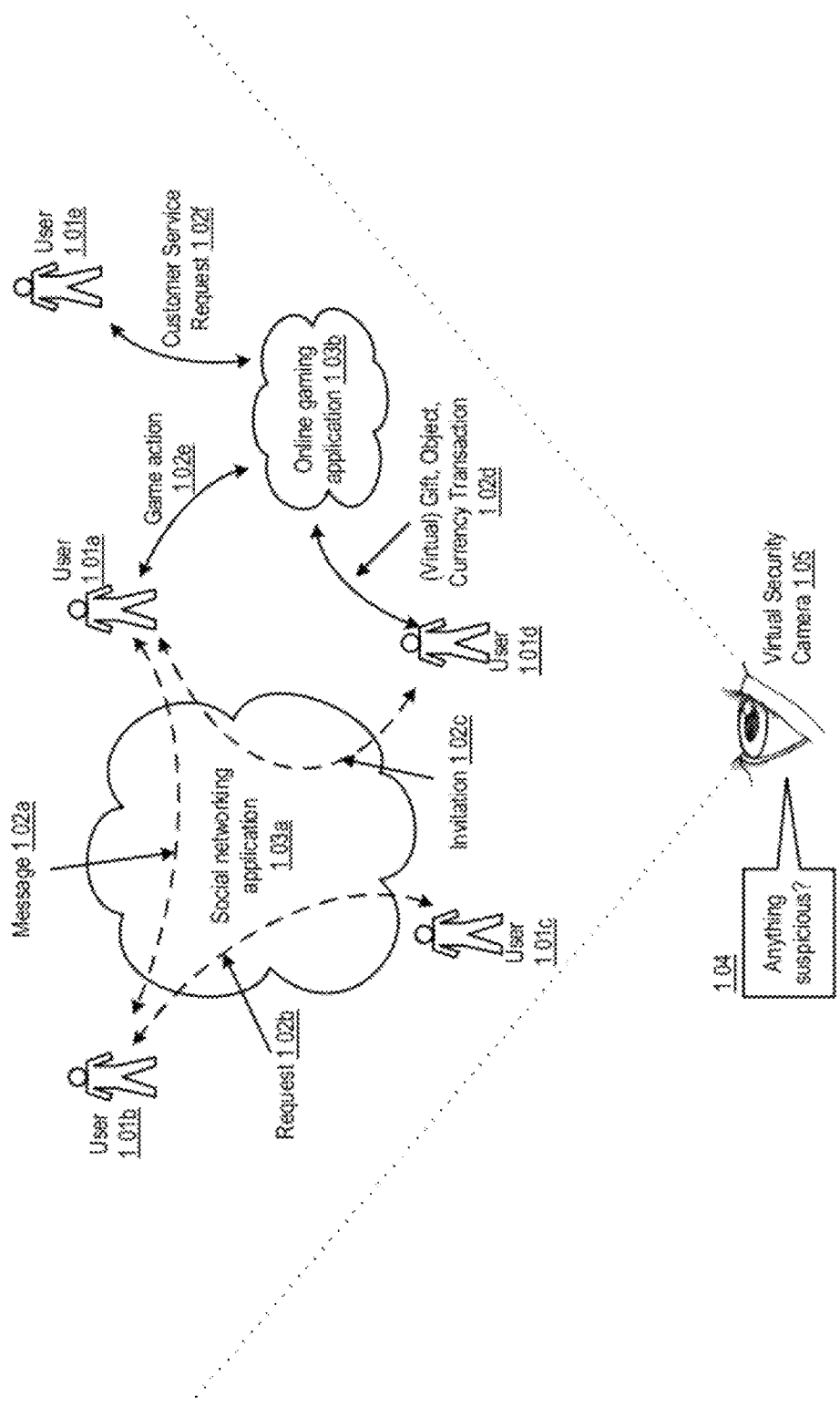
FIG. 1 is of a block diagram illustrating example aspects of a virtual security camera in some embodiments of the OBM.

FIG. 1 is of a block diagram illustrating example aspects of a virtual security camera in some embodiments of the OBM. In some implementations a virtual security camera may monitor the online social and/or gaming activities of users associated with each other via a social graph of a social networking application 103a and/or an online gaming application 103b. For example, the virtual security camera may monitor the social-gaming activities of the users for suspicious activity. For example, a user may send/receive a message 102a, a request 102b, and/or an invitation 102C to another user over a social networking application 103a and a virtual security camera 105 may monitor the request, message, invitation, and/or the like, for suspicious activity and/or behavior. Similarly, in some implementations, a user may be active via an online gaming application 103b by sending/receiving game actions 102e, customer service requests 102f, gift, object, currency transactions 102d, and/or the like. In such implementations, a virtual security camera 105 may assess activity of the user and associated users for suspicious activity and/or behavior.

Figure 2:
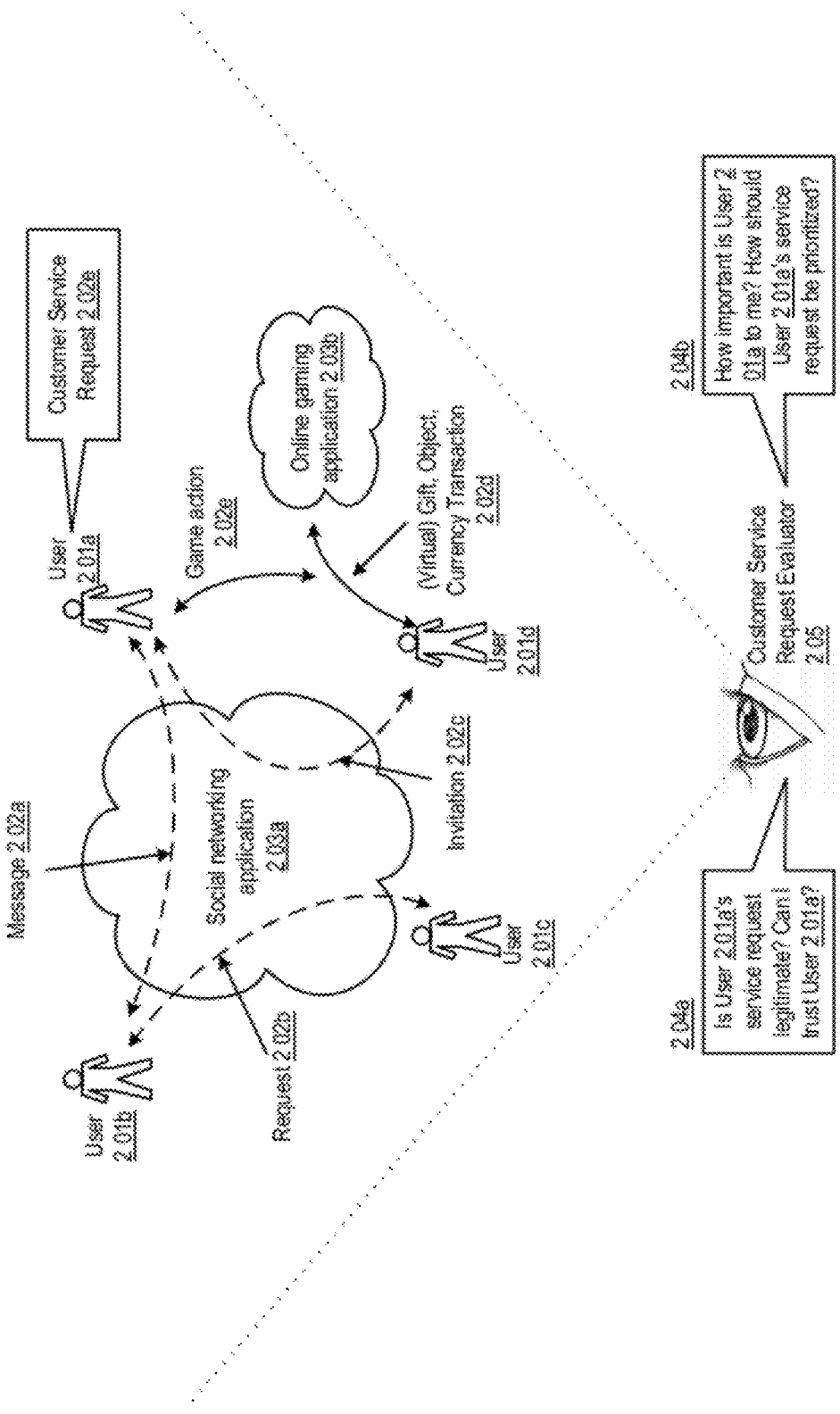
FIG. 2 is of a block diagram illustrating example aspects of a customer service request evaluator in some embodiments of the OBM.

FIG. 2 is of a block diagram illustrating example aspects of a customer service request evaluator in some embodiments of the OBM. In some implementations a customer service request evaluator 205 may monitor the social activity of various users of a social networking application 103a and/or an online gaming application 103b to determine if a user's 201a customer service request 202e is legitimate and/or if the user 201a can be trusted 204a. For example, the customer service request evaluator 205 may determine if the user 201a can be trusted based on the user's observed social activity and/or behavior. For example, a user may send/receive a message 202a, a request 202b, and/or an invitation 202C to another user over a social networking application 203a and a customer service request evaluator 205 may monitor the request, message, invitation, and/or the like, in accordance to the user's customer service request 202e. Similarly, in other implementations, a user 201a may be active via an online gaming application 203b, by sending/receiving game actions 202e, gift, object, currency transactions 202d, and/or the like. In such implementations, a customer service request evaluator 205 may assess the user 201a, the user's activity and associated users (e.g, user 201d, user 201b, etc.) in accordance to the user's customer service request 202e. In other implementations a customer service request evaluator 205 may determine how important a user is 204b, and/or how a user's customer service request 202e should be prioritized 204b based on the user's observed social activity and/or behavior.

Figure 3:
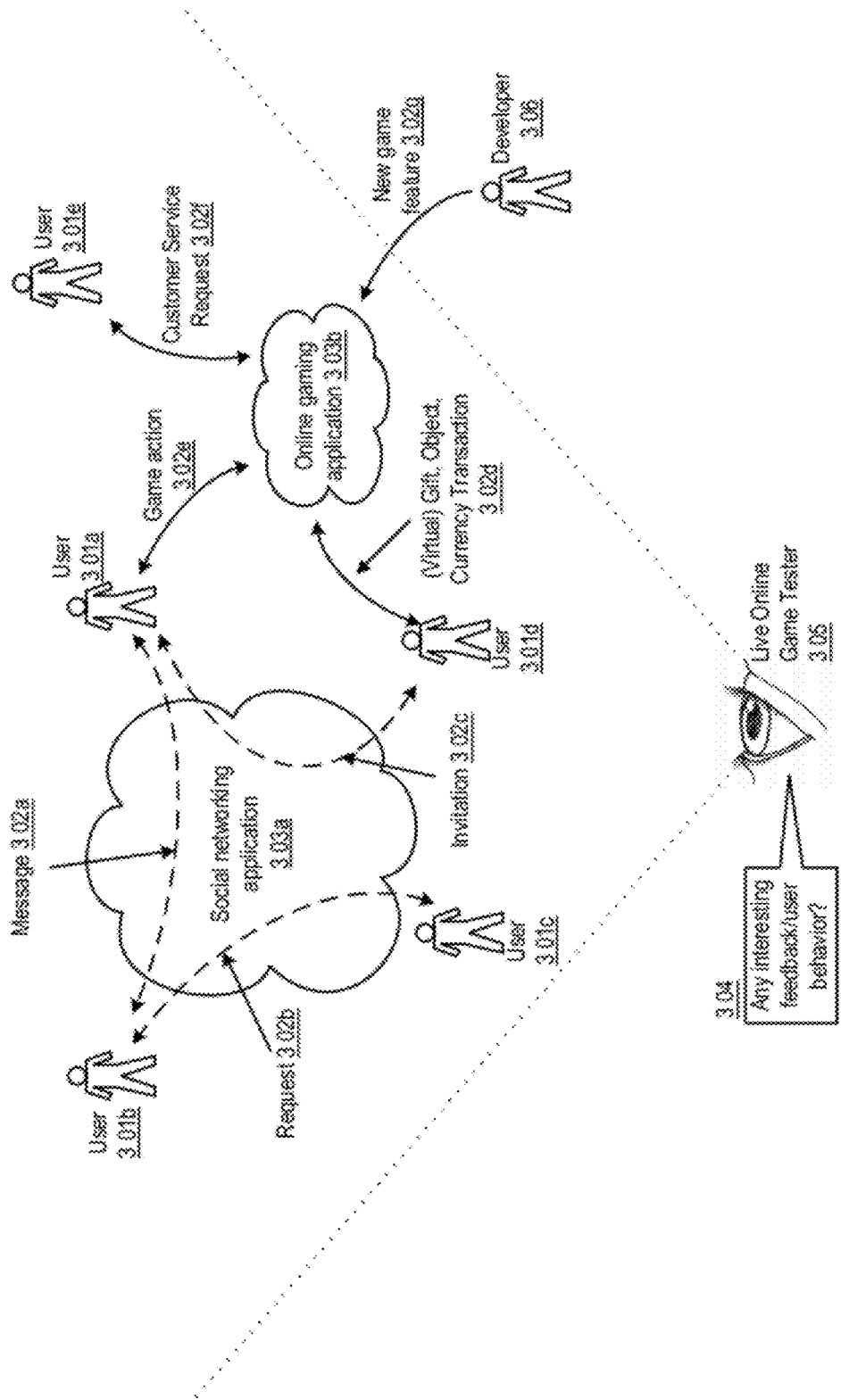
FIG. 3 is of a block diagram illustrating example aspects of a live online game tester in some embodiments of the OBM.

FIG. 3 is of a block diagram illustrating example aspects of a live online game tester in some embodiments of the OBM. In some implementations a developer 306 may wish to introduce a new game feature 302g to an online gaming application 303b and a Live online game tester 305 may observe user activity associated with the online gaming application 304, social networking application 303a, and between one another. In some implementations the Live online game tester 305 may observe what a new game feature 302g allows a user to do. In some implementations the Live online game tester 305 may analyze user activity (e.g., messages, requests, invitations, gift, object, currency transactions, games actions, customer service, request, etc.) for interesting feedback and/or user behavior 304. For example, a user may increase the number of invitations 302c made to other users 301d via a social network application 303a, or, in other examples, a user may increase the number of messages 302a sent to another 301b user regarding the online gaming application 303b after a new game feature's introduction 302g. In some implementations the live online game tester 305 may analyze the impact 304 of the new game feature 302g on the online gaming application 303b. For example the Live online game tester 305 may observe an increase in game actions has taken place between users and an online gaming application 303b since the new game feature's introduction 302g. In another example, the Live online game tester 305 may determine if the content of a customer service requests 302f to an online game application 303b has changed with respect to, for example, historical customer service requests. In some implementations the Live online game tester 305 may observe social networking application activity between users comprising sent/received messages, invitations, requests, etc. related to the introduced new game feature.

Figure 4:
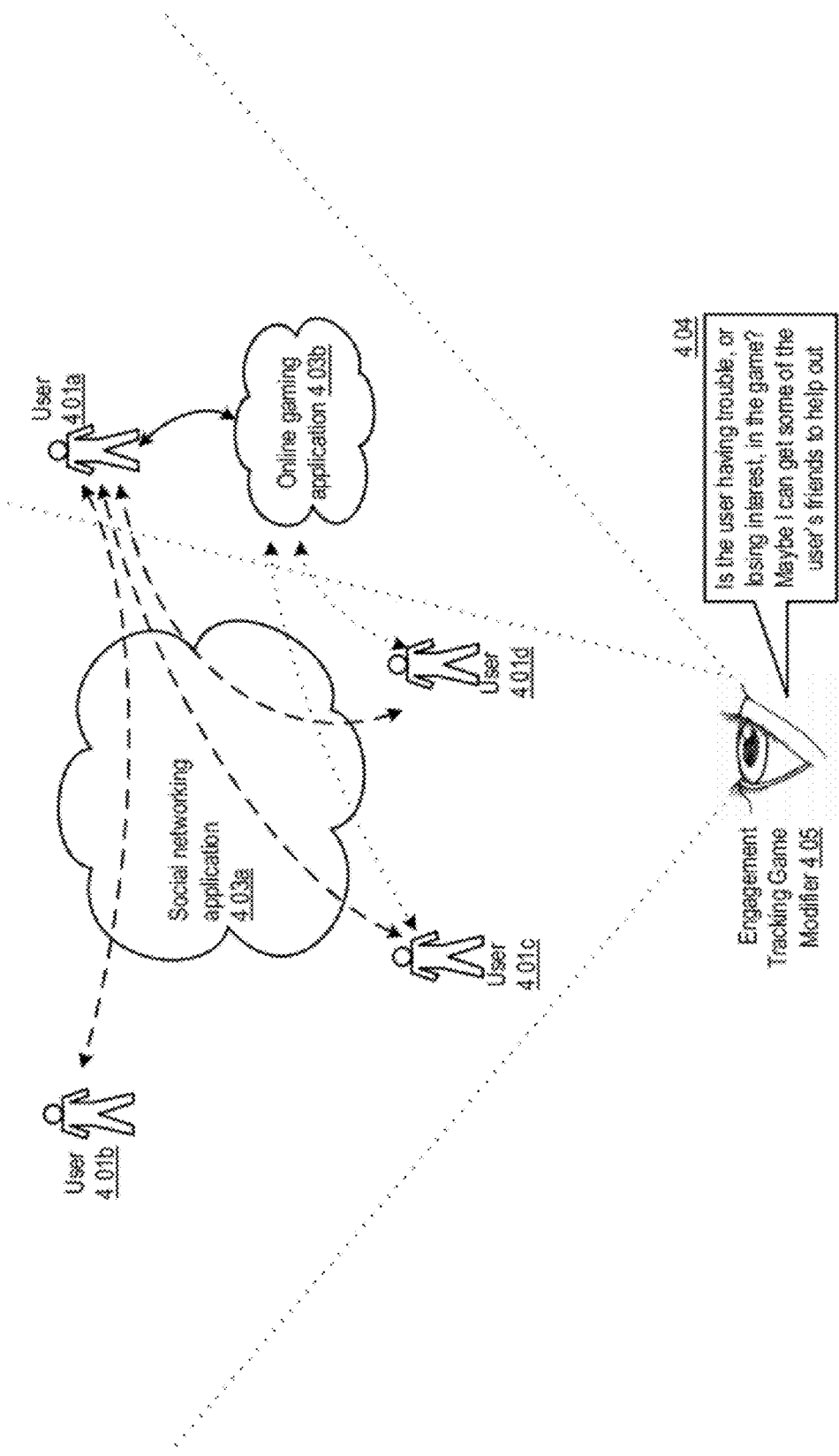
FIG. 4 is of a block diagram illustrating example aspects of an engagement-tracking game modifier in some embodiments of the OBM.

FIG. 4 is of a block diagram illustrating example aspects of an engagement-tracking game modifier in some embodiments of the OBM. In some implementations an engagement tracking game modifier 405 may monitor a user 401a and user's activity with an online gaming application 403b to determine if the user is having trouble with a game or losing interest in a game and may create incentives for other users, associated with the user, to help said user 404. For example, an engagement tracking game modifier 405 may determine user 401a is having trouble with a game by monitoring the user's interactions with the online gaming application and/or social activity with users 401b, users 401c, and user 401d. The engagement tracking game modifier 405 may create and provide incentives to user 401b, user 401c, and user 401d, according to each user's monitored social activity history, relationship with the user 401a, and/or activity with the online gaming application. In some implementations incentives may include credits, discounts, rewards, prizes, game hints, secret game codes, and/or the like. For example, an engagement tracking game modifier 405 may offer entry into a game at a discounted rate to users associated with a user 401a having difficulty with a game. In some implementations the engagement tracking game modifier 405 may provide additional incentives to the assisting users once they've successfully helped the user 401a. For example, users may be offered a discount on future online gaming application 403b items once they succeed in helping the user 401a resolve his/her difficulty (e.g., defeating a dragon, building a city, finding a treasure chest, etc.).

Figure 5:
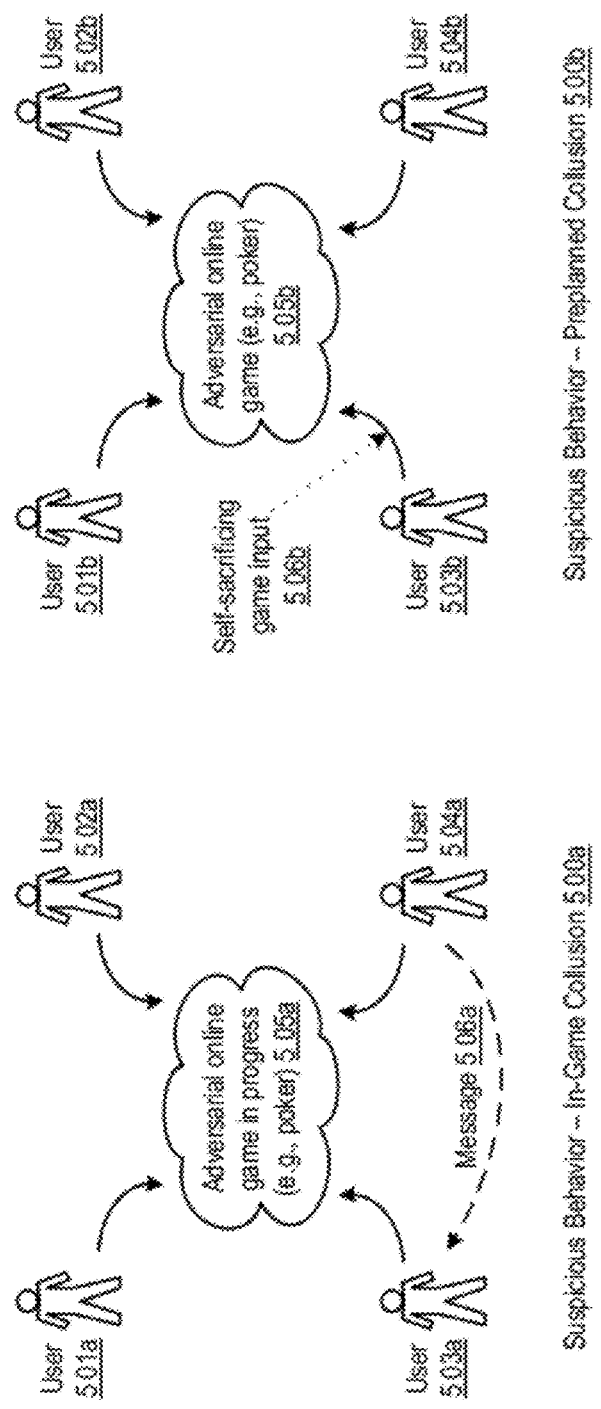
FIG. 5 is of a block diagram illustrating examples of suspicious user online gaming behavior in some embodiments of the OBM.

FIG. 5 is of a block diagram illustrating examples of suspicious user online gaming behavior in some embodiments of the OBM. Some examples of suspicious online gaming behavior may include in-game collusions 500a or preplanned collusions 500b. In in-game collusions a number of users collaborate while an adversarial online game is in progress 505a. These users may communicate with one another in a variety of ways, one way including sending messages 506a to one another. The nature of these messages may be monitored by some embodiments of the OBM to determine suspicious behavior. For example out of a number of users involved in an adversarial game (e.g., poker) a user 504s may send a message 506a to user 503a describing sensitive/privileged information (e.g., poker hand). In another example, a user 504a may propose to user 504a a deal of some kind, one that may for example be used to leverage against the excluded users (e.g., user 501a, user 502a, etc.). In some other implementations, the instance of a kind of messaging 506a between one or more users involved in an adversarial online game may be monitored by some embodiments of the OBM and determined to be suspicious and/or classified as in-game collusion 500a. In some implementations, preplanned collusions include a user or group of users that produce self-sacrificing game inputs during an adversarial online game 505b. For example a user 503b may participate in a game 505b and enter game inputs 506b that instantly and/or consecutively damage the winning potential of the user 503b and may or may not enhance the winning probability of another user (e.g., user 501b, user 502b, user 504b, etc.). In another example, a user 503b enters a poker game 505b with a significant pot and bets the entire pot on a statistically weak hand 506b. Some implementations may monitor this input 506b by the user 503b and instantly classify the act as suspicious.

Figure 6A:
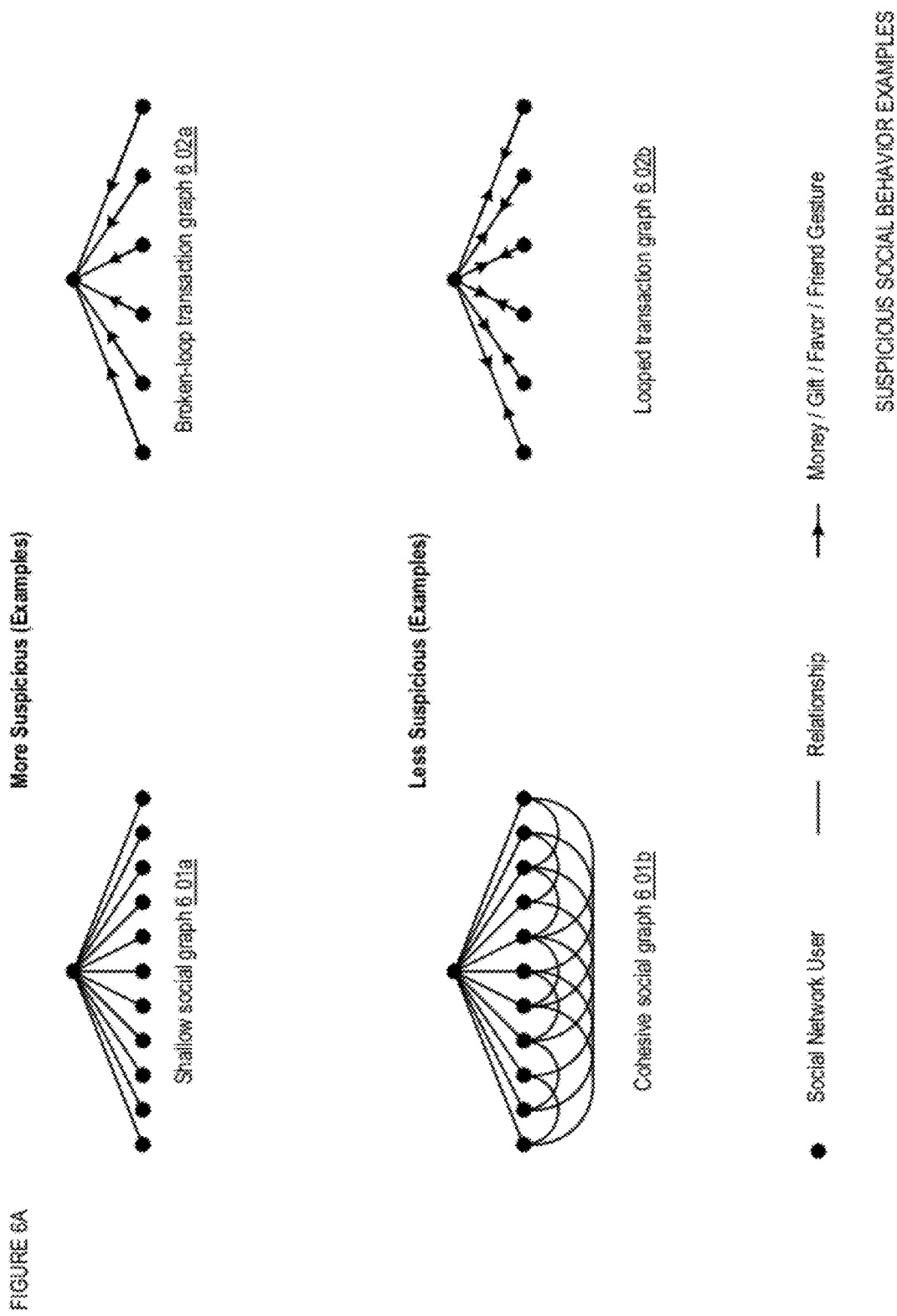

FIGS. 6A-B are of block diagrams illustrating examples of suspicious user online social behavior in some embodiments of the OBM. In FIG. 6A each node represents a social network user, each line represents a relationship between a user and another user, and each arrow represents an open or closed social loop which includes a transaction (e.g., money, gift, favor, friend gesture, and/or the like). The direction of the arrow shows a direction of a transaction (e.g., a gift sent from a user and received by another user, etc.). An closed social loop includes one arrow, whereas a open social loop includes two arrows in opposing directions.

In some implementations examples of suspicious user online social behavior may be represented by a social graph or a transaction graph. More suspicious user online social behavior, shown in some examples by a shallow social graph 601a, may include a user with numerous friends where none of the user's friends have a relationship with one another. In contrast, a cohesive social graph exemplifies less suspicious online social behavior and shows a user with numerous friends, all of whom possess some relationship with another. For example, a user's friends may belong to similar groups, exchange messages with another, and/or the like. In these examples a user's friends may be connected with one another by various degrees of separation. In other implementations, the number of interconnected relationships between a user and a user's friends may affect the level of suspicion associated with the user's online social behavior. In other implementations the types of relationships between a user and/or user's friends may affect the level of suspicion associated with the user.

In other implementations examples of more suspicious user online social behavior may be shown in a broken-loop transaction graph 602*a*. In a broken-loop transaction graph 602*a* a user is on the receiving end of multiple closed social loops. For example, a highly suspicious example of user online behavior may include a user receiving dozens of gift transactions from other various users. Further to the previous example, in other implementations, a user's online social behavior may be even more suspicious if none of the users sending a gift to the user have a relationship with one another 601*a*. In contrast, a looped transaction graph 602*b* shows less suspicious user online social behavior. In a looped transaction graph 602*b* a user may be involved in numerous open social loops. For example, a user may receive various favors from other users and in response may send gifts and/or friend gestures to each one of those users. Some of these graphs may be discerned by examining users' friend lists and building link topologies/graphs. In one embodiment, a users' direct friends may be traversed to discern if they each in turn have additional friends. Friends that do not further have their own friends may then be counted as having negative values (e.g., −1), while friends that in turn have friends, and in turn have other friends, may be given positive values (e.g., +1) for each recurring leg. A total count may be developed, and thresholds (e.g., total values greater than 0) may be used to mark a graph as suspicious.

In FIG. 6B suspicious social behavior examples are shown according to a user's location according to a gaming/social networking service, a user's social activity. For example, in a less suspicious example a user may transmit a number of messages to a social networking service, one of which indicating they are leaving for Europe in a few days 603*a*. After a few days 606*b*, the user accesses the social network through a server in Europe 608*a* and submits an image of themselves to the social network service 604*a*. In other implementations more suspicious social behavior may include abrupt and/or unannounced changes in a user's social activity patterns. For example, a user may access a social networking service in South America 607*b* at 3 PM Pacific Standard Time 606*a* and then, at 6 PM Pacific Standard Time 606*c*, the user accesses the social network in another part of the world (e.g., Australia, etc.).

FIG. 7 is of a data flow diagram illustrating example aspects of initiating a user gaming session with the OBM in some embodiments of the OBM. In some implementations, a user 701 may wish to interact with a social gaming network, e.g., OBM. The user may utilize a client device, e.g., 702, to interact with the social gaming network. For example, the user may provide input, e.g., 721 into the client device. In various implementations, the user input may include, but not be limited to: keyboard entry, mouse clicks, depressing buttons on a joystick/game console, voice commands, single/multi-touch gestures on a touch-sensitive interface, touching user interface elements on a touch-sensitive display, and/or the like. The client may communicate with the social gaming network, and may provide output, e.g., 729 for the user. For example, the client may provide output including, but not limited to: sounds, music, audio, video, images, tactile feedback, vibration alerts (e.g., on vibration-capable client devices such as a smartphone etc.), and/or the like.

In some implementations, the user may provide input, e.g., 721, to the client device indicating that the user desires to utilize an application (e.g., a game) provided by the social gaming network. In response, the client may generate a gaming app request, and provide the gaming app request, e.g., 722 to an OBM server, e.g., gaming server 703*a*. For example, a browser application executing on the client may provide, on behalf of the user, a (Secure) Hypertext Transfer Protocol ("HTTP(S)") GET message for a HyperText Markup Language ("HTML") page, wherein the HTML page includes JavaScript™ commands to embed an Adobe® Flash object including an application for the user in the HTML page. An exemplary HTTP(S) GET message that may be provided by a browser executing on the client to request an HTML page is provided below:

```
GET /mafiawars.html HTTP /1.1
From: username@appserver.com
Host: www.appserver.com
User-Agent: Mozilla/4.0
```

In response to the app request, the OBM may identify a gaming server to which to redirect the gaming app request received from the client. Upon identifying the gaming server to process the user's request, the OBM may provide a user session request to the identified gaming server. For example, the server receiving the user app request may provide a HTTP(S) POST message requesting acknowledgment from the identified gaming server that it will process the user's gaming app request. For example, the HTTP(S) POST message may include in its message body the user ID, client IP address etc., and a request for user session acknowledgment. An exemplary user session request HTTP(S) POST message, including user session request details encoded in the eXtensible Markup Language ("XML") format, is provided below:

```
POST /useradd.php HTTP/1.1
Host: gs1.appserver.com
Content-Type: Application/XML
Content-Length: 229
<?XML version = "1.0" encoding = "UTF-8"?>
<user_session_request>
   <request_id>AJFY54</request_id>
   <timestamp>2010-05-23 21:44:12</timestamp>
   <user_ID>username@appserver.com</user_ID>
   <client_IP>275.37.57.98</client_IP>
</user_session_request>
```

The identified gaming server may receive the server's user session request, and may provide a user session acknowledgment to the server. For example, the gaming server may provide a HTTP(S) POST message confirming the user ID, client IP address, etc., and providing an acknowledgment message in the body of the HTTP(S) POST message. An exemplary user session acknowledgment HTTP(S) POST message including user session acknowledgment is provided below:

```
POST /useraddack.php HTTP/1.1
Host: www.appserver.com
Content-Type: Application/XML
Content-Length: 267
<?XML version = "1.0" encoding = "UTF-8"?>
<user_session_acknowledgment>
```

```
<request_id>AJFY54</request_id>
<ack_id>AJFY541</ack_id>
<timestamp>2010-05-23 21:47:32</timestamp>
<user_ID>username@appserver.com</user_ID>
<client_IP>275.37.57.98</client_IP>
</user_session_acknowledgment>
```

In some implementations, upon receiving the gaming server's user session acknowledgment, the server receiving the user's app request may provide a URL redirection message to the client. The URL redirection message may include a Uniform Resource Locator ("URL") of the identified gaming server, and may indicate to the client that the client redirect the gaming app request to the identified gaming server. For example, with reference to the exemplary HTTP(S) GET gaming app request message provided by the client, the load balancing server may respond by providing a HTTP(S) REDIRECT 300 message, similar to the exemplary message provided below:

```
HTTP/1.1 300 Multiple Choices
Location: http://gs1.appserver.com/mafiawars.html
<html>
<head>
<title>300 Multiple Choices</title>
</head>
<body>
<h1>Multiple Choices</h1>
</body>
</html>
```

Upon receiving the URL redirection message, the client may provide the gaming app request 722 (e.g., similar to the gaming app request first sent to the OBM) to the identified gaming server. In response the gaming server may generate a gaming app query (e.g., 723) for a gaming app, e.g., 725, and provide the gaming app query (e.g., 724) to a game database, e.g., 704*a*. In response, the game database may provide the gaming app (e.g., an Adobe® Flash object) to the gaming server. For example, the gaming server may execute a PHP script including SQL commands to query the game database and obtain the gaming app. An exemplary listing, written substantially in the form of PHP/SQL commands, illustrating substantive aspects of querying the game database for the gaming app is provided below:

```
<?PHP
header('Content-Type: text/plain');
function app_query($appname, $DBserver, $password) {
mysql_connect("204.192.85.202",$DBserver,$password); //
access database server
mysql_select_db("APPS.SQL"); // select database table to search
//create query for requested client-side gaming application
$query = "SELECT client_app FROM AppTable WHERE apptitle LIKE
'%' $appname";
$result = mysql_query($query); // perform the search query
mysql_close("APPS.SQL"); // close database access
return $result; // return search results
?>
```

In some implementations, the gaming server may create a new instance of a user session, e.g., 726, for the user utilizing the app (e.g., create a data structure in memory storing a game state of the app for the user), and store the initialized user state data structure in the gaming environment database, e.g., 727. The gaming server may then provide the client with the app, e.g., 728, for presentation to the user. For example, the gaming server may provide a HTML page including a reference to an Adobe® Flash object (including a user application, e.g., 728) stored on the gaming server. An exemplary HTML code listing including JavaScript™ commands referencing an Adobe® Flash object within the HTML page is provided below:

```
<html>
<div id="GameStage">
  If you're seeing this, you don't have Flash Player installed.
</div>
<script type="text/javascript">
  var app =
  new SWFObject("http://gs1.appserver.com/apps/mafiawars.swf",
  "Media", "640", "480", "8", "#000000");
  app.addParam("quality", "high");
  app.write("GameStage");
</script>
</html>
```

Upon obtaining the app, the client device may execute the app for presentation to the user, e.g., 729. For example, with reference to the examples above, a web browser executing on the client device may render the HTML web page and may communicate with the gaming server to download the Adobe® Flash object. An Adobe® Flash browser plug-in installed on the client device and operating in conjunction with the browser may play/execute the downloaded Flash object for presentation to the user.

FIGS. 8A-B are of logic flow diagrams illustrating example aspects of initiating a user gaming session with the OBM in some embodiments of the OBM, e.g., a gaming session initiation ("GSI") component 800. In some implementations, a user and/or client may generate a request, e.g., 801, to join a multi-user network application (e.g., a massively multiplayer online game). The client may provide the generated request 802 for an app for a server (e.g., gaming server). For example, a web browser executing on the client may provide a HTTP(S) GET message requesting a HTML page including JavaScript™ commands to embed an Adobe® Flash object including the application for the user in the HTML page, as illustrated in the example provided with reference to FIG. 7. The server receiving the app request may determine that user credentials are required in order to determine whether the user is authenticated to use the app. The server may provide a mechanism for the user to provide the requested credentials. For example, in some implementations, the server may provide an HTML page with an input form for the user to provide user credentials, and request user credentials. The user may input the user credentials into the HTML input form, and press a submit button included in the HTML form. Upon pressing the submit button, the web browser of the client device may generate a HTTP(S) POST message including the user-provided form inputs for the server. As another example, in some implementations, the server may provide an Adobe® Flash object including ActionScript™ 3.0 commands to request the user to provide user credentials by entering the credentials into input text fields included in the Adobe® Flash object, and may provide the user-entered credentials for a server via a HTTP(S) POST message to the server.

Upon obtaining the user credentials, the server may query a user profile database to determine whether the user is authenticated to use the app. For example, the server may implement a PHP script including commands to query a user profile database for user authentication details, and may compare the authentication details obtained via querying the database with the user-entered credentials. If the user is authenticated (e.g., 804, option "Yes"), the gaming server may query, e.g., 806, a game database for an app to provide for the user, based on the details of the user's app request. The server may provide, e.g., 807, the retrieved app for the user to the client device, using e.g., an IP address for the client device included in the app request message originally provided by the user. The client, upon obtaining the app may execute, if required (e.g., 811, Option "Yes"), any installation procedures, e.g., 812, required to install the app on the client device. The client may then interpret an initial session state as provided by the app, e.g., 813, (e.g., execute the instructions provided by the app), and render a display for the user, e.g., 814, via a display device of the user. For example, the client may obtain a Shockwave Flash (*.swf) object from the server, and may invoke an Adobe® Flash web browser plug-in to process and display the *.swf object for the user.

In some implementations, the client device and gaming server may generate a session, e.g., 808, for the user/client to facilitate (secure) communications between the client and the server. For example, an Adobe® Flash object running within a browser environment on the client may include ActionScript™ 3.0 commands to create a Secure Sockets Layer ("SSL") connection with a server, e.g., 809, and the server may be implementing a PHP script implementing a SSL socket server which listens to incoming communications on a server port to which the client device sends data, as described previously. Upon generating the session with the client, the gaming server may provide, e.g., 810, (e.g., using PHP/SQL commands such as described in the example above) the details of the session to a gaming environment database, including, but not limited to: gaming server ID, user ID, user name, app name, app ID, socket ID, socket expiry time, socket bandwidth, communication protocols, security protocols, communication priority level, and/or the like. Upon receiving the session details, the gaming environment database may store the session details for later use.

Figure 9A:
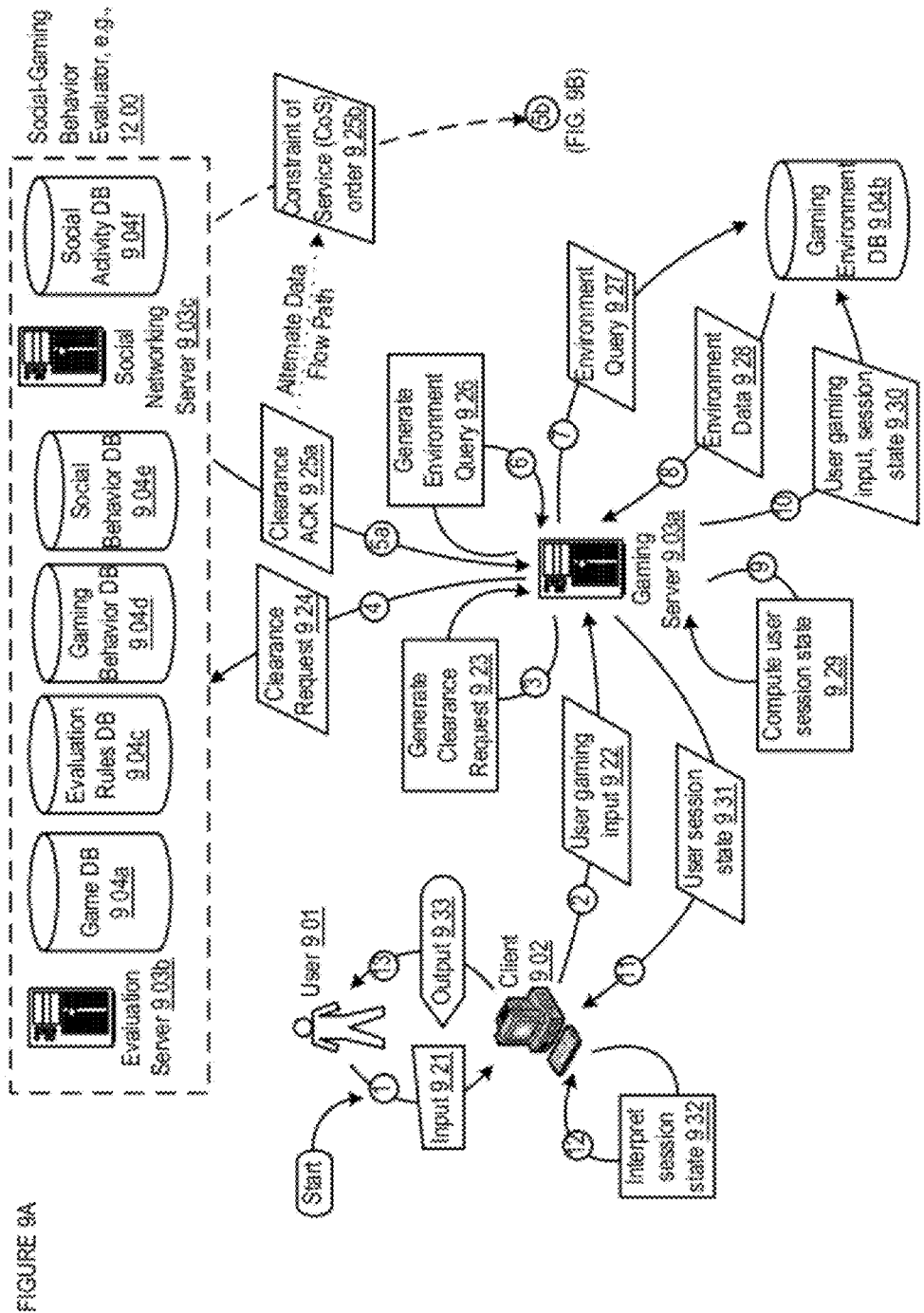

FIGS. 9A-B are of data flow diagrams illustrating example aspects of implementing user gaming interactions with the OBM within a user gaming session in some embodiments of the OBM. In some implementations, the app may include interactive features, and may allow the user to provide user input/feedback, e.g. 921, via a variety of mechanisms (e.g., keyboard entry into a command-line interface, mouse input in a graphical user interface, gestures on a touch-sensitive interface, voice commands, etc.). In some implementations, the client device executing the app may generate, maintain, update and/or store data pertaining to the user's interaction with the app (e.g., an app state, an app data structure, a block of memory with data variables, a Flash movie clip, etc.). For example, the app may store a data structure encoded according to the JavaScript Object Notation ("JSON") format. An exemplary JSON-encoded data structure is provided below:

```
"app_data"
{
"app_id": "A236269",
"app_name": "poker",
"player_id": "jqpublic",
"player_name": "John Q. Public",
"game_id": "AHWJ20100630",
"md5_auth": "f585e3efede0c3b400b25908f8fa3f6d",
"player_action": {
        "timestamp": "2010-06-30 09:23:47",
        "action_type": "raise",
```

-continued

```
        "action_amount": "50.00",
        "action_source": "credit card 1"
        }
}
```

In some implementations, the gaming server may generate a secure communications session with the client in order to facilitate communication during the user gaming experience between the client and gaming server. As an example, the app may provide data stored on the client device for the gaming server as user game input, e.g., 922. For example, an Adobe® Flash object running on the client may include ActionScript™ 3.0 commands to create a Secure Sockets Layer ("SSL") connection with a server, generate a message including a JSON-encoded data structure such as illustrated in the example above, and send the message via the secure SSL connection to the server. Exemplary commands, written substantially in the form of ActionScript™ 3.0, to create a secure SSL connection to a server, load data from a locally stored JSON-encoded data file, and send a message including the JSON-encoded data via the SSL connection to the server, are provided below:

```
// import required packages
import flash.events.*;
import flash.net.socket;
import flash.net.URLLoader;
import flash.net.URLRequest;
import com.adobe.serialization.json.*;
// obtain server socket policy file, create socket connection to server port
system.security.loadPolicyFile("xmlsocket://gs1.appserver.com:208");
msg = new socket( );
msg.connect("https://gs1.appserver.com", 255);
// load data as text string from .json file
var loader:URLLoader = new URLLoader( );
var request:URLRequst = new URLRequest( );
request.URL = "data.json";
loader.dataformat = "text"
loader.load(request)
// transmit data to server via secure SSL connection, then close socket
msg.writeMultiByte(loader.data, "UTF-8");
msg.close( );
```

In some implementations, the gaming server may be executing a PHP script implementing a Secure Sockets Layer ("SSL") socket server which listens to incoming communications on a server port to which the client device may send data, e.g., data encoded according to the JavaScript Object Notation ("JSON") format. Upon identifying an incoming communication, the PHP script may read the incoming message from the client device, parse the received JSON-encoded text data to extract information from the JSON-encoded text data into PHP script variables, and store the data (e.g., user gaming input, user session state 930) and/or extracted information in a relational database accessible using the Structured Query Language ("SQL"). An exemplary listing, written substantially in the form of PHP/SQL commands, to accept JSON-encoded game input data from a client device via a SSL connection, parse the data to extract variables, and store the data to a database, is provided below:

```
<?PHP
header('Content-Type: text/plain');
// set ip address and port to listen to for incoming data
$address = '192.168.0.100';
```

-continued

```
$port = 255;
// create a server-side SSL socket, listen for/accept incoming
communication
$sock = socket_create(AF_INET, SOCK_STREAM, 0);
socket_bind($sock, $address, $port) or die('Could not bind
to address');
socket_listen($sock);
$client = socket_accept($sock);
// read input data from client device in 1024 byte blocks until end
of message
do {
   $input = " ";
   $input = socket_read($client, 1024);
   $data .= $input;
} while($input != " ");
// parse data to extract variables
$obj = json_decode($data, true);
// store gaming input data in a gaming realm database
mysql_connect("201.408.185.132",$DBserver,$password); // access
database server
mysql_select("REALM.SQL"); // select database to append
mysql_query("INSERT INTO GamingInputTable (transmission)
VALUES ($data)"); // add data to GamingInoutTable table in a
REALM database
mysql_close("REALM.SQL"); // close connection to database
?>
```

In some implementations, the gaming server may require clearance from various OBM components prior to servicing the user's gaming input. For example, a social gaming behavior evaluator component (e.g., 1200) may be implementing a virtual security camera (e.g., 1500), customer service request evaluator (e.g., 1700), live online game tester (e.g., 1900, 2000), engagement-tracking game modifier (e.g., 2100, 2200) and/or other processes that may provide or withhold clearance to the gaming server to process the user's gaming input. In such implementations, the gaming server may generate a clearance request, e.g., 923, and provide the clearance request, e.g., 924, to the social gaming behavior evaluator component. For example, the gaming server may provide a HTTP(S) POST message including the clearance request, and data (e.g., user's gaming input) that the social-gaming behavior component requires to process the clearance request. An exemplary HTTP(S) POST clearance request message is provided below:

```
POST /clearance.php HTTP/1.1
Host: sgbe.appserver.com
Content-Type: Application/JSON
Content-Length: 316
"clearance request"
{ "request_id": "A8IN12",
  "type": "security",
  "app_id": "A236269",
  "app_name": "poker",
  "player_id": "jqpublic",
  "player_name": "John Q. Public",
  "game_id": "AHWJ20100630",
  "md5_auth": "f585e3efede0c3b400b25908f8fa3f6d",
  "player_action": {
              "timestamp": "2010-06-30 09:23:47",
              "action_type": "raise",
              "action_amount": "50.00",
              "action_source": "credit card 1"
              }
}
```

In some implementations, the social-gaming behavior evaluator may provide a clearance acknowledgment message, e.g., 925a, indicating that the gaming server is cleared to process the user's gaming input provided by the user as part of the user's interaction with the gaming app. For example, the social-gaming behavior evaluator may provide a HTTP(S) POST message similar to the example provided below:

```
POST /clear.php HTTP/1.1
Host: gs1.appserver.com
Content-Type: Application/JSON
Content-Length: 267
"request_response"
{    "type": "clearance"
     "app_name": "poker",
     "player_id": "jqpublic",
     "player_name": "John Q. Public",
     "game_id": "AHWJ20100630",
     "status": "cleared"}
```

In some implementations, the gaming server may require, to service the user's requests while utilizing the app, game rules and/or require environment data related to the user's current gaming environment (e.g., what are the cards being held by the other players in a game of poker?, what are the actions of the members of the user's mafia?, etc.). The gaming server may utilize the environment data, e.g., 928, as stored in gaming realm database(s), and the user's gaming input to compute an updated user session state for the client (e.g., representing change of the state of the game, actions of the game player/co-player(s) within the game, etc.). For example, a gaming realm database may store environment data including, but not limited to, user session state(s), such as the exemplary illustrative JSON-encoded user session state data structure provided below:

```
"realm_data"
{
"app_id": "A236269",
"app_name": "poker",
"game_id": "462371",
"player_id": "jqpublic",
"player_name": "John Q. Public",
"md5_auth": "f585e3efede0c3b400b25908f8fa3f6d",
"last_action_timestamp": "2010-06-30 09:23:47",
"player_hand":    {
                  card { "suit": "clubs",
                         "value": "8"},
                  card { "suit": "hearts",
                         "value": "Q"},
                  card { "suit": "hearts",
                         "value": "K"},
                  card { "suit": "spades",
                         "value": "9"},
                  card { "suit": "diamonds",
                         "value": "7"}
                  }
}
```

In some implementations, the gaming server may utilize the a game ID of the game in progress to query its gaming realm database to identify the user IDs of the users involved in the game, and identify IP addresses of the gaming realm database(s) storing the user session states of the identified users. The gaming sever may utilize the above data to generate, e.g., 926, environment queries for the user session states required to process the user's gaming input. The gaming server may then query, e.g., 927, the identified gaming realm database(s) for the user sessions states of the users. For example, the gaming server may utilize PHP/SQL commands similar to the exemplary illustrative commands provided below:

```
<?PHP
header('Content-Type: text/plain');
// query for game players and associated realm database IP addresses
mysql_connect("204.192.85.202",$DBserver,$password); // access
database server
mysql_select_db("REALM.SQL"); // select database table to search
$query = "SELECT players_ID realm_IP FROM RealmTable
    WHERE game_ID LIKE '%' $gameid";
$result = mysql_query($query); // perform the search query
mysql_close("REALM.SQL"); // close database access
// query for game player session states sequentially
$rows = mysql_num_rows($result);
for ($k = 0; $k <= $rows-1; $k++) {
    // obtain player ID, realm database IP address
    $uid = mysql_result($result,k,0);
    $ip = mysql_result($result,k,1);
    // connect to player's realm database, download player's session state
    mysql_connect($ip,$DBserver,$password); // access database server
    mysql_select_db("REALM.SQL"); // select database table to search
    $query = "SELECT user_state FROM RealmTable WHERE
    user_ID LIKE '%' $uid";
    // save player's session state to array
    $state[ ] = mysql_query($query); // perform the search query
    mysql_close("REALM.SQL"); // close database access
} // end for-loop
?>
```

Upon obtaining the user sessions states for the players in the game, the gaming server may compute a new session state(s) for the user(s), e.g., 929. The gaming server may save the new session state(s) for the user(s) to the gaming realm database, e.g., 930. For example, the gaming server may utilize PHP/SQL commands similar to those illustrated in the example above with regard to storing gaming input data in the gaming realm database. In some implementations, the gaming server may provide results of the computation for the client. For example, the gaming server may generate a data structure representative of a scalable vector illustration, e.g., a Scalable Vector Graphics ("SVG") data file such as render data, e.g., 931. The data structure may include, for example, data representing a vector illustration. An exemplary vector illustration data structure (an XML-encoded SVG data file, written substantially according to the World-Wide Web Consortium's SVG standard), and including data for an example vector illustration comprising a circle, an open path, a closed polyline composed of a plurality of line segments, and a polygon, is provided below:

```
<?XML version = "1.0" standalone = "no">
<!DOCTYPE svg PUBLIC "-//W3C//DTD SVG 1.1//EN"
    "http://www.w3.org/Graphics/SVG/1.1/DTD/svg11.dtd">
<svg width = "100%" height = "100%" version = "1.1"
    xmlns="http://www.w3.org/2000/svg">
    <circle cx="250" cy="75" r="33" stroke="blue"
    stroke-width="2" fill="yellow"/>
    <path d="M250 150 L150 350 L350 350 Z" />
    <polyline points="0,0 0,20 20,20 20,40 40,40 40,80"
    style="fill:white;stroke:green;stroke-width:2"/>
    <polygon points="280,75 300,210 170,275"
    style="fill:#cc5500;
    stroke:#ee00ee;stroke-width:1"/>
</svg>
```

The gaming server may provide the render data via one or more HTTP(S) POST messages and/or using an SSL connection with the client, e.g., as illustrated in examples provided above in this disclosure. Upon obtaining the render data, the client may render, e.g., 932, the visualization represented in the data structure for display to the user, e.g., 933. For example, the client may be executing an Adobe® Flash object within a browser environment including ActionScript™ 3.0 commands to render the visualization represented in the data structure, and display the rendered visualization for the user. Exemplary commands, written substantially in a form adapted to ActionScript™ 3.0, for rendering a visualization of a scene within an Adobe® Flash object with appropriate dimensions and specified image quality are provided below:

```
// import necessary modules/functions
import flash.display.BitmapData;
import flash.geom.*;
import com.adobe.images.JPGEncoder;
// generate empty thumbnail bitmap with appropriate dimensions
var bitSource:BitmapData = new BitmapData (sketch_mc.width,
sketch_mc.height);
// capture snapsot of movie clip in bitmap
bitSource.draw(sketch_mc);
var imgSource:Image = new Image( );
imgSource.load(new Bitmap(bitSource, "auto", true));
// generate scaling constants
var res:Number = 640 / max(sketch_mc.width, sketch_mc.height);
var width:Number = round(sketch_mc.width * res);
var height:Number = round(sketch_mc.height * res);
// scale the image
imgSource.content.width = width;
// JPEG-encode bitmap with 85% JPEG compression image quality
var jpgEncoder:JPGEncoder = new JPGEncoder(85);
var jpgStream:ByteArray = jpgEncoder.encode(jpgSource);
// Pass JPEG-encoded bitmap to PHP script for further use
var header:URLRequestHeader =
    new URLRequestHeader("Content-type", "application/octet-stream");
var jpgURLRequest:URLRequest = new
    URLRequest("jpg_encoder_download.php?name=sketch.jpg");
jpgURLRequest.requestHeaders.push(header);
jpgURLRequest.method = URLRequestMethod.POST;
jpgURLRequest.data = jpgStream;
navigateToURL(jpgURLRequest, "_blank");
```

In some implementations, the social-gaming behavior evaluator may withhold clearance for processing the user's gaming input, and instead provide a Constraint of Service ("CoS") order, e.g., 925b, indicating that the gaming server is not cleared to process the user's gaming input provided by the user as part of the user's interaction with the gaming app. For example, the social-gaming behavior evaluator may provide a HTTP(S) POST CoS message similar to the example provided below:

```
POST /clear.php HTTP/1.1
Host: gs1.appserver.com
Content-Type: Application/JSON
Content-Length: 267
"request_response"
{    "type": "clearance"
    "app_name": "poker",
    "player_id": "jqpublic",
    "player_name": "John Q. Public",
    "game_id": "AHWJ20100630",
    "status": "CoS",
    "CoS order"
    {    "Warning"
        {"from": "service@sgbe.appserver.com",
        "to": "jqpublic@appserver.com;
    supervisor@sgbe.appserver.com; 12345678901@efaxsend.com",
        "message": "WARNING: Not authorized to perform this
    action!"}, "Lock-Out"
        {"user": "jqpublic", "user": "jfdoe", "user": "jtsixpack"}
    }
}
```

In such implementations, the gaming server may obtain the CoS order, parse the CoS order, e.g., 934, to determine further action. In some implementations, the CoS order may specify user(s) that need to be locked out of the OBM. The gaming server may, in response, delete, e.g., 936, the user sessions/states of the locked out users, e.g., by issuing PHP/SQL commands to the gaming environment database. The gaming server may also, based on parsing the order, generate warnings, notices, complaints, reports, and/or the like, and provide, e.g., 935, the generated outputs to the user/client, law enforcement, supervisors of the OBM, etc. For example, the gaming server may utilize PHP commands similar those presented below:

```
<?PHP
// email or fax multiple recipients
$to = 'jqpublic@appserver.com';
to .= 'supervisor@sgbe.appserver.com';
to .= '12345678901@efaxsend.com';
$subject = 'WARNING';
$message = 'Not authorized to perform this action!';
$headers = 'From: service@sgbe.appserver.com' . "\r\n" .
    'Reply-To: service@sgbe.appserver.com' . "\r\n" .
    'X-Mailer: PHP/' . phpversion( );
mail($to, $subject, $message, $headers);
// print to available printer
$handle = printer_open("Cannon 4600-II");
printer_set_option($handle, PRINTER_MODE, "RAW");
printer_write($handle, $message);
printer_close($handle);
?>
```

The client may obtain warnings, complaints, reports, notices, etc. sent by the gaming server. The client may interpret the received messages, e.g., 937, and display, e.g., 938, them for the user, e.g., via an Adobe® Flash object issuing ActionScript™ 3.0 commands as illustrates in examples above.

FIGS. 10A-C are of logic flow diagrams illustrating example aspects of implementing user gaming interactions with the OBM within a user gaming session in some embodiments of the OBM, e.g., a user gaming interaction ("UGI") component 1000. In some implementations, the app executing on the client may include interactive features for the user. For example, the app may be configured to accept user input/feedback via a variety of mechanisms including, but not limited to, keyboard entry, mouse input, touch input, touch gestures, voice commands, auto-form filling, and/or the like. The app may provide a variety of user interfaces configured to accept such input from the user including, but not limited to, command line keyboard entry interfaces, graphical user interfaces, touch-sensitive interfaces, and/or the like. In some implementations, the user may interact, e.g., 1001, with the app and provide input into the app. For example, the user may provide input as part of a gaming application, a social application (e.g., chat room, instant messaging, etc.), information resource selection, and/or the like. The client device may detect input from the user. For example, the client may include hardware resources (e.g., keyboard, mouse, etc.) that provide triggers when a user manipulates the input hardware resources. Upon detecting user input, the client may obtain such user input, and determine whether the provided input is sufficient for the action and/or circumstances within the app at the time of user input. For example, the app may be configured to only accept user credentials input if the user credential input is longer than a predetermined number of characters. If the input is determined to be insufficient, the client may indicate to the user to provide further input, and may wait for the requested user input to be provided. If the input is determined to be sufficient for the app to complete the action for which it requested/is provided the input, the app may incorporate the input into the interactive user experience, and proceed with instructions execution according to the satisfactory user input. In some implementations, the client executing the app may generate, maintain, update and/or store, e.g., 1002, data pertaining to the user's interaction with the app (e.g., an app state, an app data structure, a block of memory with data variables, a Flash movie clip, etc.). In some implementations, the client may determine whether to provide data stored on the client for a server, e.g., 1003. If the client determines that data should be provided for the server (e.g., 1004, option "Yes"), the client may prepare the data for transmission and provide the data, e.g., 1005, for the server, for example, via a HTTP(S) POST messages and/or secure SSL connection with the server as discussed previously.

Figure 12A:
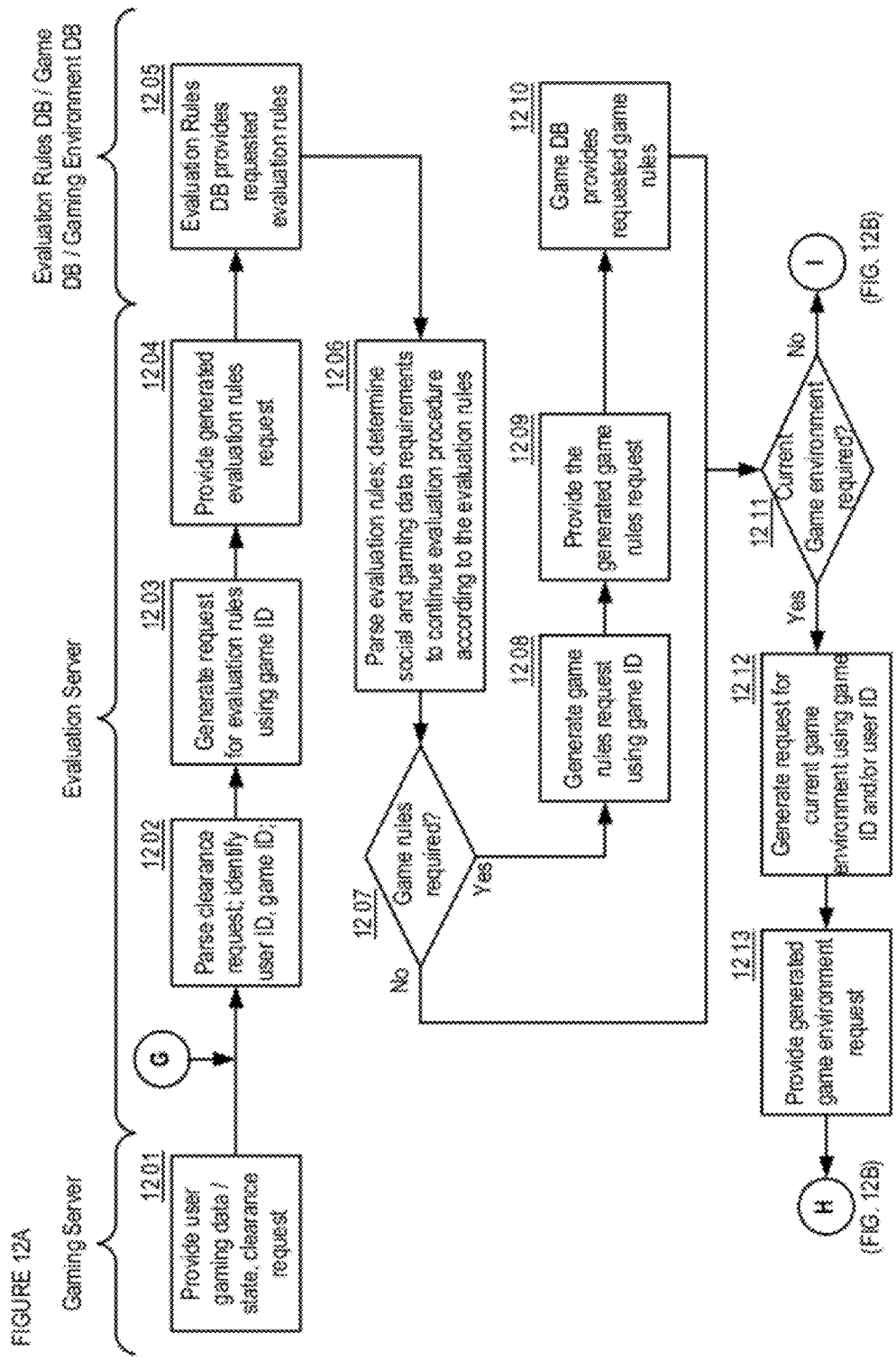
Figure 12B:
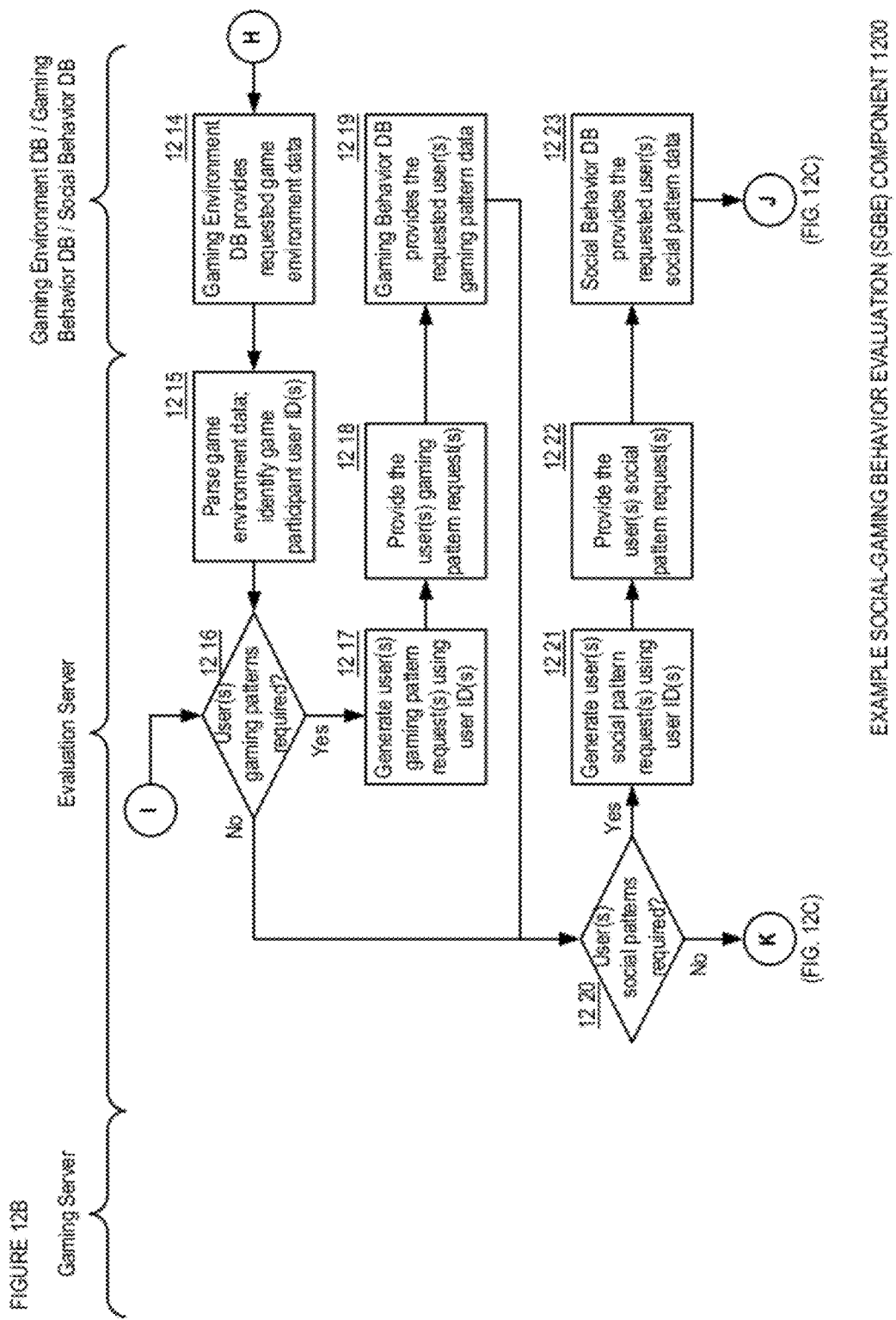
Figure 12E:
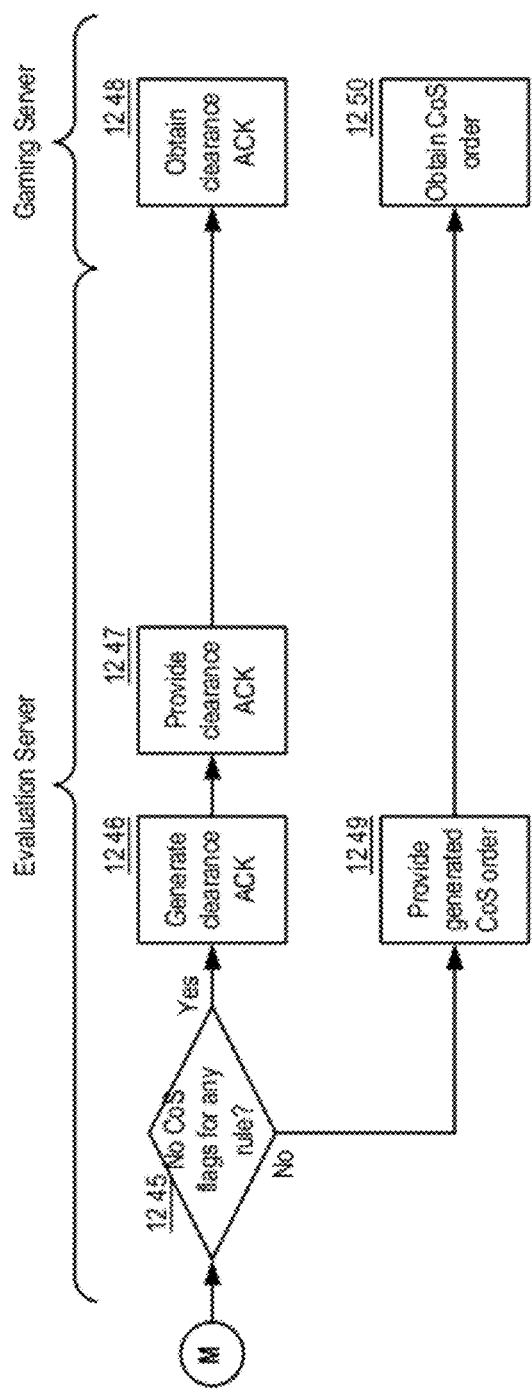

In some implementations, the gaming server may, upon obtaining the user/client data/state, generate a clearance request, e.g., 1006, using the obtained user/client data/state. For example, the gaming server may provide a clearance request to obtain clearance to process the user's gaming input pertaining to the user and the co-users who are included in the game/realm in which the user is playing. The gaming server may provide the clearance request, e.g., 1007 (for example, via one or more HTTP(S) POST messages) to a social-gaming behavior evaluator (e.g., the example social-gaming behavior evaluation component 1200 discussed below with reference to FIG. 12). The social-gaming behavior evaluator may, e.g., 10008-1010, determine whether to provide a clearance acknowledgment message (e.g., 1009, option "Yes") or a Constraint of Service ("CoS") order (e.g., 1009, option "No"). If the social-gaming behavior evaluator provides a CoS order, e.g., 1010a, the gaming server may obtain the CoS order, and parse the CoS order to determine its further procedures. For example the gaming server may parse a CoS order formatted according to the JSON-encoding standard using PHP commands as described in examples above with reference to FIGS. 9A-B.

In some implementations, if the CoS order requires generating user warnings for one or more users (e.g., 1012, option "Yes"), the gaming server may parse the CoS order to determine the user ID(s) to which the warnings need to be directed, and the content of the warning message(s), e.g., 1013. The gaming server may generate the required warnings using the parsed user ID(s) and warning message(s) content, e.g., 1014, and provide, e.g., 1015 the user warning message(s), e.g., using the mail( ) PHP command as illustrated previously. In some implementations, if the CoS order requires generating reports, complaints and/or legal notices for one or more users and/or other OBM-affiliated entities (e.g., 1016, option "Yes"), the gaming server may parse, e.g., 1017 the CoS order to determine the user ID(s) of the user to whom the reports, complaints, legal notices, etc. are related. The gaming server may also determine, based on the parsing, the content of the reports, complaints, legal notices, etc. The gaming server may query, e.g., 1018, the gaming environment database for the user profiles, game status, and/or other gaming environment data related to the user ID(s). The gaming server may provide, e.g., 1019, these user profiles for, e.g., law enforcement, security personnel, supervisory personnel etc. The gaming server may also generate the required warnings using the content obtained from parsing the CoS order, e.g., 1020. The gaming server may then provide, e.g., 1021, the generated reports, complaints, legal notices, etc., using, for example, the mail( ) PHP command as illustrated previously. In some implementations, if the CoS order requires that one or more users be locked out of the OBM (e.g., 1022, option "Yes"), the gaming server may parse the CoS order to determine the user ID(s) of the user to be locked out, e.g., 1023. The gaming server may then terminate, e.g., 1024, the user sessions corresponding to the user ID(s) (e.g., using the example gaming session termination component 1300 described with reference to FIG. 13). In some implementations, the gaming server may further modify/update, e.g., 1025, the user profile(s) of the user(s) so that the user(s) cannot login again (e.g., permanent lock-out, temporary lock-out, lock-out until user performs a remedial action such as paying a fine, signing an agreement, agreeing to gaming restrictions, etc.). The gaming server may provide, e.g., 1026, the updated user profile(s) for storing in the gaming environment database, e.g., 1027.

In some implementations, if the social-gaming behavior evaluator provides a clearance acknowledgment (e.g., 1010*b*), the gaming server may generate queries for environment data, e.g., 1028, stored in gaming realm database(s), pertaining to the user and the co-users who are included in the game/realm in which the user is playing. The gaming realm database may provide, e.g., 1029, the requested gaming environment data. For example, the gaming realm database may provide environment data including, but not limited to, user session state(s), such as the exemplary illustrative JSON-encoded user session state data structures provided in the examples above. The server may utilize the environment data for the user(s) provided by the gaming realm database, as well as the user's gaming input, to compute, e.g., 1030, an updated user session state for the client (e.g., representing change of the state of the game, actions of the game player/co-player(s) within the game, etc.). The gaming server may provide the updated user session state, e.g., 1031, for the gaming environment database, and may also provide the computed updated user session state for the client, e.g., 1032. In some implementations, the server may provide render data (e.g., an XML-encoded SVG data file) via one or more HTTP(S) POST messages and/or using an SSL connection with the client, e.g., as illustrated in examples provided above in this disclosure. Upon obtaining the render data, the client may render, e.g., 1033, the visualization represented in the data structure for display to the user, e.g., 1034 (for example, using ActionScript™ commands within an Adobe® Flash object).

Figure 11A:
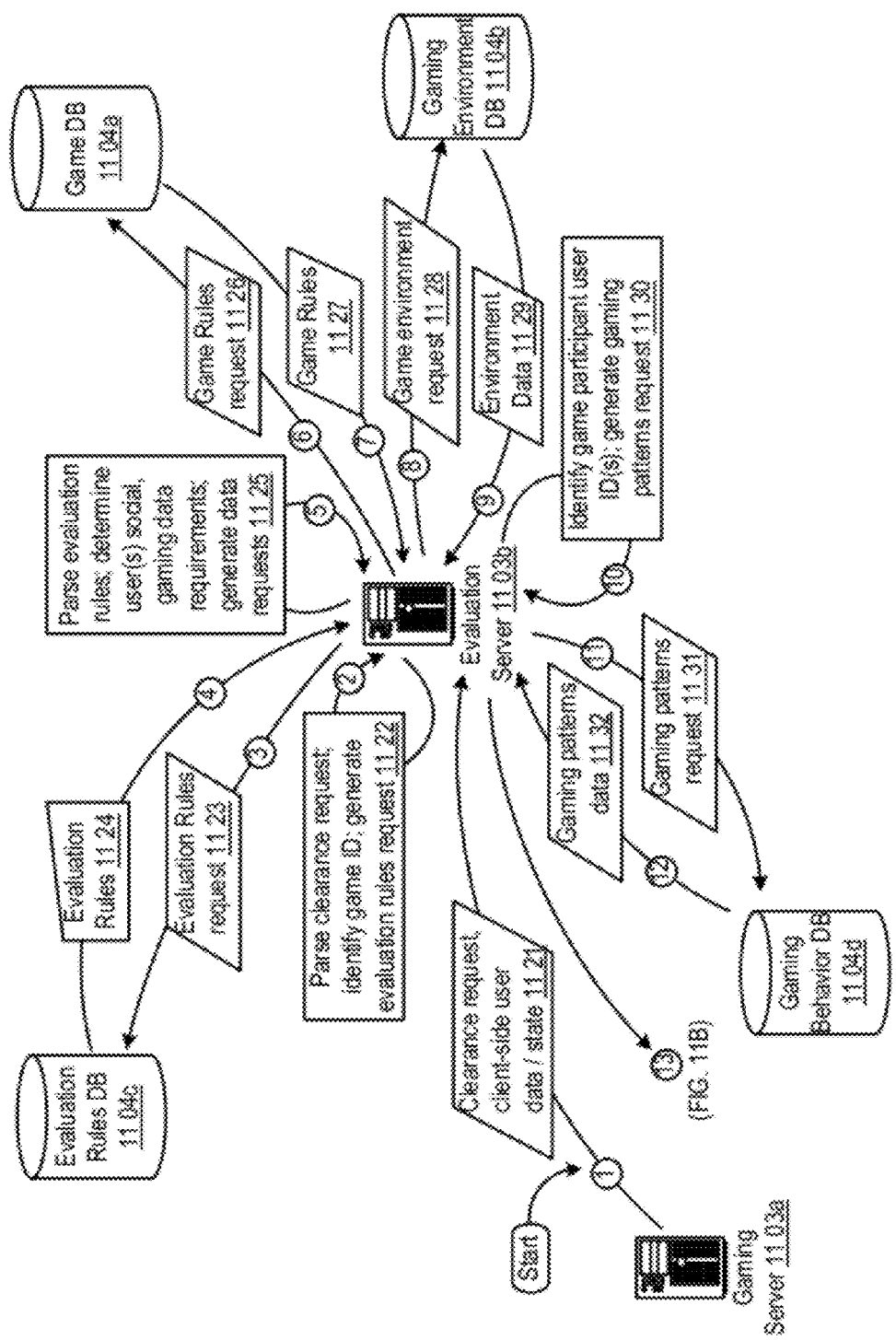

FIGS. 11A-B are of data flow diagrams illustrating example aspects of evaluating a user's online social and/or gaming behavior in some embodiments of the OBM. In some implementations, a gaming server, e.g., 1103*a*, may provide a clearance request, e.g., 1121, for an evaluation server, e.g., 1103*b*, to obtain clearance to process a user's gaming input. For example, the gaming server may provide a HTTP(S) POST message including the request for clearance and JSON-encoded user session state data, as shown in examples above with reference to FIGS. 9A-B. In various other implementations, other OBM components and/or other affiliated entities (e.g., user, client, evaluation server, law enforcement agency, security personnel, etc.) may provide clearance request(s) related to one or more users. The evaluation server may parse the received clearance request (e.g., using PHP commands to implement a JSON parser, as shown in an example above with reference to FIGS. 9A-B), and obtain a game ID of the game being played by the user, e.g., 1122. The evaluation server may a generate a request for evaluation rules using the game ID as a search parameter, and provide the evaluation rule request, e.g., 1123, for an evaluation rules database, e.g., 1104*c*. For example, the evaluation server may issue PHP/SQL commands (similar to the examples described previously) to query the evaluation rules database for rule pertaining to the game, identified by the game ID, being played by the user. In response, the evaluation rules database may provide a set of evaluation rules, e.g., 1124. For example, the evaluation rules database may provide an XML-encoded data file including the evaluation rules that pertain to the identified game. An exemplary listing of an XML-encoded evaluation rule is provided below:

```
<?XML version = "1.0" encoding = "UTF-8"?>
<rule>
    <rule_id>ANS287JK</rule_id>
    <rule_name>fraud detection</rule_name>
    <inputs>
        <who> user; co-users </who>
        <what> social-gaming thread </what>
    </inputs>
    <processing>
        <find> social loop <period>6mo</period></find>
        <threshold><min> 25% users </min></threshold>
        <find> prior similar violation <period>4mo</period></find>
    </processing>
    <outputs>
        <who> user;supervisor@sgbe.appserver.com;
        security@appsrv.com </who>
        <what> <user><1 prior> warning </1 prior> <2 prior> warning;
    05:00temp lock </2 prior> <3 prior> lock </3 prior></user>
        <other>full report</other></what>
    </outputs>
</rule>
```

In some implementations, the evaluation server may parse, e.g., 1125, the received evaluation rules, and determine the social-gaming data required to process the evaluation rules for the user, e.g., 1125. For illustration, the evaluation server may parse the example XML-encoded rule illustrated above and determine that it requires social-gaming threads for the user and the co-users of the game in order to process the evaluation rule, based on parsing the <inputs> tag of the evaluation rule. The evaluation server may generate requests for data as specified by the evaluation rule. In some implementations, the evaluation rule may require the evaluation server to obtain the rules of the game identified by the game ID. The evaluation server may generate and issue a game rules request (e.g., via PHP/SQL commands) to a game database, e.g., 1104*a*, for the rules governing the game play within the game identified by the game ID. In response, the game database may provide, e.g., 1127, the request game rules, e.g., as XML-encoded data similar to the example XML encoded evaluation rules provided above. In some implementations, the evaluation rule may require that the evaluation server identify the co-users of the game identified by the game ID of the user (e.g., the example evaluation rule provided above requires the evaluation server to determine the social-gaming thread for the co-users of the game, thus requiring the evaluation server to identify the co-users of the game). In such implementations, the evaluation server may issue a query (e.g., via PHP/SQL commands to a relational database) for the gaming environment of the game identified by the game ID. For example, the evaluation server may issue a game environment request, e.g., 1128, to the gaming environment database, e.g., 1104*b*, for the game environment data for all co-users who are participating in the game identified by the game ID. For example, the gaming server may utilize PHP/SQL commands similar to the exemplary illustrative commands provided below:

```
<?PHP
header('Content-Type: text/plain');
// query for game players and associated realm database IP addresses
mysql_connect("204.192.85.202",$DBserver,$password); // access
```

```
database server
mysql_select_db("REALM.SQL"); // select database table to search
$query = "SELECT players_ID realm_IP FROM RealmTable
    WHERE game_ID LIKE '%'$gameid";
$result = mysql_query($query); // perform the search query
mysql_close("REALM.SQL"); // close database access
// query for game player session states sequentially
$rows = mysql_num_rows($result);
for ($k = 0; $k <= $rows-1; $k++) {
    // obtain player ID, realm database IP address
    $uid = mysql_result($result,k,0);
    $ip = mysql_result($result,k,1);
    // connect to player's realm database, download player's session state
    mysql_connect($ip,$DBserver,$password); // access database server
    mysql_select_db("REALM.SQL"); // select database table to search
    $query = "SELECT user_state FROM RealmTable
    WHERE user_ID LIKE '%' $uid";
    // save player's session state to array
    $state[ ] = mysql_query($query); // perform the search query
    mysql_close("REALM.SQL"); // close database access
} // end for-loop
?>
```

As another example, the gaming environment database may have stored a table including a list of game IDs, and lists of co-user IDs associated with each of the game IDs in the table, and the evaluation server may query the gaming environment database for the list of users corresponding to the identified game ID. In response to the evaluation server's queries, the gaming environment database may provide the requested environment data, e.g., 1129, for the evaluation server. The evaluation server may parse, if needed, the environment data to extract the user ID(s) of the user(s) playing the game, e.g., 1130. In some implementations, the evaluation rule may require the evaluation server to obtain the gaming patterns of the users of the game, e.g., for a predetermined period of time. The evaluation server may, in response, issue a gaming patterns request, e.g., 1131, to a gaming behavior database, e.g., 1104d. For the example, the evaluation server may issue PHP/SQML commands to query the gaming behavior database for the gaming patterns data. In some implementations, the evaluation server may provide the gaming environment data obtained from the gaming realm database, and/or gaming patterns data updated using the gaming environment data, for the gaming behavior database in order to update the gaming patterns data stored in the gaming behavior database. In response to the gaming patterns request, the gaming behavior database may provide the requested gaming patterns data (e.g., as database records) for the identified user IDs associated with the game ID of the game, e.g., 1132. In some implementations, the evaluation rule may require the evaluation server to obtain social activity data, e.g., activity of the user and/or co-users of the game on a social networking service (e.g., Facebook®, Twitter™, etc.). In such implementations, the evaluation server may issue (e.g., via PHP/SQML commands) a social patterns request, e.g., 1133, to a social behavior database, e.g., 1104e. In response, the social behavior database may provide the requested social patterns data, e.g., 1134, for the evaluation server (e.g., as records from the database). For example, the records may include fields such as, but not limited to: user ID, friend ID(s), friend relationship strength(s), social activity timestamp(s), message ID(s), message(s), and/or the like, and/or the like. In some implementations, the evaluation server may determine that the social patterns data from the social behavior database if not sufficient (e.g., using social activity timestamps to determine that the data available does not cover the entire time period required by the evaluation rule, data is outdated, data is incomplete, etc.). In such implementations, the evaluation server may query a social networking server (e.g., a Facebook® server) providing a service utilized by the user and his/her friends for social data (e.g., new social activity request 1136). For example, the evaluation server may invoke an application programming interface ("API") call to the social networking server. The evaluation server may request that the user log in to the social networking service to provide the evaluation server access to the user's social data. For example, the evaluation server may provide an HTML page to the client including authentication commands similar to the exemplary illustrative listing provided below:

```
<html>
<div id="fb-root"></div>
<script src="http://connect.facebook.net/en_US/all.js"></script>
<script>
    FB.init({appId: 'A3BFE5', status: true, cookie: true, xfbml: true});
    FB.Event.subscribe('auth.sessionChange', function(response) {
        if (response.session) {
            // A user has logged in, and a new cookie has been saved
        } else {
            // The user has logged out, and the cookie has been cleared
        }
    });
</script>
</html>
```

The evaluation server may then generate and provide a request for social data including, but not limited to: user ID, friend ID(s), friend relationship strength(s), social activity timestamp(s), message ID(s), message(s), and/or the like. For example, the evaluation server may execute PHP commands similar to those in the exemplary illustrative listing provided below:

```
<?PHP
header('Content-Type: text/plain');
// Obtain user ID(s) of friends of the logged-in user
$friends = json_decode(file_get_contents(
    'https://graph.facebook.com/me/friends?access_token='.
    $cookie['oauth_access_token']), true);
$friend_ids = array_keys($friends);
// Obtain message feed associated with the profile of the logged-in user
$feed = json_decode(file_get_contents(
    'https://graph.facebook.com/me/feed?access_token='.
    $cookie['oauth_access_token']), true);
// Obtain messages by the logged-in user's friends
$result = mysql_query('SELECT * FROM content WHERE uid IN (' .
    implode($friend_ids, ',') . ')');
$friend_content = array( );
while ($row = mysql_fetch_assoc($result)) {
    $friend_content[ ] = $row;
}
```

In response, the social networking server may query (e.g., social data request 1137) its own database (e.g., social activity database 1104f), and obtained the requested data from its database (e.g., social data 1138). The social networking server may provide the retrieved information for the evaluation server, e.g., new social activity 1139. For example, the social networking server may provide a JavaScript Object Notation format ("JSON")-encoded data structure embodying the requested information. An exemplary JSON-encoded data structure embodying social data (e.g., user ID(s) of friends of the logged-in user) is provided below:

```
{ "data": [
    {    "name": "Tabatha Orloff",
    ]    "id": "483722"},
    {    "name": "Darren Kinnaman",
    ]    "id": "865743"},
    {    "name": "Sharron Jutras",
    ]    "id": "091274"}
]}
```

In some implementations, the evaluation server may utilize the social patterns data from the social behavior database and the new social activity data from the social networking server to generate updated social patterns data records for the social behavior database. The evaluation server may, (e.g., via PHO/SQL commands) issue orders to update the social behavior database using the updated social activity patterns data records. In some implementations, the evaluation server may parse the data for the social and gaming activities of a user, and identify activity timestamps associated with each of the social and/or gaming actions of the user. The evaluation server may utilize the activity timestamps to generate a social-gaming activity timeline for the user, to process the evaluation rule. The evaluation server may generate a timeline for each user that whose actions are required to be analyzed to process the evaluation rule. The evaluation server may, in some implementations, also parse each of the activities of a user to determine the co-user at whom the activity was directed (e.g., to whom did the user send the message?; to whom did the user provide a gift?). The evaluation server may then generate social-gaming threads, e.g., 1140, for each user that include data on the user's activities and their associated activity timestamps, as well as activities of co-users at whom the user's actions were directed, and their associated timestamps (e.g., wherein the activities of the user and co-users are combined and arranged in reverse chronological order).

In some implementations, upon generation of the social-gaming activity timeline and/or social-gaming thread for the user, the evaluation server may apply the processing procedures prescribed in the evaluation rule to the social-gaming activity timeline(s) and/or social-gaming thread(s). For example, in the exemplary evaluation rule provided in the example above, the social gaming server may search the user's social-gaming thread for social loops (e.g., favor/gift/(virtual) currency transaction, etc. from the user to a co-user, and a return favor/gift/(virtual) currency transaction, etc. from the co-user to the user), and determine a percentage of co-users with whom the user creates completed social loops. In some implementations, the evaluation server may generate a score for an evaluation rule, and compare the score against threshold value(s). For example, the exemplary evaluation rule presented above prescribes a 25% minimum threshold for the percentage of co-users with whom the user has completed social loops, below which the evaluation rule will require generation of a rule violation flag by the evaluation server. The evaluation server may implement such a procedure to process each evaluation rule assigned to the game being played by the user, and generate evaluation rule scores and/or flags as dictated by the evaluation rules. If a flag is generated, and/or if an evaluation scores does not adhere to a prescribed threshold, the evaluation server may generate warnings, complaints, reports, legal notices, etc., for providing the user, co-user(s), supervisory personnel, security personnel, law enforcement agencies, and/or the like. The evaluation server may generate a clearance acknowledgment message (e.g., a HTTP(S) POST message including JSON-encoded data) if all evaluation rules are satisfied, or may generate a Constraint of Service (CoS) order (e.g., a HTTP(S) POST message including JSON-encoded data) if any of the evaluation rules are violated and/or flags are generated based on processing of the evaluation rules. The evaluation server may provide the clearance acknowledgment and/or CoS order to the gaming server, e.g., 1142.

FIGS. 12A-E are of logic flow diagrams illustrating example aspects of evaluating a user's online social and/or gaming behavior in some embodiments of the OBM, e.g., a social gaming behavior evaluation ("SGBE") component 1200. In some implementations, a gaming server, e.g., 1103a, may provide a clearance request, e.g., 1201, and/or the user's gaming data/session state for an evaluation server to obtain clearance to process a user's gaming input (e.g., via an SSL connection with the evaluation server). In other implementations, any OBM components and/or other affiliated entities (e.g., user, client, evaluation server, law enforcement agency, security personnel, etc.) may provide clearance request(s) related to one or more users. The evaluation server may parse, e.g. 1202 the received clearance request and/or the user's gaming data/session state, e.g., using PHP commands to implement a JSON parser, as shown in the example listing below:

```
<?PHP
header('Content-Type: text/plain');
// set ip address and port to listen to for incoming data
$address = '192.168.0.100';
$port = 255;
// create an evaluation server-side SSL socket, listen for gaming server data
$sock = socket_create(AF_INET, SOCK_STREAM, 0);
socket_bind($sock, $address, $port) or die('Could not bind to address');
socket_listen($sock);
$gaming = socket_accept($sock);
// read input data from gaming server in 1024 byte blocks until end of message do {
    $input = "";
    $input = socket_read($gaming, 1024);
    $data .= $input;
} while($input != "");
// parse data to extract variables
$obj = json_decode($data, true);
?>
```

The evaluation server may obtain, based on parsing the clearance request and/or provided user gaming data/session state, a game ID of the game being played by the user, e.g., 1202. The evaluation server may a generate a request for evaluation rules using the game ID as a search parameter, e.g., 1203, and provide the evaluation rule request, e.g., 1204, for an evaluation rules database. In response, the evaluation rules database may provide the requested evaluation rules, e.g., 1205. In some implementations, the evaluation server may parse, e.g., 1206, the received evaluation rules (e.g., using PHP commands similar to the example above). The evaluation server may determine the social-gaming data required to continue processing the evaluation rules for the user, e.g., 1206. The evaluation server may generate requests for data as specified by the evaluation rule. In some implementations, the evaluation rule may require the evaluation server to obtain the game rules of the game identified by the game ID (e.g., 2107, option "Yes"). If so, the evaluation server may generate, e.g., 1208, and issue a game rules request (e.g., 1209) to a game database. In response, the game database may provide, e.g., 1210, the request game rules, e.g., as XML-encoded data similar to the example XML encoded evaluation rules provided above. In some implementations, the evaluation server may require the gaming environment of the game being played by the user (e.g., 1211, option "Yes"). The evaluation server may issue a game environment request, e.g., 1212-1213, to the gaming environment database using the game ID and/or user ID as search terms in, e.g., a PHP/SQL command. In response, the gaming environment database may provide the requested game environment data, e.g., 1214, for the evaluation server. The evaluation server may parse, if needed, the environment data to extract the user ID(s) of the user(s) playing the game, e.g., 1215. In some implementations, the evaluation server may determine that the rule requires the evaluation server to obtain the gaming patterns of the users of the game (e.g., 1216, option "Yes"). The evaluation server may generate and issue a gaming patterns request, e.g., 1217-1218, to a gaming behavior database. In response to the gaming patterns request, the gaming behavior database may provide the requested gaming patterns data (e.g., 1219) for the identified user IDs associated with the game ID of the game. In some implementations, the evaluation rule may require the evaluation server to obtain social activity data (e.g., 1220, option "Yes") for a user. In such implementations, the evaluation server may generate and issue, e.g., 1221-1222, a social patterns request (e.g., PHP/SQML commands) to a social behavior database for the user's social activity data. In response, the social behavior database may provide the requested social patterns data, e.g., 1223, for the evaluation server. In some implementations, the evaluation server may parse the social activity data and extract the timestamps from the social activity data obtained from the social behavior database. The evaluation server may compare the range of activity timestamps against the requirements of the evaluation rule (which the evaluation server may obtain, e.g., by parsing the evaluation rule). Based on the comparison, the evaluation server may determine whether any additional (e.g., new) social data is needed (e.g., social graph, activity data, etc.). If the evaluation server determines that additional social data is needed (e.g., 1225, option "Yes'), the evaluation server may query a social networking service utilized by the user and his/her friends for social data (e.g., 1226-1227). In response the social networking service may provide the requested social data for the evaluation server, e.g., 1228. The evaluation server may aggregate, e.g., 1229, the social patterns data from the social behavior database and the social networking server to generate updated social patterns data records (which the evaluation may provide for updating the social behavior database). The evaluation server may parse the data for the social and gaming activities of a user, and identify activity timestamps associated with each of the social and/or gaming actions of the user. The evaluation server may arrange the timestamps in, e.g., reverse chronological order, in a data structure (e.g., SQL table with one column dedicated to activity timestamps). The evaluation may then include the social and/or gaming data (e.g., messages, gaming actions, currency transactions, etc.) as additional columns within the table, associated with the activity timestamps column. Accordingly, the evaluation server may generate a data structure (e.g., SQL table) representing a social-gaming activity timeline for the user. The evaluation server may generate such a timeline for each user that whose actions are required to be analyzed to process the evaluation rule, e.g., 1230. The evaluation server may also generate a column in the data structure representing a co-user at whom each activity in the user's social-gaming activity timeline was directed at. Using the data, e.g., in this column, the evaluation server may generate a social-gaming thread, e.g., 1231, for each user for whom the evaluation server determines a social-gaming thread is required for processing the evaluation rule. For example, while generating the social-gaming thread for a user, the evaluation server may search through the social-gaming activity timelines of each of the co-users at whom the user has directed one or more actions in the user's social-gaming activity timeline. The evaluation server may identify actions in the social-gaming activity timelines of the co-users that were directed back at the user, and may parse these records in the co-user social-gaming activity timelines to determine whether their activities were made in response to, or drew a response by way of, the user actions in the user's social-gaming activity timeline. The evaluation server may copy such identified records from the co-user social-gaming activity timelines, and add them in to the social-gaming thread of the user, (re)arranging all the records in the user's social-gaming thread in, e.g., reverse chronological order.

In some implementations, upon generation of the social-gaming activity timeline and/or social-gaming thread for a user, the evaluation server may apply the evaluation rules for the identified game ID to the social-gaming activity timeline(s) and/or social-gaming thread(s) of the user. For example, the evaluation server may obtain an evaluation rule, e.g., 1232. The server may parse the evaluation rule, and determine the user ID of users whose activities are to be examined, based on the evaluation rule, e.g., 1233. The server may utilize the user ID(s) to select and obtain the social-gaming activity timelines and/or social-gaming threads for the identified user(s), e.g., 1234. The evaluation server may apply the processing procedures described in the evaluation rule to the social-gaming activity timelines and/or social-gaming threads of the user(s), e.g., 1235. Based on the application of the evaluation procedures described in the evaluation rule, the evaluation server may generate a score, e.g., 1236, for each user, for each evaluation rule. The evaluation server may also parse the evaluation rule, and obtain threshold value(s) against which to compare the evaluation score(s), to determine whether to generate (general) rule violation/Constraint of Service ("CoS") flags, e.g., 1239. If the evaluation server generates any flags (e.g., 1240, option "Yes"), then the evaluation server may parse the evaluation rule to determine the outputs (e.g., warnings, notices, complaints, lock-out orders, etc.) that the evaluation server needs to produce. The evaluation server may generate, e.g., 1242, the required outputs based on the parsing of the evaluation rule (e.g., in the example rule presented earlier, for the instructions under the <output> tag). The evaluation server may append the generated outputs to a CoS order, e.g., 1243, and/or provide the generated output(s) to the respective parties as specified in the evaluation rule. The evaluation server continues such a procedure until all the evaluation rules pertaining to the game and/or user(s) have been applied (e.g., 1244, option "Yes"). The evaluation server may determine whether any of the flags generated during the evaluation procedure were CoS flags (e.g., flags for which CoS orders need to be sent, and not clearance acknowledgments). If no CoS flags were generated (e.g., 1245, option "Yes"), the evaluation server may generate a clearance acknowledgment, e.g., 1246, and provide the clearance acknowledgment, e.g., 1247-1248, for the gaming server. If CoS flags were generated (e.g., 1245, option "No"), then the evaluation server may provide, e.g., 1249, the generated CoS order for the gaming server and/or other component or affiliated entity that provided the clearance request.

FIG. 13 is of a logic flow diagram illustrating example aspects of terminating a user gaming session with the OBM in some embodiments of the OBM, e.g., a gaming session termination ("GST") component 1300. In some implementations, the user may wish to terminate the session with the server. For example, the user may close the application, log off from the connection, stay dormant for a period of time, etc. The client may, in such situations, generate a notification to leave the multi-user network application, and provide the notification to the server. In other implementations, the social-gaming behavior evaluator may issue a CoS order to the gaming server, ordering the gaming server to lock the user out. In other implementations, the gaming server may receive lock-out orders from a supervisor, law enforcement agency, security personnel, etc. Thus, a gaming session termination trigger may be obtained by the gaming server from various OBM components and/or affiliated entities in various implementations. Upon obtaining the gaming session termination trigger, e.g., 1301, the server may terminate the session by ending listening to the port to which the client was instructed to send user requests, e.g., by deleting the user socket session 1302. The server may also identify a session associated with the user ID of the user, and generate 1303, e.g., PHP/SQL commands to the gaming environment database, to delete the session of the user using the user ID. The server may provide the commands to the gaming environment database, e.g. 1304, to delete the record of the session from the database, upon which the gaming environment database may update, e.g., 1305, its records by deleting the record of the session for the user. The server may generate, in some implementations, a notice (e.g., "You have been logged out . . . ", etc.) and/or uninstall order for the client, and may provide the notice and/or order, e.g., via a HTTP(S) POST message to the client. Upon receiving the notice and/or order, the client may determine whether an uninstall order was received. If the client determines that an uninstall order was received (e.g., 1308, option "Yes"), the client may perform any uninstallation procedures necessary to uninstall the client application(s). The client may, upon uninstallation, generate an uninstallation notice (e.g., 1310), and provide the notice to the server, e.g., 1311.

FIG. 14 is of a table illustrating example evaluation rules for implementing a virtual security camera using the OBM in some embodiments of the OBM. In some implementations, a social-gaming behavior evaluation component (e.g., the example SGBE 1200 component described with reference to FIG. 12) may be utilized to deploy a virtual security camera implementing features similar to those discussed with reference to FIG. 1. For example, the social-gaming behavior evaluation component may be provided with virtual security camera evaluation rules that allow the social-gaming behavior evaluation component to detect user attempts to perform game actions that circumvent game rules, game conditions, user collusion, misappropriation of another user's position in the game, etc. For example, a virtual security camera evaluation rule 1401, an input boundary circumvention rule, may prevent a user from providing an input into a game that exceeds the limits set in the game rules for such input (e.g., taking more cards in a poker game than allowed). An evaluation server processing an input boundary circumvention may, e.g., need to operate on gaming actions from a single user, and may require only the game rules in order to perform its processing. Further, if the rule processing generates a flag, the user may be provided with a notice advising that the input provided exceeds the bounds set by the game rules. As another example, a game conditions circumvention virtual security camera rule, e.g., 1402, may apply to a single or multiple users, and may require that the evaluation server processing the rule obtain the game rules, and gaming environment data from the single or multiple users (e.g., depending on the state of game play), and may produce warnings and/or notices if any flags are raised by the processing of the evaluation rule. As another example, an illegal user collusion virtual security camera rule may require the evaluation server to obtain data pertaining to a plurality of users. The evaluation server may obtain the game rule, current gaming environment data, the prior gaming patterns data for the users, prior social activity data for the users (e.g., to generate social-gaming activity timelines and/or social-gaming threads), and may generate complaints for security personnel, system supervisors, law enforcement, etc. if any flags are generated by processing the evaluation rule. The evaluation server may also instruct the gaming server(s) providing gaming services for the user to lock the users out. As another example, a user ID misappropriation virtual security camera rule may not require the evaluation server to consider the game rules and/or current gaming environment data, but rather obtain prior gaming patterns data and/or social activity data to generate a social-gaming activity timeline. For example, such a rule may be able to determine if there was an abrupt change in the geo-location (e.g., based on IP address) and/or game play times of the user that was not expected, e.g., based on the social activity messages provided by the user). It is to be understood that any tables, evaluation matrices, rule sets and/or logic may commute, cumulate, or otherwise operate in conjunction, in a mathematical progression, or according to the specific scenario within the game. For example, if several evaluation rules generate flags, then the output actions of the evaluation server may be more severe than if each evaluation rule raised flags separately. As another example, if evaluation rule processing generated flags in the prior history of the user(s), then a new flag raised by processing an evaluation rule may generate more severe output actions than if there were no prior history of flags for the user(s) involved. The amount of time lapsed since a prior evaluation rule flag was generated for a user may also affect the output action that the evaluation server orders for that user. Various such permutations of inputs used, processing undertaken, and outputs generated by the evaluation server may be built into the formulation of the evaluation rules.

Figure 15:
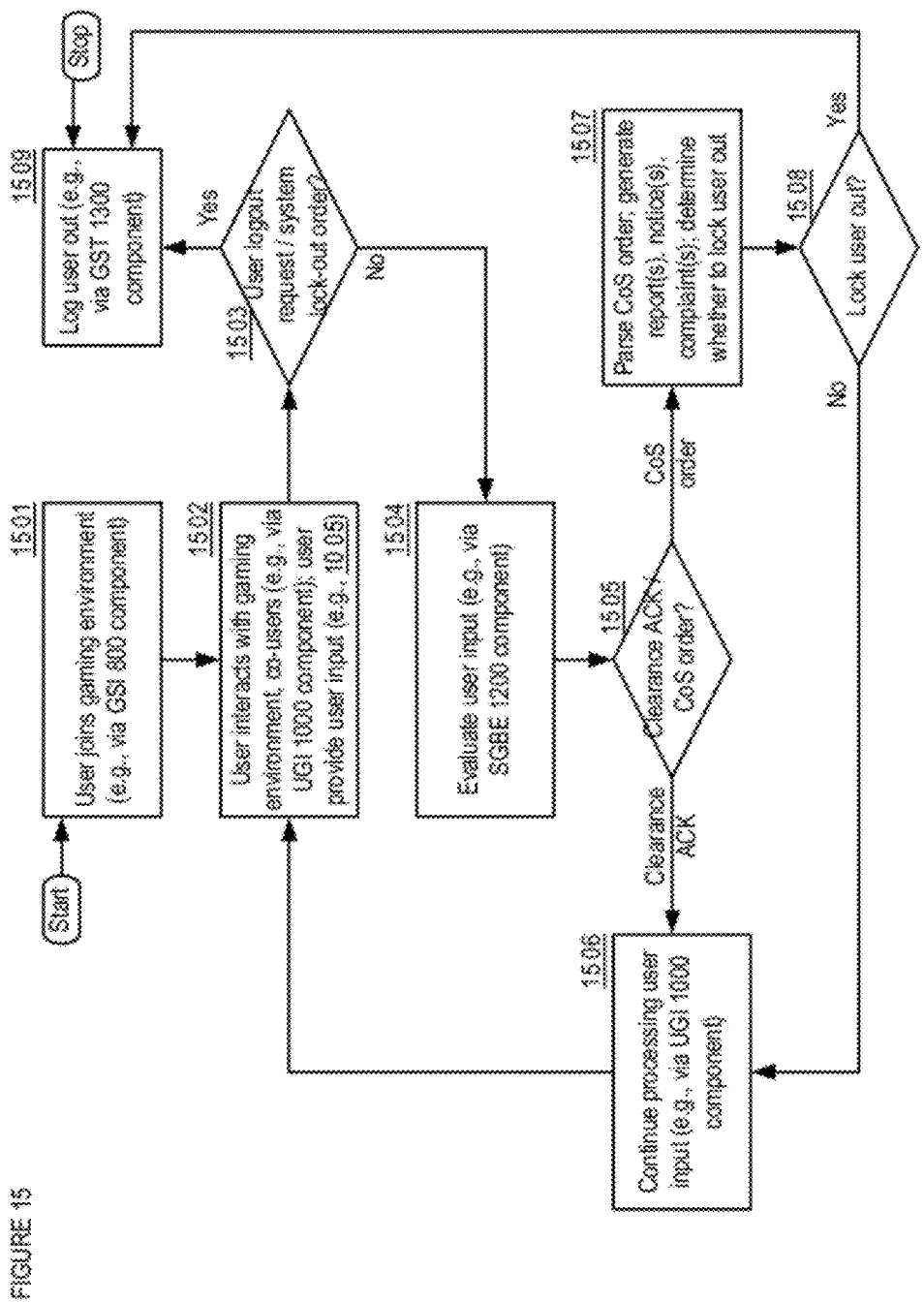
FIG. 15 is of a logic flow diagram illustrating example aspects of implementing a virtual security camera for gaming within the OBM in some embodiments of the OBM, e.g., a virtual security camera ("VSC") component.

FIG. 15 is of a logic flow diagram illustrating example aspects of implementing a virtual security camera for gaming within the OBM in some embodiments of the OBM, e.g., a virtual security camera ("VSC") component 1500. In some implementations, a user may join 1501*a* gaming environment, e.g., by using a gaming session initiation such as the example GSI 800 component discussed above with reference to FIGS. 8A-B. The user may interact 1502 with the gaming environment and with co-users, e.g., via a user gaming interaction component such as the example UGI 1000 component discussed above with reference to FIGS. 10A-C. In some implementations, the user may provide an input into the system, e.g., via the user gaming interaction component. If the user input is determined by the OBM to not be a request to log-out (e.g., 1503, option "No"), the OBM may evaluate the user input 1504, e.g., via a social-gaming behavior evaluation component such as the example SGBE 1200 component discussed above with reference to FIGS. 12A-E. In some implementations, the social-gaming behavior evaluation component may provide a clearance acknowledgment upon evaluating the user input (e.g., 1505, option "Yes"). In such implementations, the OBM may continue processing the user input 1506, e.g., via the user gaming interaction component such as used in 1502. Accordingly, the OBM may, in some implementations, evaluate each user action for validity (e.g., using the social-gaming behavior evaluation component) and process only user actions that are deemed to meet the security consideration embodied within the virtual security camera rules.

In some implementations, the social-gaming behavior evaluation component may generate a CoS order in response to being provided a user input (e.g., 1505, option "No"). In such implementations, the OBM (e.g., a gaming server operating within the user gaming interaction component) may, e.g., 1507, parse the CoS order, generate any reports, notices, warnings, complaints, etc. and provide them to the necessary authorities based on the instructions encoded into the evaluation rules. In some implementations, the CoS order may include orders to constraint service provided to the user without locking the user(s) out from the OBM (e.g., 1508, option "No"). In such implementation, the OBM may continue processing 1506 the user inputs, but the gaming environment of the user may be modified in accordance with the instructions provided in the CoS order. If the CoS order includes instructions to lock a user out (e.g., 1508, option "Yes"), the OBM may log the user out 1509, e.g., using a gaming session termination component such as the GST 1300 component discussed above with reference to FIG. 13.

FIG. 16 is of a table illustrating example evaluation rules for implementing a customer service request evaluator using the OBM in some embodiments of the OBM. In some implementations, a social-gaming behavior evaluation component (e.g., the example SGBE 1200 component described with reference to FIG. 12) may be utilized to deploy a customer service request evaluator implementing features similar to those discussed with reference to FIG. 2. For example, the social-gaming behavior evaluation component may be provided with customer service request evaluation rules that allow the social-gaming behavior evaluation component to evaluate the reputation of a customer, a detect fraudulent customer service request, identify a high-priority and/or low-priority customer, detect an automated (e.g., spam) request, identify a single customer making multiple requests by posing each time as a different customer (e.g., Sybil attack), etc. For example, a customer service request evaluation rule 1601, a VIP identification rule, may identify a customer of high priority based on the frequency with which the customer utilizes the gaming and/or other features of the OBM. For example, the VIP identification rule may be utilized to evaluate one customer at a time, and may utilize the gaming pattern data and/or social activity data of the customer (e.g., to detect frequency of use of social and/or gaming features of the OBM) to determine a priority to be accorded to a service request made by the user. If the VIP identification rule generates flags, the OBM may provide clearance and provide a complimentary notice to the user ("Thank you for coming back to us! . . . ," etc.). The OBM may also assign a priority weight to the service request made by the user before placing the request in a queue of requests. Accordingly, the OBM may process customer service requests based on the prioritization accorded to users based on the VIP identification rule.

As another example, Sybil attack detection customer service request evaluation rule 1602 may require an evaluation server to utilize data pertaining to multiple users. The evaluation server may utilize the social and gaming pattern data for the multiple users to determine whether a single person is actually posing as the multiple users being evaluated under the Sybil attack detection rule. The evaluation server may process this evaluation rule by generation a social-gaming timeline for each user, and e.g., monitoring the geo-location, frequency of requests, length of history of requests, etc. of the multiple user to make a determination as to whether a Sybil attack is being carried out using the multiple user IDs. If the evaluation server generates flags while processing this evaluation rule, the evaluation server may generate a CoS order providing notifications, complaints, etc., and locking out the multiple user IDs determined to form part of the Sybil attack.

As another example, the evaluation server may process the automated request detection evaluation rule to determine whether customer service requests from a single or multiple user IDs are being generated automatically (e.g., by a spambot). In such an example, the evaluation server may obtain the social activity data pertaining to the single or multiple users, and may generate a timeline for the single or multiple users' social activity. The evaluation server may, e.g., determine whether there have been isolated spikes of activity, or continuous service requests originating from the user ID(s) to determine whether the user ID(s) are being used in automated service request generation. If the evaluation server generates flags while processing this evaluation rule, the evaluation server may, e.g., generate a CoS order instructing the gaming server to provide notices to the user(s), security personnel, etc., and lock the user ID(s) out from the OBM.

As another example, the evaluation server may process fraudulent request detection evaluation rule to determine whether customer service requests from a single user ID are fraudulently placed (e.g., customer service request to replace million dollar worth of virtual poker chips because of glitch in client application, etc.). In such an example, the evaluation server may obtain the gaming pattern and social activity data pertaining to the single user, and may generate a timeline for the users' social-gaming activity. The evaluation server may, e.g., determine whether there was an abrupt disruption of social and/or gaming activity and/or whether the gaming environment data abruptly changed due to factors other than user input (e.g., perhaps indicative of an actual software glitch). If the evaluation server, e.g., generates CoS flags while processing this evaluation rule, the evaluation server may, e.g., generate a CoS order instructing the gaming server to provide complaints to security personnel, law enforcement, OBM supervisors, etc., and lock the user ID(s) out from the OBM.

A another example, the evaluation server may process a user action, including a customer service request, by determining how the user's social community behaved with the user. For example, the OBM may determine the user's reputation based on how the user's co-user (e.g., from the user's social graph data) interacted with the user (were there broken social loops?; did many of the user's requests to friends go unanswered?; did co-users flag the user as being fraudulent on a social networking service?; etc.). In such an example, the evaluation server may obtain the gaming pattern and social activity data pertaining to the single user, and may generate a timeline for the users' social-gaming activity, as well as a social-gaming thread for the user using the social-gaming activity timelines of the co-users of the user (e.g., inferred from the user's social activities and/or from the user's social graph). The evaluation server may also parse the social activity of the co-users of the user to find any messages posted with regard to the user. The evaluation server may. for example, run keyword searches through the social activity messages of the co-user of the user to find any messages pertaining to the user. If the evaluation server, e.g., generates CoS flags while processing this evaluation rule, the evaluation server may, e.g., generate a clearance acknowledgment attesting to the good reputation of the user, and may prioritize accordingly, any requests made by the user over other users, e.g., those with lower reputation scores as calculated by the evaluation server.

Figure 17:
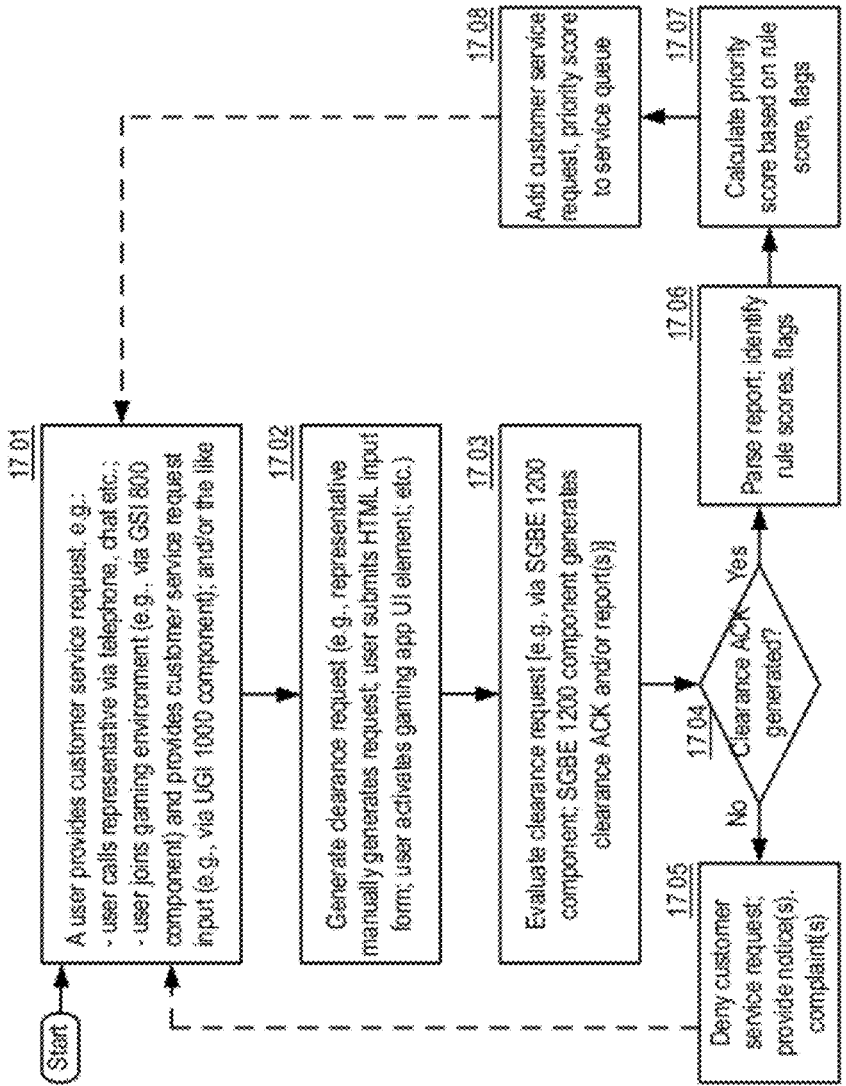
FIG. 17 is of a logic flow diagram illustrating example aspects of implementing a customer service request evaluator within the OBM in some embodiments of the OBM, e.g., a customer service request evaluator ("CSRE") component.

FIG. 17 is of a logic flow diagram illustrating example aspects of implementing a customer service request evaluator within the OBM in some embodiments of the OBM, e.g., a customer service request evaluator ("CSRE") component 1700. In some implementations, a user may provide 1701 a customer service request to the OBM. For example, the user may call a representative via a telephone, and provide a customer service request. The representative may then generate a clearance request message on behalf of the user, e.g., 1702. In other implementations, a user may initiate a gaming session (e.g., using a gaming session initiation component such as the example GSI 800 component described above with reference to FIGURES A-B) and provide the customer service request via the gaming session (e.g., via a HTML input form; via a user gaming interaction component such as the example UGI 1000 component described above with reference to FIGS. 10A-C, etc.). In such implementations, a gaming server (e.g., one that is part of the user gaming component being utilized by the user) may provide a clearance request. The OBM may provide the clearance request message for a social-gaming behavior evaluator component (e.g., the example SGBE 1200 component discussed above with reference to FIGS. 12A-E). The social gaming behavior evaluator component may evaluate, e.g., 1703, the customer service request message, e.g., utilizing customer service request evaluation rules such as, but not limited to, the customer service request evaluation rules described with reference to FIG. 16. If the social-gaming behavior evaluator generates a CoS order (e.g., 1704, option "No"), the OBM may deny the customer service request, and may provide generated notices, complaints, reports to the user(s) and/or OBM supervisor, security personnel, law enforcement agencies, etc. If the social-gaming behavior evaluator evaluates the customer service request favorably based on the application of the customer service request evaluation rules, the social-gaming behavior evaluator may provide a clearance acknowledgment (e.g., 1704, option "Yes") along with any reports and/or notices. The OBM (e.g., gaming server providing the clearance request message to the social-gaming behavior evaluator) may parse any reports provided by the social-gaming behavior evaluator, identify rule scores and/or any flags generated. The OBM may calculate a priority score for the customer service request based on the rule scores and/or flags. The OBM may then add the customer service request to a customer service request queue, along with the priority score associated with the customer service request.

Figure 18A:
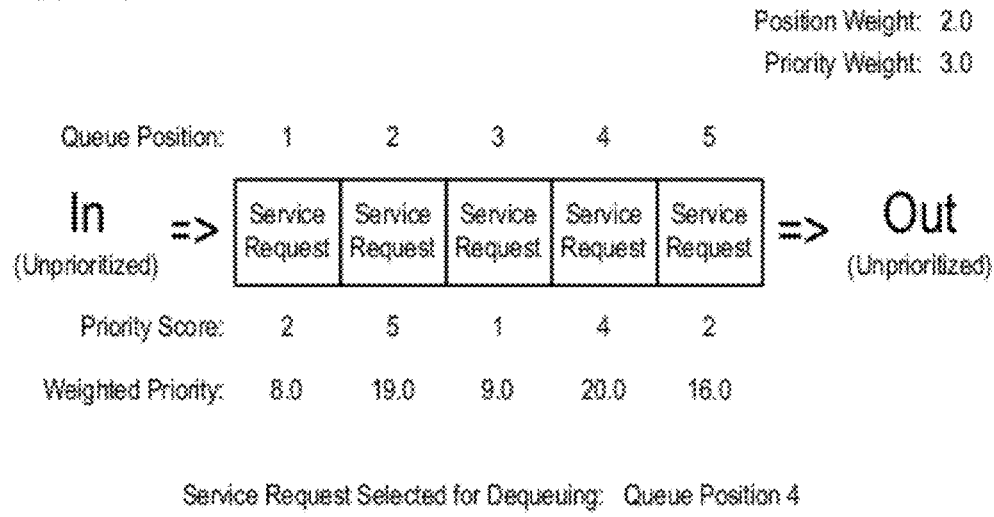
FIGS. 18A-B are of block diagrams illustrating example aspects of customer service request management in some embodiments of the OBM.
Figure 18B:
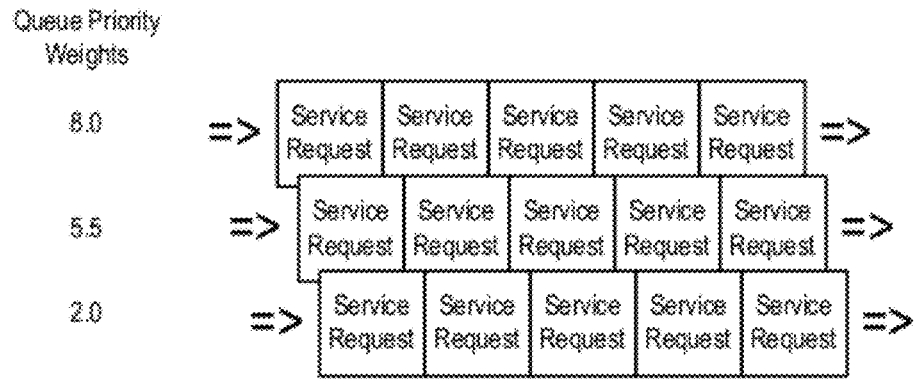

FIGS. 18A-B are of block diagrams illustrating example aspects of customer service request management in some embodiments of the OBM. In some implementations, the OBM may select the next customer service request to be processed according to a priority queuing process. In some implementations, the OBM may determine the next customer service request to process based on the order (e.g., using a timestamp submitted with each customer service request) in which the customer service requests entered the customer service request queue and a priority value assigned to each of the customer service requests (e.g., the priority score calculated by the OBM during customer service request evaluation by a social-gaming behavior evaluator and/or other component of the OBM). Each customer service request in a queue may be assigned a queue number indicative of the order in which the customer service requests entered the queue and a priority value indicative of the importance attached to processing the customer service request. In some implementations, the OBM may determine the customer service request priority values based on a number of factors including, but not limited to, customer service request ID, originator ID, and/or the like. In some implementations, the computing server may assign relative importance to the order in which customer service requests entered the queue and the priority value assigned to any particular customer service requests using position weights and/or priority weights. For example, a net priority value of a customer service request ("Net CSR Priority Value") in a queue may be determined by the OBM as the weighted sum of the queue position and the customer service request priority, wherein the weights are the position weight and the priority weight, as illustrated in FIG. 18A:

Net CSR Priority Value = Request Queue Position * Position Weight + Request Priority * Priority Weight;

In such implementations, the customer service request next selected for processing by the OBM may be identified as the customer service request having the highest net customer service request priority value. In further implementations, the OBM may utilize multiple queues for customer service requests, such as the non-limiting exemplary illustration in FIG. 18B. In some implementations, each queue may be assigned a queue priority weight relative to the other queues for customer service requests. In such implementations, the net priority value of a customer service request may be weighted by the weight assigned to its customer service request queue:

Net CSR Priority Value = (Request Queue Position * Position Weight + Request Priority * Priority Weight) * Queue Priority Weight;

In some such implementations, the next customer service request selected by the OBM for processing among the customer service requests in all the queues may be the customer service request having the highest net customer service request priority value, including the weighting assigned to each of the customer service request queues in the queue database.

Figure 19A:
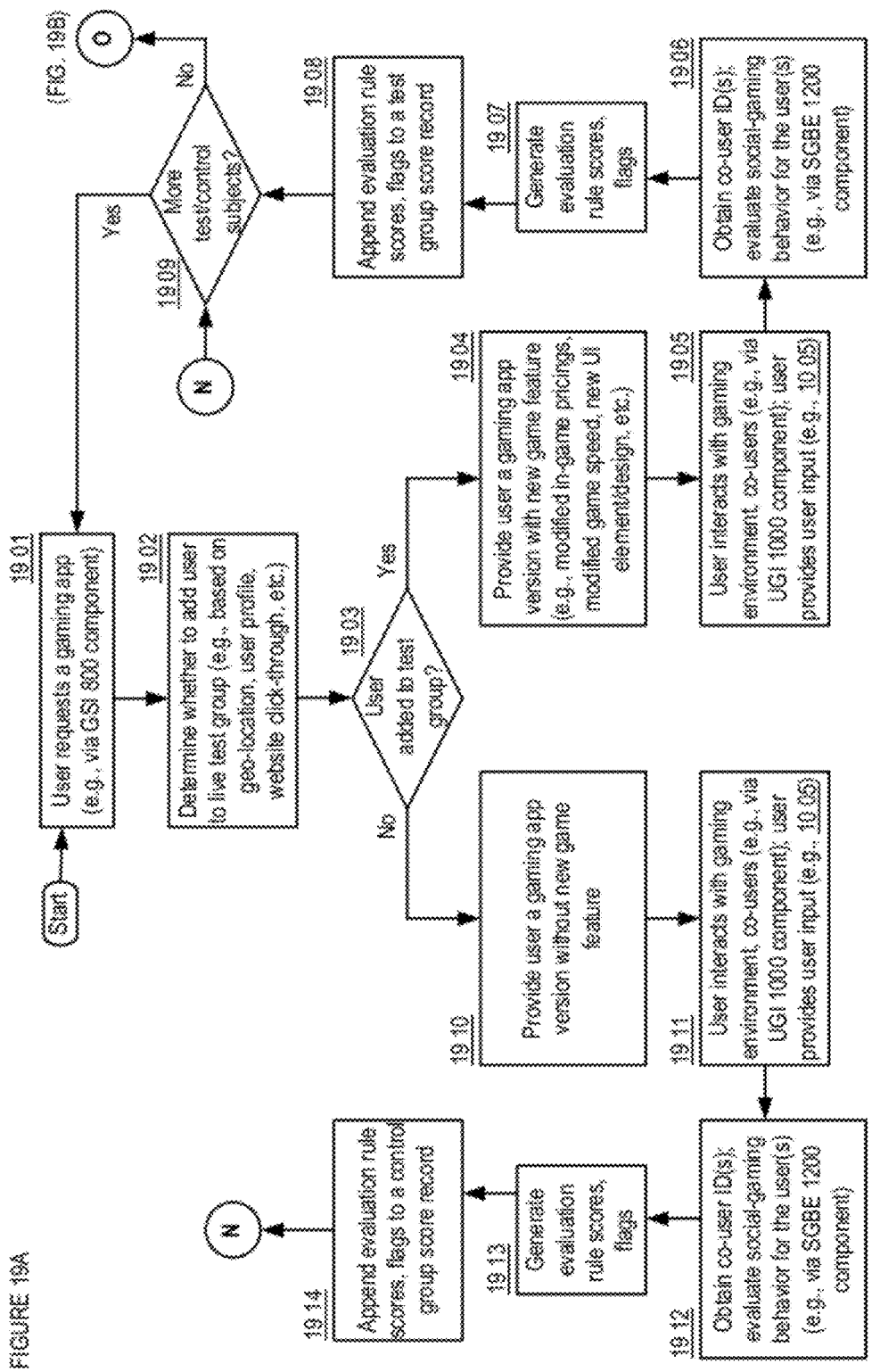
FIGS. 19A-B are of logic flow diagrams illustrating example aspects of implementing live testing of online games within the OBM in some embodiments of the OBM, e.g., a live online game tester ("LOGT") component.
Figure 19B:
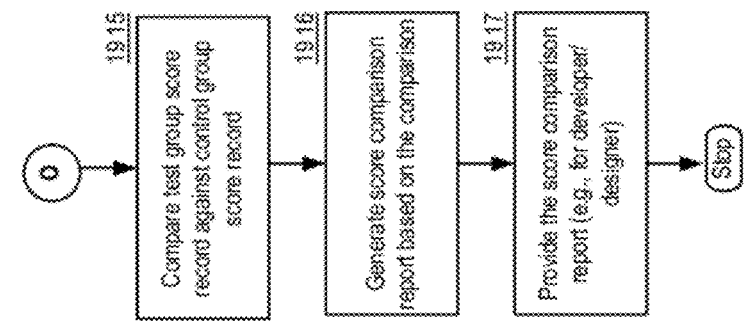

FIGS. 19A-B are of logic flow diagrams illustrating example aspects of implementing live testing of online games within the OBM in some embodiments of the OBM, e.g., a live online game tester ("LOGT") component 1900. In some implementations, the OBM may advantageously be utilized to perform live field tests of game features employing users interacting within social-gaming networks, similar to the discussion above with reference to FIG. 3. For example, users may be introduced into an A/B testing scheme when they request an app from the OBM. For example, in some implementations, a may request 1901 a gaming app from the OBM (e.g., via a gaming session initiation component such as the GSI 800 component described above with reference to FIGS. 8A-B). The OBM may determine whether to include the user in a live test. The OBM may also add the user to a live test group or a control group, if the OBM determines that the user will be included in the live test. For example, the OBM may determine 1902 whether to add a user to a live test and/or to which group to add the user based on factors including, but not limited to: the geo-location of the user, the IP address of the user, a user profile of the user, a reputation systems analysis of the user, for example, using the example SBGE 1200 component in a customer service request evaluator mode, and/or the like. If the OBM determines that the user will be added to the test group (e.g., 1903, option "Yes"), the OBM may, e.g., redirect the user's gaming app request to a gaming server that provides 1904 the user with a gaming app including a new game feature (e.g., modified in-game (virtual) item pricing, modified game speed, new user interface element/ design, etc.). In such implementations, the user may interact 1905 with the test gaming environment presented by the gaming app including the new game feature, e.g., using a user gaming interaction component such as the example UGI 1000 component described above with reference to FIGS. 10A-C. The user may, e.g., comment on the new game feature on a social networking service, with the user's game co-users via an in-game network, etc. The OBM may perform an evaluation 1906 of (e.g., parse) the user's social-gaming activity to determine whether the user liked the new game feature or not. The OBM may, for example, determine whether the user spent more money within the app, whether the user invited other users to try out the new game feature, whether the user commented on a social networking service post about the game feature, whether the user's social graph accepted the invitation to try the new game feature based on the user's invitations and/or comments on the social networking service, etc. The OBM may, e.g., utilize a social-gaming behavior evaluator such as the SGBE 1200 component to perform the evaluation of the user's and co-users' social-gaming behavior, generate 1907 evaluation score for the evaluation rules, and generate reports based on the scores and flags generated by the evaluation. The OBM may append 1908 the generated report for the user to an aggregated test group score record. If the OBM determines that more test subjects are needed (e.g., 1909, option "Yes"), the OBM may choose the test subjects from among the co-users that the user invited. In some implementations, the OBM may choose from among the co-user who viewed the user's comments on the social networking service. In other implementations, the OBM may eliminate the co-users of the user who have heard of, or have been invited to, or have tried, the new game feature as being biased in view of their exposure to the user's experience. It is to be understood that any combination of selection or elimination strategies may be employed to determine more users to use a test subjects in the live online game test.

In some implementations, the OBM may determine that a user requesting a gaming app be added to the control group of the live online game test (e.g., 1903, option "No"). In such implementations, the may redirect the user's gaming app request to a gaming server that provides 1910 the user with a gaming app that does not include the new game feature. In such implementations, the user may interact 1911 with the control gaming environment presented by the gaming app that does not include the new game feature, e.g., using a user gaming interaction component such as the example UGI 1000 component described above with reference to FIGS. 10A-C. The OBM may perform an evaluation 1912 of the user's gaming and/or social activity (e.g., via a SGBE 1200 component) in a manner similar to that performed by the SGBE 1200 component for the test users of the gaming app including the new game feature. The OBM may, e.g., utilize a social-gaming behavior evaluator such as the SGBE 1200 component to perform the evaluation of the user's and co-users' social-gaming behavior, generate 1913 evaluation score for the evaluation rules, and generate reports based on the scores and flags generated by the evaluation. The OBM may append 1914 the generated report for the control user to an aggregated control group score record. If the OBM determines that more test subjects are needed (e.g., 1909, option "Yes")), the OBM may choose more control users using a combination of user selection or elimination strategies as described above.

Upon completion of the live online game test using a sufficient number of test and/or control group users, the OBM (e.g., an evaluation/gaming server) may compare the test group score record to the control group score record, e.g., 1915. The OBM may generate a score comparison report based on the comparison, e.g., 1916, and provide the score comparison report, e.g., for a developer, user interface designer, game designer, game producer, etc.

Figure 20:
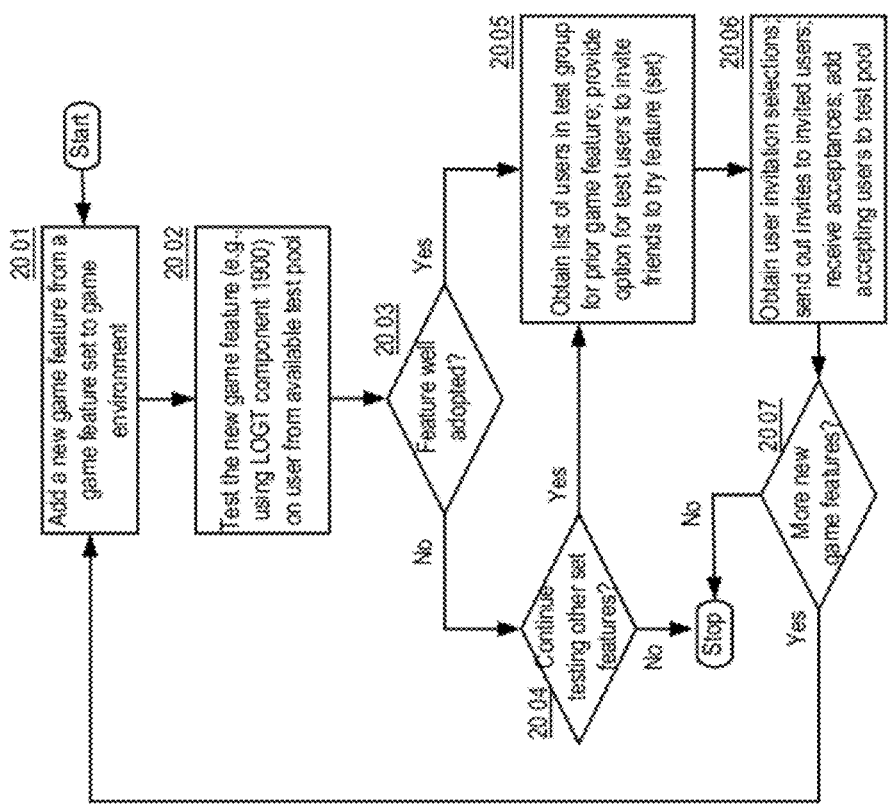
FIG. 20 is of a logic flow diagram illustrating example aspects of implementing live testing of a set of online game features within the OBM in some embodiments of the OBM, e.g., a game feature set tester ("GFST") component.

FIG. 20 is of a logic flow diagram illustrating example aspects of implementing live testing of a set of online game features within the OBM in some embodiments of the OBM, e.g., a game feature set tester ("GFST") component 2000. In some implementations, the OBM may test a suite of new game features in a live A/B test using test and control group users from the field. For example, the OBM may add 2001 a new game feature from a set of new game features to a game environment. The OBM may test 2002 the new game feature in a live online game test utilizing users from the field (e.g., using a live online game tester component such as the example LOGT 1900 component described above with reference to FIG. 19). The OBM may generate a score comparison report comparing the scores generated by the test group and the control group. Based on the score comparison report, the OBM may determine whether the feature was well adopted or not. If the feature was not well adopted (e.g., 2003, option "No"), the OBM may determine, based on the score comparison report, whether to continue testing other game features in the set. For example, if the new game feature tested was not adopted well and was a core feature of the new game feature set, the OBM may determine that further testing of other features in the new game feature set is not needed (e.g., 2004, option "No"). If the OBM determines that other set features may be tested (e.g., 2004, option "Yes"), the OBM may, in some implementations, attempt to increase the size of the test and control groups. For example, the OBM may obtain 2005 a list of the users in the test group that tested the current new game feature, and may provide an option for these users to invite more users to join the game feature set test and/or control groups (e.g., "Invite your friends to try out this cool game theme!," etc.). The OBM may obtain user invitation selections, and may send out invitations on behalf of the test group users to other invited users, requesting them to join the live online game feature set test. In some implementations, some of the invited users may accept to join the live online game feature test set. In response, the OBM may add 2006 the user ID(s) to a pool of potential test group users. If there are more game features in the set to test (e.g., 2007, option "Yes"), the OBM may repeat the procedure described above until there are no new game features in the set to be tested. It is to be understood that the OBM may test any combination of game features available in the new game feature set. The OBM may test different combinations of game features with different test group users, and/or may introduce the new game features to different users within the test group in different orders. Accordingly, the OBM may test all combinations of features, and roll-out strategies for the game features, in a live online game feature set test utilizing users from the field.

Figure 21B:
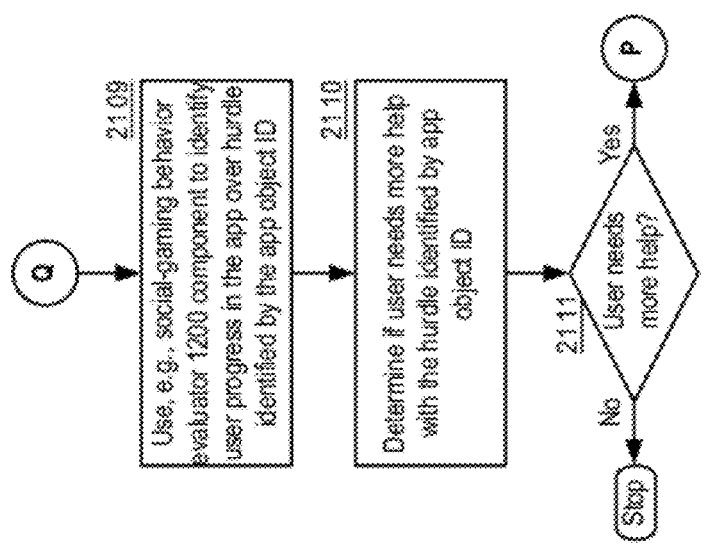

FIGS. 21A-B are of logic flow diagrams illustrating example aspects of implementing strategic game modification based on tracking engagement of a single user within the OBM in some embodiments of the OBM, e.g., a user engagement-tracking game modification ("U-ETGM") component 2100. In some implementations, the user may be struggling to overcome a hurdle (e.g., defeating a dragon in a particular stage of a game), and the user may be playing the game lesser because of the difficulty. The OBM may, as discussed previously with reference to FIG. 4, identify such users with waning engagement levels, and attempt to improve the user's engagement level by utilizing the user's social network. In some implementations, the OBM may obtain an indication that a user is suffering from low engagement in a gaming app.

For example, in some implementations, the user playing the app may click on link (e.g., within the app and/or browsing environment) provided to notify a gaming server that the user needs help (e.g., a hyperlink stating: "Need help defeating this dragon? Friends Unite!", etc.). In some implementations, the OBM may detect low engagement level of a user by monitoring the user's social-gaming behavior, e.g., using a SGBE 1200 component as discussed above with reference to FIGS. 12A-E. For example, the SGBE 1200 component may generate a historical graph of the user's activity level within the gaming app, and/or within the gaming network (e.g., if the user has switched from playing one gaming app to playing another gaming app). Accordingly, the OBM may obtain a trigger for initiating user engagement-tracking game modification from a variety of sources, or in a diagnostic manner. The trigger for engagement-tracking game modification may be, e.g., a clearance request provided to a SGBE 1200 component of the OBM (e.g., by the user, a gaming server, an evaluation server, and/or other OBM-affiliated entities). In some implementations, the OBM may obtain 2101 a clearance request and/or user gaming data/session state. The OBM may, e.g., using a social-gaming behavior evaluator component such as the example SGBE 1200 component, identify the user's co-users, generate a social-gaming activity thread for the user and/or co-users, and utilize the social-gaming threads to determine a subset of co-users who are most likely to help the user. For example, the social-gaming behavior evaluator may determine which co-users the user exchanged gifts with the most, with which co-users did the user have the most number of completed social loops, which co-users spent the most amount of money, which co-users conducted the greatest number of transactions, which co-users messaged the user the most, and/or the like. For example, the social-gaming behavior evaluator may generate flags and/or scores based on factor including, but not limited to, factors such as those listed above. The OBM may identify 2102 which co-users are most likely to help, or be able to help, the user based on the scores generated by the social-gaming behavior evaluator.

In some implementations, the OBM may identify 2103 a hurdle within a game that is causing the user to experience low engagement levels. For example, each object within the gaming app may be assigned an object ID. The OBM may determine which object ID is associated with the game feature that the user is experiencing difficulty with. For example, the OBM may utilize a social-gaming behavior evaluator to generate a social-gaming activity timeline of the user experiencing a low engagement level, and identify a temporal (e.g., stage within a game) and/or spatial (e.g., pixel sub-area within an Adobe® Flash object) position within the gaming app at which point the user tends to stop playing the game within a user session. In some implementations, each object ID and/or stage within a gaming app may have a difficulty weight associated with it. In some of these implementations, the difficulty weight of the object ID and/or stage may be modifiable during the user's gaming session. In some implementations, the OBM may lower the difficulty weight associated with object ID and/or stage identified as being the object ID and/or stage at which the user tends to stop playing the game.

In some implementations, the OBM may identify incentives that the OBM can provide for the user and/or co-users determined by the OBM to be likely to help the user achieve higher engagement levels. The OBM may provide incentives to encourage the user to re-establish higher engagement levels within the game, or may encourage the co-users to contribute to increasing the user's engagement level. For example, the OBM may obtain and/or parse the user profiles and/or social activity messages of the user and co-users to identify keywords that the OBM can use in a search for (virtual) products to offer for sale to the user and/or co-users. The OBM may utilize the keywords to query 2104 a (virtual) product database for items that may be offered to the user and/or co-user. In some implementations, the OBM may also utilize keywords related to the object ID within the app and/or the stage of the game to query for items that may be offered for sale. The (virtual) product database may provide search results listing products for the OBM to offer to the user and/or co-users. The OBM may provide the (virtual) items 2105 in a flash sale for the user, and/or co-users with an invitation 2106 to the co-users to help the user overcome the hurdle in the user's game. For example, the OBM may provide a message for a co-user (e.g., "Jane needs help defeating the dragon. Buy from the items below at special discounted prices; join Jane's game and use them to help her fight the dragon!") encouraging the co-user to purchase an offered item, and/or join the user's gaming environment to help the user overcome the hurdle in the game. In some implementations, the OBM may reduce the difficulty weight of the object ID and/or game stage upon co-users of the user accepting the invitation to join the user's game to help overcome the hurdle presented by the object ID and/or game stage within the game. In some implementations, the OBM may provide, to co-users that help the user, rewards and/or incentives within their own gaming apps and/or offering further flash sales of items, e.g., at discounted prices because the co-users helped the user overcome the hurdle in the user's game. For example, the OBM may reduce the difficulty weight for objects and/or game stages within the co-users' gaming apps so as to improve their engagement levels within their own gaming apps. For example, the OBM may calculate new difficulty weights 2107 for objects and/or game stages in the gaming apps of the user and/or the co-users based on factors including, but not limited to: number of items sold in the flash sale connected to the invitation to help the user, number of co-users accepting the invitations to help the user, amount of flash sales connected to the invitation to help the user, and/or the like. In some implementations, upon the co-users accepting the invitations, the OBM may process the co-users' and user's sale item purchases (e.g., using an online shopping system such as the OpenCart open-source online shopping solution). The OBM may also inject the co-users into the gaming environment of the user (e.g., using a gaming session initialization such as the example GSI 800 component).

In some implementations, the OBM may, e.g., 2109, utilize a social-gaming behavior evaluator (e.g., SGBE 1200 component) to generate a social-gaming activity timeline of the user, and determine whether the user has progressed over the hurdle identified by the app object ID and/or game stage. In some implementations, the OBM may also determine whether the user requires any more help with the identified hurdle, or any other hurdle the user may be experiencing within the game, e.g., 2110. If the OBM determines that the user needs more help (e.g., 2111, option "Yes"), the OBM may repeat a procedure similar to that discussed above for the user until the OBM determines that the user's engagement levels are comparable to historical levels for the user, e.g., as determined using a social-gaming behavior evaluator component.

Figure 22A:
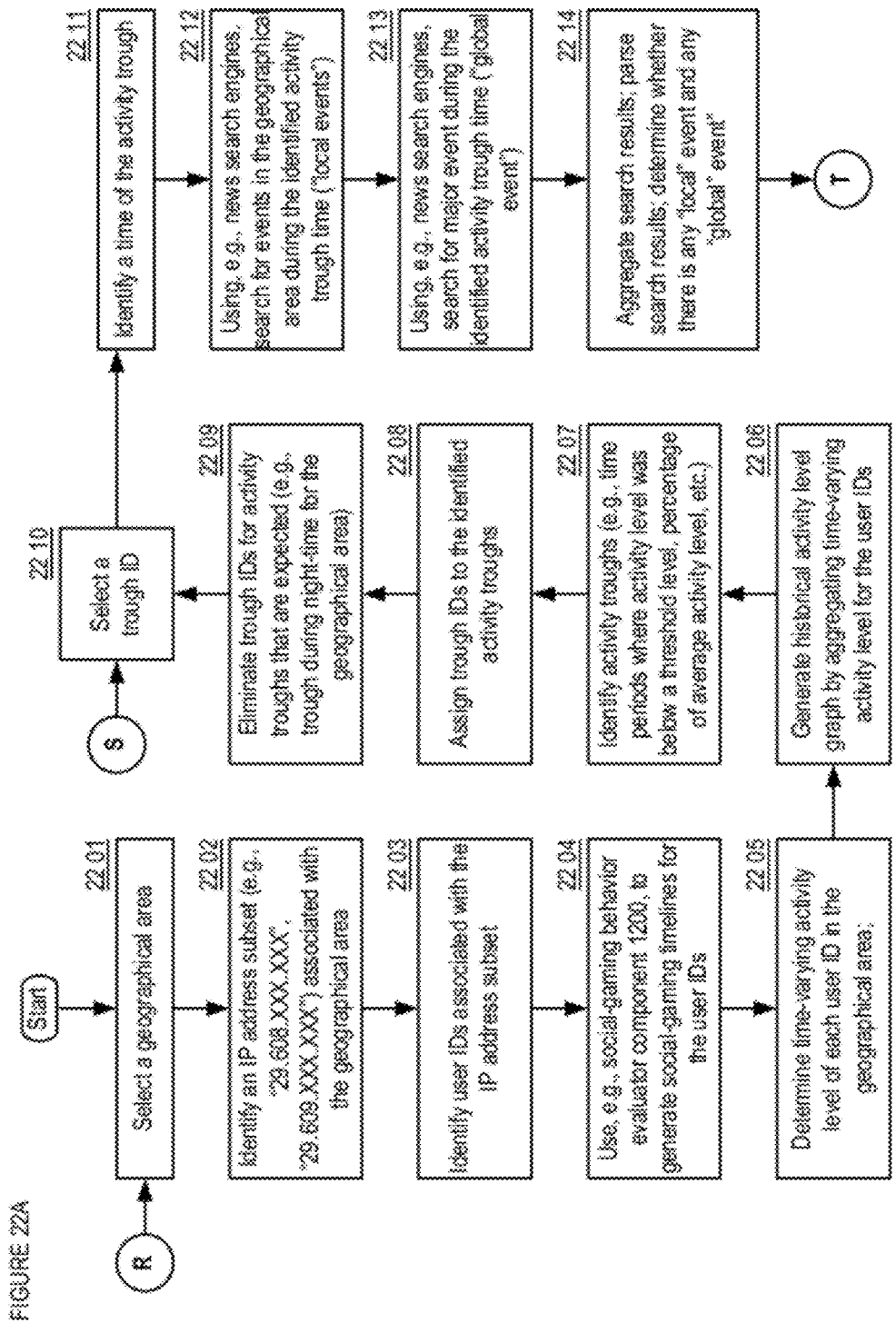
FIGS. 22A-C are of logic flow diagrams illustrating example aspects of implementing strategic game modification based on tracking engagement of a group of users within the OBM in some embodiments of the OBM, e.g., a group engagement-tracking game modification ("G-ETGM") component.
Figure 22B:
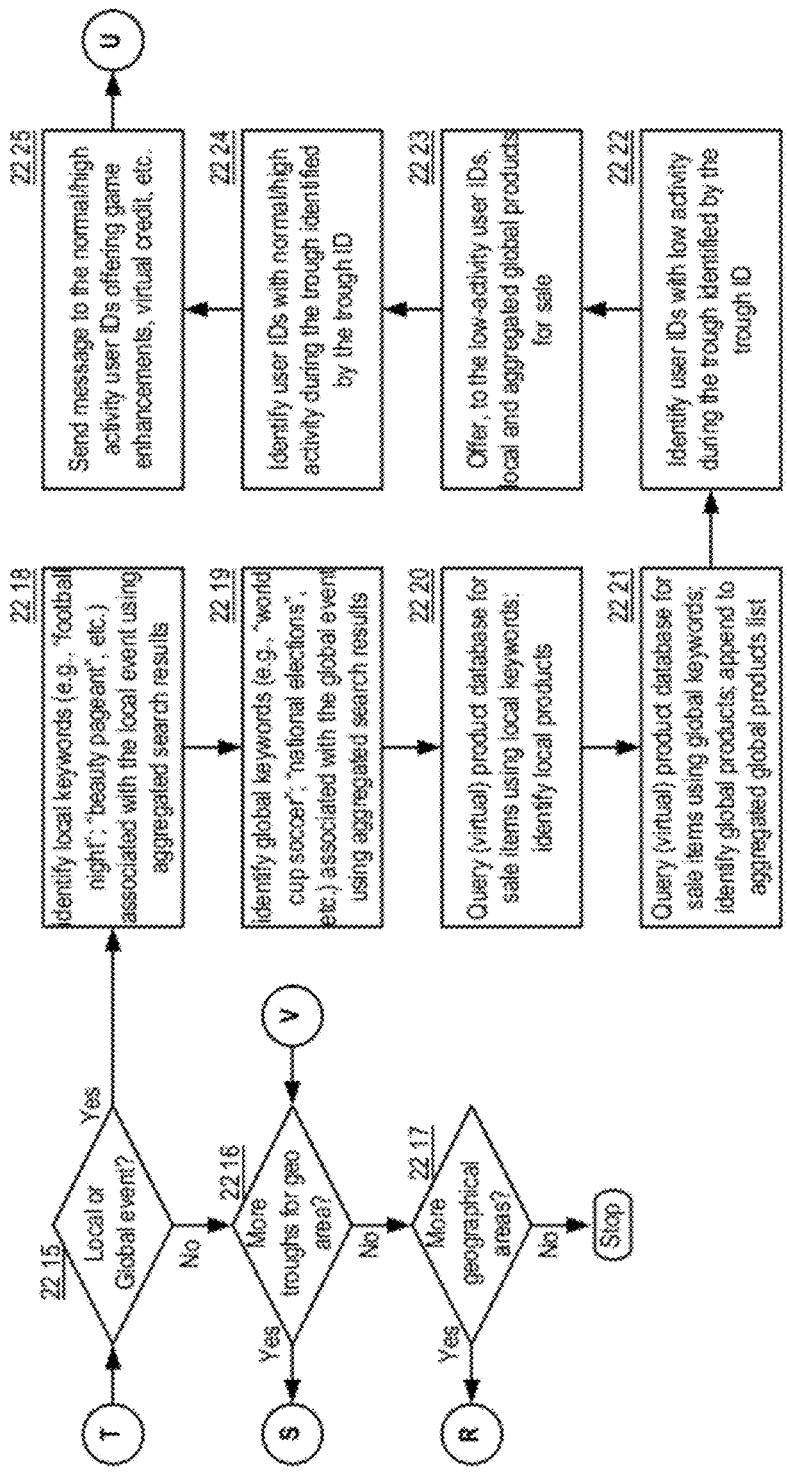
Figure 22C:
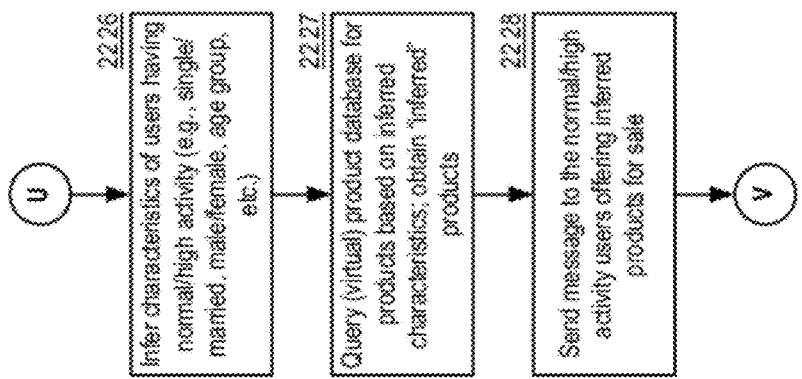

FIGS. 22A-C are of logic flow diagrams illustrating example aspects of implementing strategic game modification based on tracking engagement of a group of users within the OBM in some embodiments of the OBM, e.g., a group engagement-tracking game modification ("G-ETGM") component 2200. In some implementations, the OBM may track events, e.g., in real-time, occurring at a specific geographical region that may affect the online social-gaming behavior of users within that geographical region, and/or users major events that may affect users at a wide range of geographical regions. For example, the OBM may detect that the aggregate engagement of a group of users at a particular location may drop, and the drop may coincide with an event occurring at that location (e.g., high-school football game), and/or an event occurring at another location (e.g., world cup soccer game). The OBM may, in some implementations, track such user engagement anomalies, determine inferences about the population of users who temporarily lose engagement in the gaming apps, and determine inferences about those users who did not lose engagement in the gaming apps even during the time period of the event. In some implementations, the OBM may utilize the inferences to offer rewards for loyalty/engagement, prioritization of service and/or (e.g., in-game) requests, offer incentives to maintain/re-attain high engagement levels, offer products targeted at the users based on statistical estimation of the personal characteristics of the groups of users based on their online social-gaming behavior during such geographically-specific events, etc.

In some implementations, the OBM may identify a distinct geographical area, e.g., 2201. The OBM may, e.g., identify 2202 a set of Internet Protocol ("IP") addresses associated with the geographical area. Upon identifying a set of IP addresses associated with the area, the OBM may determine a set of user IDs associated with geographical area, e.g., 2203, based on querying the gaming environment databases using the identified IP addresses. The OBM may, e.g., utilize a social-gaming behavior evaluator component (such as the example SGBE 1200 component), to generate social-gaming activity timelines for the identified user IDs, e.g., 2204. Further, the OBM may generate a time-varying activity level histogram, e.g., 2205, for each user ID. For example, the OBM may generate, for each user ID, a histogram with a period in time on the x-axis, and frequency of activity on the y-axis. The OBM may generate a historical aggregate activity level graph by aggregating the histograms for the identified user IDs, e.g., 2206. The OBM may then identify troughs, e.g., 2207, in the aggregate activity level graph (e.g., by calculating a graph of the differentiation of the activity level graph with respect to time, and identifying any negative spikes in the differentiation graph, identifying time periods where activity level was below a threshold level, or a threshold percentage of the historical average activity level, etc.). The OBM may assign a trough ID to each of the identified troughs in the aggregate activity level graph, e.g., 2208. The OBM may, in some implementations, analyze the positions of the trough compared to the time of day in the geographical region, and neglect/eliminate, e.g., 2209, activity troughs that are expected (e.g., night-time, peak hours in work day, etc.). The OBM may then analyze each activity trough remaining in the aggregate activity level graph.

In some implementations, the OBM may select, e.g., 2210, a trough identified by a trough ID. The OBM may identify a time of the activity trough, e.g., 2211. The OBM may initiate searches (e.g., using news aggregators, search engines, etc.) for events that occurred during the time period of the activity trough. For example, the OBM may attempt to identify, e.g., 2212, a "local" event, e.g., an event that occurred within the geographical region during the period of the activity trough. The OBM may, in some implementations, attempt to identify, e.g., 2213, a "global" event, e.g., an event that occurred outside of the geographical region during the period of the activity trough. For example, the OBM may aggregate the search results from a variety of news sources, and analyze, e.g., using keyword matching, latent semantic indexing, etc., the aggregated search results to identify any events recurring in the aggregated search results. Based on the analysis, the OBM may identify a local event and/or a global event, or not identify any event during the time period of the activity trough. If the OBM does not find any local or global event (e.g., 2215, option "No"), the OBM may repeat the above procedure for a different activity trough, if there are further activity trough identified for the geographical area (e.g., 2216, option "Yes"). If there are no further activity troughs for the geographical area (e.g., 2216, option "No"), the OBM may repeat the above procedure for another geographical area, if there are further geographical areas for which the OBM can perform the above procedure (e.g., 2217, option "Yes"). If there are no further geographical areas for which to perform the procedure above (e.g., 2217, option "No"), the OBM may end the procedure.

In some implementations, the OBM may find a local and/or global event during an activity trough for the aggregate activity graph of users confined to a specific geographical area (e.g., 2215, option "Yes"). In such implementations, the OBM may identify keywords associated with a local event (if any) based on the results of the analysis (e.g., using latent semantic indexing) of the aggregated search results, e.g., 2218. the OBM may identify keywords associated with a global event (if any) based on the results of the analysis (e.g., using latent semantic indexing) of the aggregated search results, e.g., 2219. The OBM may utilize the keywords obtained from analyzing the aggregated search results to query a (virtual) product database for (virtual) items (e.g., physical objects, which may also include game incentives, virtual objects to reduce the in-game difficulty levels of objects and/or game stages, etc.) that may be offered for sale for the users in the geographical area. For example, the OBM may identify "local" items in the product database based on querying the database using keywords associated with the local event, e.g., 2220, and "global" items in the products database based on querying the database using keywords associated with the global event, e.g., 2221. The OBM may aggregate the products search results based on the "global keywords" to a global products list.

Upon identifying items from the products database to offer for the users of the geographical area, the OBM may identify, e.g., 2222, the user IDs that had low individual activity levels during the period of the aggregate activity level trough (e.g., using a SGBE 1200 component). In some implementations, the OBM may offer the local items (if any) and global items for the aggregated list of global items (if any) for sale to the user IDs identified as having low activity levels during the aggregate activity level trough, e.g., 2223. For example, the OBM may identify an IP address of a mobile device utilized by a user having low activity level during the aggregate activity level trough, and send a message (e.g., text message, SMS, e-mail message, tweet, and/or the like) offering the items for sale (e.g., at discounted prices, combined with in-game incentives, etc.). In some implementations, the OBM may identify anomalous users (e.g., those who had normal/high individual activity levels during the aggregate activity level trough), e.g., 2224. The OBM may, in such implementations, provide, e.g., 2225, messages to the identified users offering encouragement, loyalty rewards, in-game credits, and/or the like. The OBM may, in some implementations, infer, e.g., 2226, characteristics of users having normal/high individual activity levels during an aggregate activity level trough (e.g., male, single, student, age group, etc.). The OBM may generate keywords based on the inferred characteristics, and query, e.g., 2227, the products database based on the inferred-characteristics keywords and obtain "inferred products" search results. The OBM may, in some implementations, provide such identified products for sale to the users exhibiting normal/high individual activity levels during the aggregate activity level trough, e.g., 2228.

OBM Controller

Figure 23:
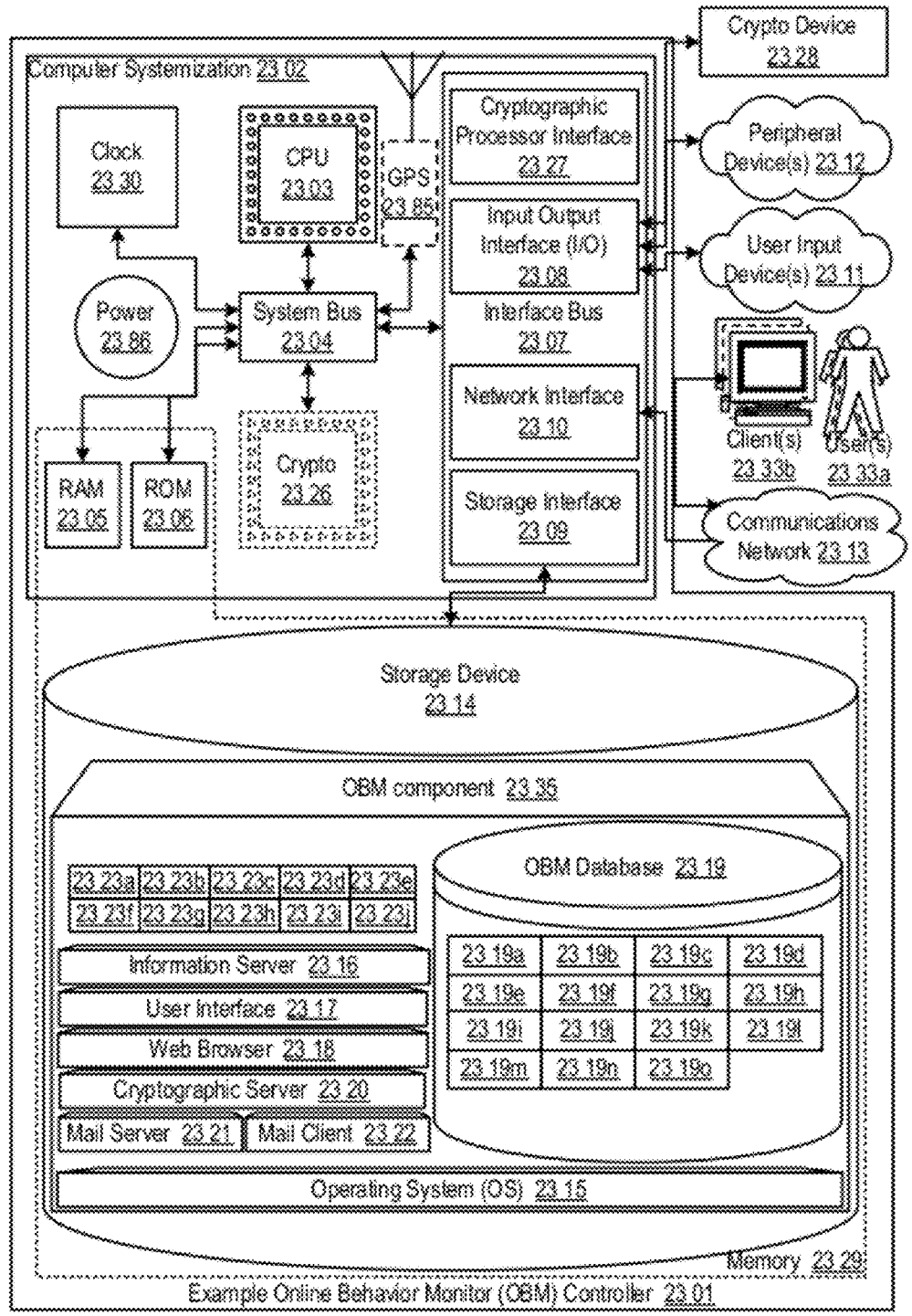
FIG. 23 is of a block diagram illustrating embodiments of the OBM controller.

FIG. 23 illustrates inventive aspects of a OBM controller 2301 in a block diagram. In this embodiment, the OBM controller 2301 may serve to aggregate, process, store, search, serve, identify, instruct, generate, match, and/or facilitate interactions with a computer through enterprise and human resource management technologies, and/or other related data.

Typically, users, which may be people and/or other systems, may engage information technology systems (e.g., computers) to facilitate information processing. In turn, computers employ processors to process information; such processors 2303 may be referred to as central processing units (CPU). One form of processor is referred to as a microprocessor. CPUs use communicative circuits to pass binary encoded signals acting as instructions to enable various operations. These instructions may be operational and/or data instructions containing and/or referencing other instructions and data in various processor accessible and operable areas of memory 2329 (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which, may be executed by CPU on a computer; the operating system enables and facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the OBM controller 2301 may be connected to and/or communicate with entities such as, but not limited to: one or more users from user client devices 2311; peripheral devices 2312; an optional cryptographic processor device 2328; and/or a communications network 2313. For example, the OBM controller 2301 may be connected to and/or communicate with users operating client device(s) including, but not limited to, personal computer(s), server(s) and/or various mobile device(s) including, but not limited to, cellular telephone(s), smartphone(s) (e.g., iPhone®, Blackberry®, Android OS-based phones etc.), tablet computer(s) (e.g., Apple iPad™, HP Slate™ etc.), eBook reader(s) (e.g., Amazon Kindle™ etc.), laptop computer(s), notebook(s), netbook(s), gaming console(s) (e.g., XBOX Live™, Nintendo® DS etc.), portable scanner(s) and/or the like.

Networks are commonly thought to comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The OBM controller 2301 may be based on computer systems that may comprise, but are not limited to, components such as: a computer systemization 2302 connected to memory 2329.

Computer Systemization

A computer systemization 2302 may comprise a clock 2330, central processing unit ("CPU(s)" and/or "processor(s)" (these terms are used interchangeable throughout the disclosure unless noted to the contrary)) 2303, a memory 2329 (e.g., a read only memory (ROM) 2306, a random access memory (RAM) 2305, etc.), and/or an interface bus 2307, and most frequently, although not necessarily, are all interconnected and/or communicating through a system bus 2304 on one or more (mother)board(s) 2302 having conductive and/or otherwise transportive circuit pathways through which instructions (e.g., binary encoded signals) may travel to effect communications, operations, storage, etc. Optionally, the computer systemization may be connected to an internal power source 2386. Optionally, a cryptographic processor 2326 may be connected to the system bus. The system clock typically has a crystal oscillator and generates a base signal through the computer systemization's circuit pathways. The clock is typically coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be commonly referred to as communications. These communicative instructions may further be transmitted, received, and the cause of return and/or reply communications beyond the instant computer systemization to: communications networks, input devices, other computer systemizations, peripheral devices, and/or the like. Of course, any of the above components may be connected directly to one another, connected to the CPU, and/or organized in numerous variations employed as exemplified by various computer systems.

The CPU comprises at least one high-speed data processor adequate to execute program components for executing user and/or system-generated requests. Often, the processors themselves will incorporate various specialized processing units, such as, but not limited to: integrated system (bus)

controllers, memory management control units, floating point units, and even specialized processing sub-units like graphics processing units, digital signal processing units, and/or the like. Additionally, processors may include internal fast access addressable memory, and be capable of mapping and addressing memory 2329 beyond the processor itself; internal memory may include, but is not limited to: fast registers, various levels of cache memory (e.g., level 1, 2, 3, etc.), RAM, etc. The processor may access this memory through the use of a memory address space that is accessible via instruction address, which the processor an construct and decode allowing it to access a circuit path to a specific memory address space having a memory state. The CPU may be a microprocessor such as: AMD's Athlon, Duron and/or Opteron; ARM's application, embedded and secure processors; IBM and/or Motorola's DragonBall and PowerPC; IBM's and Sony's Cell processor; Intel's Celeron, Core (2) Duo, Itanium, Pentium, Xeon, and/or XScale; and/or the like processor(s). The CPU interacts with memory through instruction passing through conductive and/or transportive conduits (e.g., (printed) electronic and/or optic circuits) to execute stored instructions (i.e., program code) according to conventional data processing techniques. Such instruction passing facilitates communication within the OBM controller and beyond through various interfaces. Should processing requirements dictate a greater amount speed and/or capacity, distributed processors (e.g., Distributed OBM), mainframe, multi-core, parallel, and/or super-computer architectures may similarly be employed. Alternatively, should deployment requirements dictate greater portability, smaller Personal Digital Assistants (PDAs) may be employed.

Depending on the particular implementation, features of the OBM may be achieved by implementing a microcontroller such as CAST's R8051XC2 microcontroller; Intel's MCS 51 (i.e., 8051 microcontroller); and/or the like. Also, to implement certain features of the OBM, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the OBM component collection (distributed or otherwise) and/or features may be implemented via the microprocessor and/or via embedded components; e.g., via ASIC, coprocessor, DSP, FPGA, and/or the like. Alternately, some implementations of the OBM may be implemented with embedded components that are configured and used to achieve a variety of features or signal processing.

Depending on the particular implementation, the embedded components may include software solutions, hardware solutions, and/or some combination of both hardware/software solutions. For example, OBM features discussed herein may be achieved through implementing FPGAs, which are a semiconductor devices containing programmable logic components called "logic blocks", and programmable interconnects, such as the high performance FPGA Virtex series and/or the low cost Spartan series manufactured by Xilinx. Logic blocks and interconnects can be programmed by the customer or designer, after the FPGA is manufactured, to implement any of the OBM features. A hierarchy of programmable interconnects allow logic blocks to be interconnected as needed by the OBM system designer/administrator, somewhat like a one-chip programmable breadboard. An FPGA's logic blocks can be programmed to perform the function of basic logic gates such as AND, and XOR, or more complex combinational functions such as decoders or simple mathematical functions. In most FPGAs, the logic blocks also include memory elements, which may be simple flip-flops or more complete blocks of memory. In some circumstances, the OBM may be developed on regular FPGAs and then migrated into a fixed version that more resembles ASIC implementations. Alternate or coordinating implementations may migrate OBM controller features to a final ASIC instead of or in addition to FPGAs. Depending on the implementation all of the aforementioned embedded components and microprocessors may be considered the "CPU" and/or "processor" for the OBM.

Power Source

The power source 2386 may be of any standard form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 2386 is connected to at least one of the interconnected subsequent components of the OBM thereby providing an electric current to all subsequent components. In one example, the power source 2386 is connected to the system bus component 2304. In an alternative embodiment, an outside power source 2386 is provided through a connection across the I/O 2308 interface. For example, a USB and/or IEEE 1394 connection carries both data and power across the connection and is therefore a suitable source of power.

Interface Adapters

Interface bus(ses) 2307 may accept, connect, and/or communicate to a number of interface adapters, conventionally although not necessarily in the form of adapter cards, such as but not limited to: input output interfaces (I/O) 2308, storage interfaces 2309, network interfaces 2310, and/or the like. Optionally, cryptographic processor interfaces 2327 similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 2309 may accept, communicate, and/or connect to a number of storage devices such as, but not limited to: storage devices 2314, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 2310 may accept, communicate, and/or connect to a communications network 2313. Through a communications network 2313, the OBM controller is accessible through remote clients 2333b (e.g., computers with web browsers) by users 2333a. Network interfaces may employ connection protocols such as, but not limited to: direct connect, Ethernet (thick, thin, twisted pair 10/100/1000 Base T, and/or the like), Token Ring, wireless connection such as IEEE 802.11a-x, and/or the like. Should processing requirements dictate a greater amount speed and/or capacity, distributed network controllers (e.g., Distributed OBM), architectures may similarly be employed to pool, load balance, and/or otherwise increase the communicative bandwidth required by the OBM controller. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface. Further, multiple network interfaces 2310 may be used to engage with various communications network types 2313. For example, multiple network interfaces may be employed to allow for the communication over broadcast, multicast, and/or unicast networks.

Input Output interfaces (I/O) 2308 may accept, communicate, and/or connect to user input devices 2311, peripheral devices 2312, cryptographic processor devices 2328, and/or the like. I/O may employ connection protocols such as, but not limited to: audio: analog, digital, monaural, RCA, stereo, and/or the like; data: Apple Desktop Bus (ADB), IEEE 1394a-b, serial, universal serial bus (USB); infrared; joystick; keyboard; midi; optical; PC AT; PS/2; parallel; radio; video interface: Apple Desktop Connector (ADC), BNC, coaxial, component, composite, digital, Digital Visual Interface (DVI), high-definition multimedia interface (HDMI), RCA, RF antennae, S-Video, VGA, and/or the like; wireless: 802.11a/b/g/n/x, Bluetooth, code division multiple access (CDMA), global system for mobile communications (GSM), WiMax, etc.; and/or the like. One typical output device may include a video display, which typically comprises a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Another output device is a television set, which accepts signals from a video interface. Typically, the video interface provides the composited video information through a video connection interface that accepts a video display interface (e.g., an RCA composite video connector accepting an RCA composite video cable; a DVI connector accepting a DVI display cable, etc.).

User input devices 2311 may be card readers, dongles, finger print readers, gloves, graphics tablets, joysticks, keyboards, mouse (mice), remote controls, retina readers, trackballs, trackpads, and/or the like.

Peripheral devices 2312 may be connected and/or communicate to I/O and/or other facilities of the like such as network interfaces, storage interfaces, and/or the like. Peripheral devices may be audio devices, cameras, dongles (e.g., for copy protection, ensuring secure transactions with a digital signature, and/or the like), external processors (for added functionality), goggles, microphones, monitors, network interfaces, printers, scanners, storage devices, video devices, video sources, visors, and/or the like.

It should be noted that although user input devices and peripheral devices may be employed, the OBM controller may be embodied as an embedded, dedicated, and/or monitor-less (i.e., headless) device, wherein access would be provided over a network interface connection.

Cryptographic units such as, but not limited to, microcontrollers, processors 2326, interfaces 2327, and/or devices 2328 may be attached, and/or communicate with the OBM controller. A MC68HC16 microcontroller, manufactured by Motorola Inc., may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of CPU. Equivalent microcontrollers and/or processors may also be used. Other commercially available specialized cryptographic processors include: the Broadcom's CryptoNetX and other Security Processors; nCipher's nShield, SafeNet's Luna PCI (e.g., 7100) series; Semaphore Communications' 40 MHz Roadrunner 184; Sun's Cryptographic Accelerators (e.g., Accelerator 6000 PCIe Board, Accelerator 500 Daughtercard); Via Nano Processor (e.g., L2100, L2200, U2400) line, which is capable of performing 500+ MB/s of cryptographic instructions; VLSI Technology's 33 MHz 6868; and/or the like.

Memory

Generally, any mechanization and/or embodiment allowing a processor to affect the storage and/or retrieval of information is regarded as memory 2329. However, memory is a fungible technology and resource, thus, any number of memory embodiments may be employed in lieu of or in concert with one another. It is to be understood that the OBM controller and/or a computer systemization may employ various forms of memory 2329. For example, a computer systemization may be configured wherein the functionality of on-chip CPU memory (e.g., registers), RAM, ROM, and any other storage devices are provided by a paper punch tape or paper punch card mechanism; of course such an embodiment would result in an extremely slow rate of operation. In a typical configuration, memory 2329 will include ROM 2306, RAM 2305, and a storage device 2314. A storage device 2314 may be any conventional computer system storage. Storage devices may include a drum; a (fixed and/or removable) magnetic disk drive; a magneto-optical drive; an optical drive (i.e., Blueray, CD ROM/RAM/Recordable (R)/ReWritable (RW), DVD R/RW, HD DVD R/RW etc.); an array of devices (e.g., Redundant Array of Independent Disks (RAID)); solid state memory devices (USB memory, solid state drives (SSD), etc.); other processor-readable storage mediums; and/or other devices of the like. Thus, a computer systemization generally requires and makes use of memory.

Component Collection

The memory 2329 may contain a collection of program and/or database components and/or data such as, but not limited to: operating system component(s) 2315 (operating system); information server component(s) 2316 (information server); user interface component(s) 2317 (user interface); Web browser component(s) 2318 (Web browser); database(s) 2319; mail server component(s) 2321; mail client component(s) 2322; cryptographic server component(s) 2320 (cryptographic server); the OBM component(s) 2335; and/or the like (i.e., collectively a component collection). These components may be stored and accessed from the storage devices and/or from storage devices accessible through an interface bus.

Although non-conventional program components such as those in the component collection, typically, are stored in a local storage device 2314, they may also be loaded and/or stored in memory such as: peripheral devices, RAM, remote storage facilities through a communications network, ROM, various forms of memory, and/or the like.

Operating System

The operating system component 2315 is an executable program component facilitating the operation of the OBM controller. Typically, the operating system facilitates access of I/O, network interfaces, peripheral devices, storage devices, and/or the like. The operating system may be a highly fault tolerant, scalable, and secure system such as: Apple Macintosh OS X (Server); AT&T Nan 9; Be OS; Unix and Unix-like system distributions (such as AT&T's UNIX; Berkley Software Distribution (BSD) variations such as FreeBSD, NetBSD, OpenBSD, and/or the like; Linux distributions such as Red Hat, Ubuntu, and/or the like); and/or the like operating systems. However, more limited and/or less secure operating systems also may be employed such as Apple Macintosh OS, IBM OS/2, Microsoft COS, Microsoft Windows 2000/2003/3.1/95/98/CE/Millenium/NT/Vista/XP (Server), Palm OS, and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the OBM controller to communicate with other entities through a communications network 2313. Various communication protocols may be used by the OBM controller as a subcarrier transport mechanism for interaction, such as, but not limited to: multicast, TCP/IP, UDP, unicast, and/or the like.

Information Server

An information server component 2316 is a stored program component that is executed by a CPU. The information server may be a conventional Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C# and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, wireless application protocol (WAP), WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., America Online (AOL) Instant Messenger (AIM), Application Exchange (APEX), ICQ, Internet Relay Chat (IRC), Microsoft Network (MSN) Messenger Service, Presence and Instant Messaging Protocol (PRIM), Internet Engineering Task Force's (IETF's) Session Initiation Protocol (SIP), SIP for Instant Messaging and Presence Leveraging Extensions (SIMPLE), open XML-based Extensible Messaging and Presence Protocol XMPP) (i.e., Jabber or Open Mobile Alliance's (OMA's) Instant Messaging and Presence Service (IMPS)), Yahoo! Instant Messenger Service, and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the OBM controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the OBM database 2319, operating systems, other program components, user interfaces, Web browsers, and/or the like.

Access to the OBM database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the OBM. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the OBM as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

The function of computer interfaces in some respects is similar to automobile operation interfaces. Automobile operation interface elements such as steering wheels, gearshifts, and speedometers facilitate the access, operation, and display of automobile resources, functionality, and status. Computer interaction interface elements such as check boxes, cursors, menus, scrollers, and windows (collectively and commonly referred to as widgets) similarly facilitate the access, operation, and display of data and computer hardware and operating system resources, functionality, and status. Operation interfaces are commonly called user interfaces. Graphical user interfaces (GUIs) such as the Apple Macintosh Operating System's Aqua, IBM's OS/2, Microsoft's Windows 2000/2003/3.1/95/98/CE/Millenium/NT/XP/Vista/7 (i.e., Aero), Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, Java, JavaScript, etc. interface libraries such as, but not limited to, Dojo, jQuery(UI), MooTools, Prototype, script.aculo.us, SWFObject, Yahoo! User Interface, any of which may be used and) provide a baseline and means of accessing and displaying information graphically to users.

A user interface component 2317 is a stored program component that is executed by a CPU. The user interface may be a conventional graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 2318 is a stored program component that is executed by a CPU. The Web browser may be a conventional hypertext viewing application such as Microsoft Internet Explorer or Netscape Navigator. Secure Web browsing may be supplied with 128 bit (or greater) encryption by way of HTTPS, SSL, and/or the like. Web browsers allowing for the execution of program components through facilities such as ActiveX, AJAX, (D)HTML, FLASH, Java, JavaScript, web browser plug-in APIs (e.g., FireFox, Safari Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Of course, in place of a Web browser and information server, a combined application may be developed to perform similar functions of both. The combined application would similarly affect the obtaining and the provision of information to users, user agents, and/or the like from the OBM enabled nodes. The combined application may be nugatory on systems employing standard Web browsers.

Mail Server

A mail server component 2321 is a stored program component that is executed by a CPU 2303. The mail server may be a conventional Internet mail server such as, but not limited to sendmail, Microsoft Exchange, and/or the like. The mail server may allow for the execution of program components through facilities such as ASP, ActiveX, (ANSI) (Objective-) C (++), C# and/or .NET, CGI scripts, Java, JavaScript, PERL, PHP, pipes, Python, WebObjects, and/or the like. The mail server may support communications protocols such as, but not limited to: Internet message access protocol (IMAP), Messaging Application Programming Interface (MAPI)/Microsoft Exchange, post office protocol (POP3), simple mail transfer protocol (SMTP), and/or the like. The mail server can route, forward, and process incoming and outgoing mail messages that have been sent, relayed and/or otherwise traversing through and/or to the OBM.

Access to the OBM mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 2322 is a stored program component that is executed by a CPU 2303. The mail client may be a conventional mail viewing application such as Apple Mail, Microsoft Entourage, Microsoft Outlook, Microsoft Outlook Express, Mozilla, Thunderbird, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 2320 is a stored program component that is executed by a CPU 2303, cryptographic component, cryptographic processor 2326, cryptographic processor interface 2327, cryptographic processor device 2328, and/or the like. Cryptographic processor interfaces will allow for expedition of encryption and/or decryption requests by the cryptographic component; however, the cryptographic component, alternatively, may run on a conventional CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.5.0 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash function), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. Employing such encryption security protocols, the OBM may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for an digital audio file. A cryptographic component may communicate to and/or with other components in a component collection, including itself, and/or facilities of the like. The cryptographic component supports encryption schemes allowing for the secure transmission of information across a communications network to enable the OBM component to engage in secure transactions if so desired. The cryptographic component facilitates the secure accessing of resources on the OBM and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The OBM Database

The OBM database component 2319 may be embodied in a database and its stored data. The database is a stored program component, which is executed by the CPU; the stored program component portion configuring the CPU to process the stored data. The database may be a conventional, fault tolerant, relational, scalable, secure database such as Oracle or Sybase. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively, the OBM database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of functionality encapsulated within a given object. If the OBM database is implemented as a data-structure, the use of the OBM database 2319 may be integrated into another component such as the OBM component 2335. Also, the database may be implemented as a mix of data structures, objects, and relational structures. Databases may be consolidated and/or distributed in countless variations through standard data processing techniques. Portions of databases, e.g., tables, may be exported and/or imported and thus decentralized and/or integrated.

In one embodiment, the database component 2319 includes several tables 2319a-o. A Users table 2319a may include fields such as, but not limited to: user_ID, ssn, first_name, last_name, middle_name, suffix, prefix, address_first_line, address_second_line, city, state, zipcode, country, birth_date, gender, device_ID_list, device_name_list, device_type_list, hardware_configuration_list, software_apps_list, device_IP_list, device_MAC_list, device_preferences_list, and/or the like. An Apps table 2319b may include fields such as, but not limited to: app_ID, app_name, app_type, app_version, app_version_timestamp, app_prior_versions_list, app_prior_versions_timestamps, app_update_schedule, app_scheduled_versions_list, app_scheduled_versions_dates, app_scheduled_versions_priority, app_enviroment_type, app_envrionment_version, app_compatibilities_hw, app_compatibilities_sw, app_dependent_topology_tree, app_depend_module_list, app_depend_function_list, app_depend_apps_list, and/or the like. A Client table, 2319c, may include fields such as, but not limited to: user_id, user_name, client_id, client_type, language_pref, client_hardware_compatibilities, client_software_installations, and/or the like. A Session request table 2319d may include fields such as, but not limited to: request_id, timestamp, user_id, client_ip, ack_id, and/or the like. A Server table 2319e may include fields such as, but not limited to: server_name, server_id, server_ip, server_type, and/or the like. A User Session State table 2319f may include fields such as, but not limited to: app_id, app_name, player_id, player_name, game_id, md5_auth, player_action, player_action_timestamp, player_action_type, action_amount, action_source, and/or the like. A Clearance Request table 2319g may include fields such as, but not limited to: request_id, request_type, app_id, app_name, player_id, player_name, game_id, timestamp, and/or the like. A Gaming Realm table 2319h may include fields such as, but not limited to: app_id, player_id, game_id, player_name, last_action, player_hand, player_hand_card_list, player_hand_card_value, and/or the like. A CoS Order table 2319i may include fields such as, but not limited to: clearance_status, clearance_type, warnings_list, warnings_messages, notice_list, notice_messages, report_list, report_messages, address_book, lock_out_list, and/or the like. An Evaluation Rules table 2319j may include fields such as, but not limited to: rule_id, rule_name, rule_type, rule_inputs_list, rule_process_list, rule_outputs_list, find_list, thresholds_list, and/or the like. A Social Graph table 2319k may include fields such as, but not limited to: user_id, friend_id, relationship_strength, activity_timestamps, activity_type, message_id, message_list, and/or the like. A Customer Service Request table 2319l may include fields such as, but not limited to: queue_id, queue_priority, queue_position, request_priority, position_weight, and/or the like. A Game Features table 2319m may include fields such as, but not limited to: feature_id, app_id, game_id, ab_type, object_id, object_difficulty, game_stage_id, game_stage_difficulty, and/or the like. A Products table 2319n may include fields such as, but not limited to: product_id, product_name, product_type, product_category_list, product_keyword_list, product_discount_tiers, product_pricing, product_availability, global_product_list, and/or the like. A Geographical Tracking table 2319o may include fields such as, but not limited to: geo_area_id, geo_area_name, geo_users_list, aggregate_activity_level_list, activity_trough_id, activity_trough_timestamp_begin, activity_trough_timestamp_end, local_keywords, global_keywords, local_search_results_list, global_search_results_list, geo_user_activity_level_list, and/or the like. One or more of the tables discussed above may support and/or track multiple entity accounts on a OBM.

In one embodiment, the OBM database may interact with other database systems. For example, employing a distributed database system, queries and data access by search OBM component may treat the combination of the OBM database, an integrated data security layer database as a single database entity.

In one embodiment, user programs may contain various user interface primitives, which may serve to update the OBM. Also, various accounts may require custom database tables depending upon the environments and the types of clients the OBM may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database components 2319a-o. The OBM may be configured to keep track of various settings, inputs, and parameters via database controllers.

The OBM database may communicate to and/or with other components in a component collection, including itself, and/or facilities of the like. Most frequently, the OBM database communicates with the OBM component, other program components, and/or the like. The database may contain, retain, and provide information regarding other nodes and data.

The OBMs

The OBM component 2335 is a stored program component that is executed by a CPU. In one embodiment, the OBM component incorporates any and/or all combinations of the aspects of the OBM discussed in the previous figures. As such, the OBM affects accessing, obtaining and the provision of information, services, transactions, and/or the like across various communications networks.

The OBM component may transform user social-gaming behavioral pattern data via OBM components into online social-gaming experience customizations, and/or the like and use of the OBM. In one embodiment, the OBM component 2335 takes inputs (e.g., user input 721, gaming app 725, gaming environment data 928, 1129, evaluation rules 1124, game rules 1127, gaming patterns data 1132, social patterns data 1134, social data 1138, new social activity data 1139, and/or the like) etc., and transforms the inputs via various components (e.g., gaming session initiation (GSI) component 2323a, user gaming interaction (UGI) component 2323b, social-gaming behavior evaluation (SGBE) component 2323c, gaming session termination (GST) component 2323d, virtual security camera (VSC) component 2323e, customer service request evaluator (CSRE) component 2323f, live online game tester (LOGT) component 2323g, game feature set tester (GFST) component 2323h, user engagement-tracking game modification (U-ETGM) component 2323i, group engagement-tracking game modification (G-ETGM) component 2323j, and/or the like), into outputs (e.g., gaming app request 722, app query 724, user session state 727, display output 729, user gaming input 922, clearance request 924, clearance ACK 925a, CoS order 925b, environment query 927, user gaming input/sessions state 930, user session state 931, clearance request 1121, evaluation rule request 1123, game rules request 1126, game environment request 1128, gaming patterns request 1131, and/or the like), as shown in FIGS. 7-22C, as well as throughout the specification.

The OBM component enabling access of information between nodes may be developed by employing standard development tools and languages such as, but not limited to: Apache components, Assembly, ActiveX, binary executables, (ANSI) (Objective-) C (++), C# and/or .NET, database adapters, CGI scripts, Java, JavaScript, mapping tools, procedural and object oriented development tools, PERL, PHP, Python, shell scripts, SQL commands, web application server extensions, web development environments and libraries (e.g., Microsoft's ActiveX; Adobe AIR, FLEX & FLASH; AJAX; (D)HTML; Dojo, Java; JavaScript; jQuery(UI); MooTools; Prototype; script.aculo.us; Simple Object Access Protocol (SOAP); SWFObject; Yahoo! User Interface; and/or the like), WebObjects, and/or the like. In one embodiment, the OBM server employs a cryptographic server to encrypt and decrypt communications. The OBM component may communicate to and/or with other components in a component collection, including itself, and/or facilities of the like. Most frequently, the OBM component communicates with the OBM database, operating systems, other program components, and/or the like. The OBM may contain, communicate, generate, obtain, and/or provide program component, system, user, and/or data communications, requests, and/or responses.

Distributed OBMs

The structure and/or operation of any of the OBM node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion.

The component collection may be consolidated and/or distributed in countless variations through standard data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through standard data processing communication techniques. For example, OBM server(s) and database(s) may all be localized within a single computing terminal. As another example, the OBM components may be localized within one or more entities (e.g., hospitals, pharmaceutical companies etc.) involved in coordinated patient management.

The configuration of the OBM controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like.

If component collection components are discrete, separate, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), local and remote application program interfaces Jini, Remote Method Invocation (RMI), SOAP, process pipes, shared files, and/or the like. Messages sent between discrete component components for inter-application communication or within memory spaces of a singular component for intra-application communication may be facilitated through the creation and parsing of a grammar. A grammar may be developed by using standard development tools such as lex, yacc, XML, and/or the like, which allow for grammar generation and parsing functionality, which in turn may form the basis of communication messages within and between components. For example, a grammar may be arranged to recognize the tokens of an HTTP post command, e.g.:

w3c -post http:// . . . . Value1 where Value1 is discerned as being a parameter because "http://" is part of the grammar syntax, and what follows is considered part of the post value. Similarly, with such a grammar, a variable "Value1" may be inserted into an "http://" post command and then sent. The grammar syntax itself may be presented as structured data that is interpreted and/or other wise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated and/or readily available parsers (e.g., the SOAP parser) that may be employed to parse communications data. Further, the parsing grammar may be used beyond message parsing, but may also be used to parse: databases, data collections, data stores, structured data, and/or the like. Again, the desired configuration will depend upon the context, environment, and requirements of system deployment.

Non-limiting exemplary embodiments highlighting numerous further advantageous aspects include:

A1. A processor-implemented virtual security camera method, comprising:
 obtaining, for processing a virtual security clearance request, at least:
  user online gaming pattern data including gaming action identifiers and their associated gaming action timestamps;
  user online social activity data including social networking action identifiers and their associated social networking action timestamps; and
  virtual security clearance evaluation rules including social-gaming activity timeline evaluation instructions and evaluation score thresholds;
 generating, via a processor, a social-gaming activity timeline using the gaming action identifiers and the associated gaming action timestamps, as well as the social networking action identifiers and the associated social networking action timestamps;
 calculating virtual security clearance evaluation rule scores by applying the social-gaming activity timeline evaluation instructions to the generated social-gaming activity timeline;
 comparing the calculated virtual security clearance evaluation rule scores to the evaluation score thresholds to generate virtual security clearance flags; and
 determining whether any virtual security clearance flags were generated based on the comparison of the calculated virtual security clearance evaluation rule scores to the evaluation score thresholds.

A2. The method of embodiment 1, further comprising:
 generating a virtual security clearance acknowledgment upon determining that no virtual security clearance flags were generated based on the comparison;
 obtaining a user online gaming action input and user gaming environment data; and
 generating updated user gaming environment data using the user online gaming action input and the user gaming environment data, upon generating the virtual security clearance acknowledgment.

A3. The method of embodiment 1, further comprising:
 generating a constraint of service order upon determining that at least one virtual security clearance flag was generated based on the comparison; and
 providing the constraint of service order.

A4. The method of embodiment 1, wherein the virtual security clearance request is generated upon obtaining a user online gaming action input.

A5. The method of embodiment 3, wherein the constraint of service order includes orders on modifying an online gaming experience for a user.

A6. The method of embodiment 3, wherein the constraint of service order includes an online gaming activity report based on the social-gaming activity timeline.

A7. The method of embodiment 5, wherein the orders on modifying the online gaming experience for the user include locking the user out of the online gaming experience.

A8. A virtual security camera system, comprising:
a memory; and
a processor disposed in communication with the memory and configured to issue processing instructions stored in the memory, wherein the processor issues instructions to:
 obtain, for processing a virtual security clearance request, at least:
  user online gaming pattern data including gaming action identifiers and their associated gaming action timestamps;
  user online social activity data including social networking action identifiers and their associated social networking action timestamps; and
  virtual security clearance evaluation rules including social-gaming activity timeline evaluation instructions and evaluation score thresholds;
 generate a social-gaming activity timeline using the gaming action identifiers and the associated gaming action timestamps, as well as the social networking action identifiers and the associated social networking action timestamps;

calculate virtual security clearance evaluation rule scores by applying the social-gaming activity timeline evaluation instructions to the generated social-gaming activity timeline;

compare the calculated virtual security clearance evaluation rule scores to the evaluation score thresholds to generate virtual security clearance flags; and determine whether any virtual security clearance flags were generated based on the comparison of the calculated virtual security clearance evaluation rule scores to the evaluation score thresholds.

A9. The system of embodiment 8, wherein the processor further issues instructions to:

generate a virtual security clearance acknowledgment upon determining that no virtual security clearance flags were generated based on the comparison;

obtain a user online gaming action input and user gaming environment data; and generate updated user gaming environment data using the user online gaming action input and the user gaming environment data, upon generating the virtual security clearance acknowledgment.

A10. The system of embodiment 8, wherein the processor further issues instructions to:

generate a constraint of service order upon determining that at least one virtual security clearance flag was generated based on the comparison; and provide the constraint of service order.

A11. The system of embodiment 8, wherein the virtual security clearance request is generated upon obtaining a user online gaming action input.

A12. The system of embodiment 10, wherein the constraint of service order includes orders on modifying an online gaming experience for a user.

A13. The system of embodiment 10, wherein the constraint of service order includes an online gaming activity report based on the social-gaming activity timeline.

A14. The system of embodiment 12, wherein the orders on modifying the online gaming experience for the user include locking the user out of the online gaming experience.

A15. A processor-readable tangible medium storing processor-issuable virtual security camera instructions to:

obtain, for processing a virtual security clearance request, at least:
 user online gaming pattern data including gaming action identifiers and their associated gaming action timestamps;
 user online social activity data including social networking action identifiers and their associated social networking action timestamps; and
 virtual security clearance evaluation rules including social-gaming activity timeline evaluation instructions and evaluation score thresholds;

generate a social-gaming activity timeline using the gaming action identifiers and the associated gaming action timestamps, as well as the social networking action identifiers and the associated social networking action timestamps;

calculate virtual security clearance evaluation rule scores by applying the social-gaming activity timeline evaluation instructions to the generated social-gaming activity timeline;

compare the calculated virtual security clearance evaluation rule scores to the evaluation score thresholds to generate virtual security clearance flags; and determine whether any virtual security clearance flags were generated based on the comparison of the calculated virtual security clearance evaluation rule scores to the evaluation score thresholds.

A16. The medium of embodiment 15, the medium further storing instructions to:

generate a virtual security clearance acknowledgment upon determining that no virtual security clearance flags were generated based on the comparison;

obtain a user online gaming action input and user gaming environment data; and generate updated user gaming environment data using the user online gaming action input and the user gaming environment data, upon generating the virtual security clearance acknowledgment.

A17. The medium of embodiment 15, the medium further storing instructions to:

generate a constraint of service order upon determining that at least one virtual security clearance flag was generated based on the comparison; and provide the constraint of service order.

A18. The medium of embodiment 15, wherein the virtual security clearance request is generated upon obtaining a user online gaming action input.

A19. The medium of embodiment 17, wherein the constraint of service order includes orders on modifying an online gaming experience for a user.

A20. The medium of embodiment 17, wherein the constraint of service order includes an online gaming activity report based on the social-gaming activity timeline.

A21. The medium of embodiment 19, wherein the orders on modifying the online gaming experience for the user include locking the user out of the online gaming experience.

B1. A processor-implemented customer service request evaluation method, comprising:

obtaining a customer service request from a user;

obtaining, for processing the customer service request, at least:
 user social data including graph data identifying co-users, social networking action identifiers and associated social networking action timestamps;
 user online gaming pattern data including gaming action identifiers and associated gaming action timestamps; and
 customer service request evaluation rules and associated request evaluation score thresholds;

generating, via a processor, social-gaming activity timelines for the user and the co-users using the gaming action identifiers and the associated gaming action timestamps, as well as the social networking action identifiers and the associated social networking action timestamps;

generating a social-gaming activity thread for the user using the social-gaming activity timelines for the user and the co-users;

calculating customer service request evaluation rule scores by applying the customer service request evaluation rules to the generated social-gaming activity thread for the user;

comparing each customer service request evaluation rule score to its associated request evaluation score threshold to generate request evaluation flags; and determining whether to process the customer service request based on whether any request evaluation flags were generated.

B2. The method of embodiment 1, further comprising:
  generating a constraint of service order, upon determining that a request evaluation flags was generated; and
  providing a notification that the customer service request is denied.
B3. The method of embodiment 2, further comprising:
  providing, for a law enforcement agency, the constraint of service order and the social-gaming activity thread for the user.
B4. The method of embodiment 2, further comprising:
  terminating a user gaming session of the user, upon generating the constraint of service order.
B5. The method of embodiment 2, further comprising:
  modifying an online gaming experience of the user based on the customer service request evaluation rule scores.
B6. The method of embodiment 1, further comprising:
  calculating a customer service request priority score associated with the customer service request using the customer service request evaluation rule scores, upon determining that no request evaluation flags were generated; and
  storing the customer service request along with the customer service request priority score and a customer service request timestamp in a service request queue of such customer service requests.
B7. The method of embodiment 6, further comprising:
  obtaining a notification to process one of the customer service requests in the service request queue; and
  identifying one of the customer service requests in the service request queue to provide for processing, based on the customer service request priority scores and the customer service request timestamps; and
  providing the identified customer service request for processing.
B8. A customer service request evaluation system, comprising:
a memory; and
a processor disposed in communication with the memory and configured to issue processing instructions stored in the memory, wherein the processor issues instructions to:
  obtain a customer service request from a user;
  obtain, for processing the customer service request, at least:
    user social data including graph data identifying co-users, social networking action identifiers and associated social networking action timestamps;
    user online gaming pattern data including gaming action identifiers and associated gaming action timestamps; and
    customer service request evaluation rules and associated request evaluation score thresholds;
  generate social-gaming activity timelines for the user and the co-users using the gaming action identifiers and the associated gaming action timestamps, as well as the social networking action identifiers and the associated social networking action timestamps;
  generate a social-gaming activity thread for the user using the social-gaming activity timelines for the user and the co-users;
  calculate customer service request evaluation rule scores by applying the customer service request evaluation rules to the generated social-gaming activity thread for the user;
  compare each customer service request evaluation rule score to its associated request evaluation score threshold to generate request evaluation flags; and
  determine whether to process the customer service request based on whether any request evaluation flags were generated.
B9. The system of embodiment 8, wherein the processor further issues instructions to:
  generate a constraint of service order, upon determining that a request evaluation flags was generated; and
  provide a notification that the customer service request is denied.
B10. The system of embodiment 9, wherein the processor further issues instructions to:
  provide, for a law enforcement agency, the constraint of service order and the social-gaming activity thread for the user.
B11. The system of embodiment 9, wherein the processor further issues instructions to:
  terminate a user gaming session of the user, upon generating the constraint of service order.
B12. The system of embodiment 9, wherein the processor further issues instructions to:
  modify an online gaming experience of the user board on the customer service request evaluation rules scores.
B13. The system of embodiment 8, wherein the processor further issues instructions to:
  calculate a customer service request priority score associated with the customer service request using the customer service request evaluation rule scores, upon determining that no request evaluation flags were generated; and
  store the customer service request along with the customer service request priority score and a customer service request timestamp in a service request queue of such customer service requests.
B14. The system of embodiment 13, wherein the processor further issues instructions to:
  obtain a notification to process one of the customer service requests in the service request queue; and
  identify one of the customer service requests in the service request queue to provide for processing, based on the customer service request priority scores and the customer service request timestamps; and
  provide the identified customer service request for processing.
B15. A processor-readable tangible medium storing processor-issuable customer service request evaluation instructions to:
  obtain a customer service request from a user;
  obtain, for processing the customer service request, at least:
    user social data including graph data identifying co-users, social networking action identifiers and associated social networking action timestamps;
    user online gaming pattern data including gaming action identifiers and associated gaming action timestamps; and
    customer service request evaluation rules and associated request evaluation score thresholds;
  generate social-gaming activity timelines for the user and the co-users using the gaming action identifiers and the associated gaming action timestamps, as well as the social networking action identifiers and the associated social networking action timestamps;

generate a social-gaming activity thread for the user using the social-gaming activity timelines for the user and the co-users;

calculate customer service request evaluation rule scores by applying the customer service request evaluation rules to the generated social-gaming activity thread for the user;

compare each customer service request evaluation rule score to its associated request evaluation score threshold to generate request evaluation flags; and determine whether to process the customer service request based on whether any request evaluation flags were generated.

B16. The medium of embodiment 15, the medium further storing instructions to:

generate a constraint of service order, upon determining that a request evaluation flags was generated; and provide a notification that the customer service request is denied.

B17. The medium of embodiment 16, the medium further storing instructions to:

provide, for a law enforcement agency, the constraint of service order and the social-gaming activity thread for the user.

B18. The medium of embodiment 16, the medium further storing instructions to:

terminate a user gaming session of the user, upon generating the constraint of service order.

B19. The medium of embodiment 16, the medium further storing instructions to:

modify an online gaming experience of the user based on the customer service request evaluation rule scores.

B20. The medium of embodiment 15, the medium further storing instructions to:

calculate a customer service request priority score associated with the customer service request using the customer service request evaluation rule scores, upon determining that no request evaluation flags were generated; and store the customer service request along with the customer service request priority score and a customer service request timestamp in a service request queue of such customer service requests.

B21. The medium of embodiment 20, the medium further storing instructions to:

obtain a notification to process one of the customer service requests in the service request queue; and identify one of the customer service requests in the service request queue to provide for processing, based on the customer service request priority scores and the customer service request timestamps; and provide the identified customer service request for processing.

C1. A processor-implemented live online game testing method, comprising:

providing, in response to a gaming app request from a user, a gaming app including a test game feature for the user;

obtaining user social graph data identifying co-users of the user;

obtaining, upon providing the gaming app, at least:

online gaming pattern data, for the users and the co-users, including gaming action identifiers and their associated gaming action timestamps;

user online social activity data, for the users and the co-users, including social networking action identifiers and their associated social networking action timestamps; and game feature adoption evaluation instructions;

generating, via a processor, social-gaming activity timelines for the users and the co-users using the gaming action identifiers and the associated gaming action timestamps, as well as the social networking action identifiers and the associated social networking action timestamps;

calculating game feature adoption scores by applying the game feature adoption evaluation instructions to the generated social-gaming activity timelines; and providing the game feature adoption scores.

C2. The method of embodiment 1, further comprising:

identifying a subset of the co-users for whom to provide game feature testing invitations, based on the social-gaming activity timelines for the co-users; and providing game feature testing invitations to the subset of the co-users.

C3. The method of embodiment 1, further comprising:

providing an option for the user to select a subset of the co-users for whom to provide game feature testing invitations;

obtaining a user selection of the subset of the co-users for whom to provide game feature testing invitations; and providing game feature testing invitations to the selected subset of the co-users.

C4. The method of embodiment 2, further comprising:

obtaining invitation acceptance notifications from a subset of the co-users; and providing gaming apps including a new test game feature for the co-users from whom invitation acceptance notifications were obtained.

C5. The method of embodiment 1, wherein the test game feature is a modified gaming difficulty level.

C6. The method of embodiment 1, wherein the test game feature is a modified product purchase price.

C7. The method of embodiment 6, wherein the modified product purchase price pertains to an in-game virtual product.

C8. A live online game testing system, comprising:

a memory; and a processor disposed in communication with the memory and configured to issue processing instructions stored in the memory, wherein the processor issues instructions to:

provide, in response to a gaming app request from a user, a gaming app including a test game feature for the user;

obtain user social graph data identifying co-users of the user;

obtain, upon providing the gaming app, at least:

online gaming pattern data, for the users and the co-users, including gaming action identifiers and their associated gaming action timestamps;

user online social activity data, for the users and the co-users, including social networking action identifiers and their associated social networking action timestamps; and game feature adoption evaluation instructions;

generate social-gaming activity timelines for the users and the co-users using the gaming action identifiers and the associated gaming action timestamps, as well as the social networking action identifiers and the associated social networking action timestamps;

calculate game feature adoption scores by applying the game feature adoption evaluation instructions to the generated social-gaming activity timelines; and provide the game feature adoption scores.

C9. The system of embodiment 8, wherein the processor further issues instructions to:

identify a subset of the co-users for whom to provide game feature testing invitations, based on the social-gaming activity timelines for the co-users; and provide game feature testing invitations to the subset of the co-users.

C10. The system of embodiment 8, wherein the processor further issues instructions to:

provide an option for the user to select a subset of the co-users for whom to provide game feature testing invitations;

obtain a user selection of the subset of the co-users for whom to provide game feature testing invitations; and provide game feature testing invitations to the selected subset of the co-users.

C11. The system of embodiment 9, wherein the processor further issues instructions to:

obtain invitation acceptance notifications from a subset of the co-users; and provide gaming apps including a new test game feature for the co-users from whom invitation acceptance notifications were obtained.

C12. The system of embodiment 8, wherein the test game feature is a modified gaming difficulty level.

C13. The system of embodiment 8, wherein the test game feature is a modified product purchase price.

C14. The system of embodiment 13, wherein the modified product purchase price pertains to an in-game virtual product.

C15. A processor-readable tangible medium storing processor-issuable live online game testing instructions to:

provide, in response to a gaming app request from a user, a gaming app including a test game feature for the user;

obtain user social graph data identifying co-users of the user;

obtain, upon providing the gaming app, at least:

online gaming pattern data, for the users and the co-users, including gaming action identifiers and their associated gaming action timestamps;

user online social activity data, for the users and the co-users, including social networking action identifiers and their associated social networking action timestamps; and game feature adoption evaluation instructions;

generate social-gaming activity timelines for the users and the co-users using the gaming action identifiers and the associated gaming action timestamps, as well as the social networking action identifiers and the associated social networking action timestamps;

calculate game feature adoption scores by applying the game feature adoption evaluation instructions to the generated social-gaming activity timelines; and provide the game feature adoption scores.

C16. The medium of embodiment 15, the medium further storing instructions to:

identify a subset of the co-users for whom to provide game feature testing invitations, based on the social-gaming activity timelines for the co-users; and provide game feature testing invitations to the subset of the co-users.

C17. The medium of embodiment 15, the medium further storing instructions to:

provide an option for the user to select a subset of the co-users for whom to provide game feature testing invitations;

obtain a user selection of the subset of the co-users for whom to provide game feature testing invitations; and provide game feature testing invitations to the selected subset of the co-users.

C18. The medium of embodiment 16, the medium further storing instructions to:

obtain invitation acceptance notifications from a subset of the co-users; and provide gaming apps including a new test game feature for the co-users from whom invitation acceptance notifications were obtained.

C19. The medium of embodiment 15, wherein the test game feature is a modified gaming difficulty level.

C20. The medium of embodiment 15, wherein the test game feature is a modified product purchase price.

C21. The medium of embodiment 20, wherein the modified product purchase price pertains to an in-game virtual product.

D1. A processor-implemented group engagement tracking game modification method, comprising:

obtaining, for a group of users within a geographical region, at least:

user online gaming pattern data including gaming action identifiers and their associated gaming action timestamps; and user online social activity data including social networking action identifiers and their associated social networking action timestamps;

generating, via a processor, individual social-gaming activity timelines for the users using the gaming action identifiers and the associated gaming action timestamps, as well as the social networking action identifiers and the associated social networking action timestamps;

calculating individual time-varying activity level graphs for the users using the individual social-gaming activity timelines;

calculating a aggregate activity level graph by aggregating the individual time-varying activity level graphs;

identifying an activity trough in the aggregate activity level graph; and identifying an event in the geographical region during a time period corresponding to the activity level trough.

D2. The method of embodiment 1, wherein identifying an event in the geographical region comprises:

obtaining aggregated search results for events in the geographical region during a time period corresponding to the activity level trough;

parsing the aggregated search results; and identifying keywords corresponding to the event based on parsing the aggregated search results.

D3. The method of embodiment 2, further comprising:

querying a product database for sale items based on the identified keywords;

obtaining product results based on the query;

identifying a subset of the users whose individual time-varying activity level graphs include an activity level trough during the time period corresponding to the activity level trough in the aggregate activity level graph; and providing an advertisement for a product from the product results for the identified subset of the users.

D4. The method of embodiment 2, wherein the product is an in-game virtual product.

D5. The method of embodiment 1, further comprising:
identifying a subset of the users whose individual time-varying activity level graphs do not include an activity level trough during the time period corresponding to the activity level trough in the aggregate activity level graph; and
providing an in-game incentive for the identified subset of the users.

D6. The method of embodiment 5, wherein the in-game incentive includes an in-game virtual product.

D7. The method of embodiment 5, further comprising:
inferring a personal characteristic of the subset of the users; and
providing an incentive for the subset of the users based on the personal characteristic.

D8. A group engagement tracking game modification system, comprising:
a memory; and
a processor disposed in communication with the memory and configured to issue processing instructions stored in the memory, wherein the processor issues instructions to:
obtain, for a group of users within a geographical region, at least:
user online gaming pattern data including gaming action identifiers and their associated gaming action timestamps; and
user online social activity data including social networking action identifiers and their associated social networking action timestamps;
generate individual social-gaming activity timelines for the users using the gaming action identifiers and the associated gaming action timestamps, as well as the social networking action identifiers and the associated social networking action timestamps;
calculate individual time-varying activity level graphs for the users using the individual social-gaming activity timelines;
calculate a aggregate activity level graph by aggregating the individual time-varying activity level graphs;
identify an activity trough in the aggregate activity level graph; and
identify an event in the geographical region during a time period corresponding to the activity level trough.

D9. The system of embodiment 8, wherein identifying an event in the geographical region comprises:
obtain aggregated search results for events in the geographical region during a time period corresponding to the activity level trough;
parse the aggregated search results; and
identify keywords corresponding to the event based on parsing the aggregated search results.

D10. The system of embodiment 9, wherein the processor further issues instructions to:
query a product database for sale items based on the identified keywords;
obtain product results based on the query;
identify a subset of the users whose individual time-varying activity level graphs include an activity level trough during the time period corresponding to the activity level trough in the aggregate activity level graph; and
provide an advertisement for a product from the product results for the identified subset of the users.

D11. The system of embodiment 9, wherein the product is an in-game virtual product.

D12. The system of embodiment 8, wherein the processor further issues instructions to:
identify a subset of the users whose individual time-varying activity level graphs do not include an activity level trough during the time period corresponding to the activity level trough in the aggregate activity level graph; and
provide an in-game incentive for the identified subset of the users.

D13. The system of embodiment 12, wherein the in-game incentive includes an in-game virtual product.

D14. The system of embodiment 12, wherein the processor further issues instructions to:
infer a personal characteristic of the subset of the users; and
provide an incentive for the subset of the users based on the personal characteristic.

D15. A processor-readable tangible medium storing processor-issuable group engagement tracking game modification instructions to:
obtain, for a group of users within a geographical region, at least:
user online gaming pattern data including gaming action identifiers and their associated gaming action timestamps; and
user online social activity data including social networking action identifiers and their associated social networking action timestamps;
generate individual social-gaming activity timelines for the users using the gaming action identifiers and the associated gaming action timestamps, as well as the social networking action identifiers and the associated social networking action timestamps;
calculate individual time-varying activity level graphs for the users using the individual social-gaming activity timelines;
calculate a aggregate activity level graph by aggregating the individual time-varying activity level graphs;
identify an activity trough in the aggregate activity level graph; and
identify an event in the geographical region during a time period corresponding to the activity level trough.

D16. The medium of embodiment 15, wherein identifying an event in the geographical region comprises:
obtain aggregated search results for events in the geographical region during a time period corresponding to the activity level trough;
parse the aggregated search results; and
identify keywords corresponding to the event based on parsing the aggregated search results.

D17. The medium of embodiment 16, the medium further storing instructions to:
query a product database for sale items based on the identified keywords;
obtain product results based on the query;
identify a subset of the users whose individual time-varying activity level graphs include an activity level trough during the time period corresponding to the activity level trough in the aggregate activity level graph; and
provide an advertisement for a product from the product results for the identified subset of the users.

D18. The medium of embodiment 16, wherein the product is an in-game virtual product.

D19. The medium of embodiment 15, the medium further storing instructions to:
   identify a subset of the users whose individual time-varying activity level graphs do not include an activity level trough during the time period corresponding to the activity level trough in the aggregate activity level graph; and
   provide an in-game incentive for the identified subset of the users.

D20. The medium of embodiment 19, wherein the in-game incentive includes an in-game virtual product.

D21. The medium of embodiment 19, the medium further storing instructions to:
   infer a personal characteristic of the subset of the users; and
   provide an incentive for the subset of the users based on the personal characteristic.

In order to address various issues and advance the art, the entirety of this application for APPARATUSES, METHODS AND SYSTEMS FOR A LIVE ONLINE GAME TESTER (including the Cover Page, Title, Headings, Field, Background, Summary, Brief Description of the Drawings, Detailed Description, Claims, Abstract, Figures, Appendices and/or otherwise) shows, by way of illustration, various embodiments in which the claimed invention(s) may be practiced. The advantages and features of the application are of a representative sample of embodiments only, and are not exhaustive and/or exclusive. They are presented only to assist in understanding and teach the claimed principles. It should be understood that they are not representative of all claimed inventions. As such, certain aspects of the disclosure have not been discussed herein. That alternate embodiments may not have been presented for a specific portion of the invention or that further undescribed alternate embodiments may be available for a portion is not to be considered a disclaimer of those alternate embodiments. It will be appreciated that many of those undescribed embodiments incorporate the same principles of the invention and others are equivalent. Thus, it is to be understood that other embodiments may be utilized and functional, logical, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the invention, and inapplicable to others. In addition, the disclosure includes other inventions not presently claimed. Applicant reserves all rights in those presently unclaimed inventions including the right to claim such inventions, file additional applications, continuations, continuations in part, divisions, and/or the like thereof. As such, it should be understood that advantages, embodiments, examples, functional, features, logical, organizational, structural, topological, and/or other aspects of the disclosure are not to be considered limitations on the disclosure as defined by the claims or limitations on equivalents to the claims. It is to be understood that, depending on the particular needs of the OBM and/or characteristics of the hardware, software, network framework, monetization model and/or the like, various embodiments of the OBM may be implemented that enable a great deal of flexibility and customization. It is to be understood that, depending on the particular needs of the OBM and/or characteristics of the hardware, software, network framework, monetization model and/or the like, various embodiments of the OBM may be implemented that enable a great deal of flexibility and customization. The instant disclosure discusses example implementations of the OBM within the context of user online behavior monitoring. However, it is to be understood that the system described herein can be readily configured for a wide range of other applications and/or implementations. For example, implementations of the OBM can be configured to operate within the context of network security, online productivity collaboration, online resource management, and/or the like. It is to be understood that the OBM may be further adapted to other implementations.

What is claimed is:

1. A processor-implemented live online game testing method, comprising:
   providing, in response to a gaming app request from a user, a gaming app including a test game feature for the user;
   obtaining user social graph data identifying co-users of the user;
   obtaining, upon providing the gaming app, at least:
      online gaming pattern data, for the users and the co-users, including gaming action identifiers and their associated gaming action timestamps;
      user online social activity data, for the users and the co-users, including social networking action identifiers and their associated social networking action timestamps; and
      game feature adoption evaluation instructions;
   generating, via a processor, social-gaming activity timelines for the users and the co-users using the gaming action identifiers and the associated gaming action timestamps, as well as the social networking action identifiers and the associated social networking action timestamps;
   calculating game feature adoption scores by applying the game feature adoption evaluation instructions to the generated social-gaming activity timelines; and
   providing the game feature adoption scores.

2. The method of claim 1, further comprising:
   identifying a subset of the co-users for whom to provide game feature testing invitations, based on the social-gaming activity timelines for the co-users; and
   providing game feature testing invitations to the subset of the co-users.

3. The method of claim 1, further comprising:
   providing an option for the user to select a subset of the co-users for whom to provide game feature testing invitations;
   obtaining a user selection of the subset of the co-users for whom to provide game feature testing invitations; and providing game feature testing invitations to the selected subset of the co-users.

4. The method of claim 2, further comprising:
obtaining invitation acceptance notifications from a subset of the co-users; and
providing gaming apps including a new test game feature for the co-users from whom invitation acceptance notifications were obtained.

5. The method of claim 1, wherein the test game feature is a modified gaming difficulty level.

6. The method of claim 1, wherein the test game feature is a modified product purchase price.

7. The method of claim 6, wherein the modified product purchase price pertains to an in-game virtual product.

8. A live online game testing system, comprising:
a memory; and
a processor disposed in communication with the memory and configured to issue processing instructions stored in the memory, wherein the processor issues instructions to:
provide, in response to a gaming app request from a user, a gaming app including a test game feature for the user;
obtain user social graph data identifying co-users of the user;
obtain, upon providing the gaming app, at least:
online gaming pattern data, for the users and the co-users, including gaming action identifiers and their associated gaming action timestamps;
user online social activity data, for the users and the co-users, including social networking action identifiers and their associated social networking action timestamps; and
game feature adoption evaluation instructions;
generate social-gaming activity timelines for the users and the co-users using the gaming action identifiers and the associated gaming action timestamps, as well as the social networking action identifiers and the associated social networking action timestamps;
calculate game feature adoption scores by applying the game feature adoption evaluation instructions to the generated social-gaming activity timelines; and
provide the game feature adoption scores.

9. The system of claim 8, wherein the processor further issues instructions to:
identify a subset of the co-users for whom to provide game feature testing invitations, based on the social-gaming activity timelines for the co-users; and
provide game feature testing invitations to the subset of the co-users.

10. The system of claim 8, wherein the processor further issues instructions to:
provide an option for the user to select a subset of the co-users for whom to provide game feature testing invitations;
obtain a user selection of the subset of the co-users for whom to provide game feature testing invitations; and
provide game feature testing invitations to the selected subset of the co-users.

11. The system of claim 9, wherein the processor further issues instructions to:
obtain invitation acceptance notifications from a subset of the co-users; and
provide gaming apps including a new test game feature for the co-users from whom invitation acceptance notifications were obtained.

12. The system of claim 8, wherein the test game feature is a modified gaming difficulty level.

13. The system of claim 8, wherein the test game feature is a modified product purchase price.

14. The system of claim 13, wherein the modified product purchase price pertains to an in-game virtual product.

15. A processor-readable tangible medium storing processor-issuable live online game testing instructions to:
provide, in response to a gaming app request from a user, a gaming app including a test game feature for the user;
obtain user social graph data identifying co-users of the user;
obtain, upon providing the gaming app, at least:
online gaming pattern data, for the users and the co-users, including gaming action identifiers and their associated gaming action timestamps;
user online social activity data, for the users and the co-users, including social networking action identifiers and their associated social networking action timestamps; and
game feature adoption evaluation instructions;
generate social-gaming activity timelines for the users and the co-users using the gaming action identifiers and the associated gaming action timestamps, as well as the social networking action identifiers and the associated social networking action timestamps;
calculate game feature adoption scores by applying the game feature adoption evaluation instructions to the generated social-gaming activity timelines; and
provide the game feature adoption scores.

16. The medium of claim 15, the medium further storing instructions to:
identify a subset of the co-users for whom to provide game feature testing invitations, based on the social-gaming activity timelines for the co-users; and
provide game feature testing invitations to the subset of the co-users.

17. The medium of claim 15, the medium further storing instructions to:
provide an option for the user to select a subset of the co-users for whom to provide game feature testing invitations;
obtain a user selection of the subset of the co-users for whom to provide game feature testing invitations; and
provide game feature testing invitations to the selected subset of the co-users.

18. The medium of claim 16, the medium further storing instructions to:
obtain invitation acceptance notifications from a subset of the co-users; and
provide gaming apps including a new test game feature for the co-users from whom invitation acceptance notifications were obtained.

19. The medium of claim 15, wherein the test game feature is a modified gaming difficulty level.

20. The medium of claim 15, wherein the test game feature is a modified product purchase price.

21. The medium of claim 20, wherein the modified product purchase price pertains to an in-game virtual product.

* * * * *